US011334947B1

(12) United States Patent
Fellowes et al.

(10) Patent No.: US 11,334,947 B1
(45) Date of Patent: May 17, 2022

(54) SYSTEMS AND METHODS FOR MODELING FUTURE VALUE

(71) Applicant: United Income, Inc., Washington, DC (US)

(72) Inventors: Matthew Cruickshanks Fellowes, Washington, DC (US); Lara Langdon, Alexandria, VA (US); Benjamin Peter Samuel, Arlington, VA (US); Jean Elizabeth Theurer, Kathmandu (NP)

(73) Assignee: United Income, Inc., Washington, DC (US)

(*) Notice: Subject to any disclaimer, the term of this patent is extended or adjusted under 35 U.S.C. 154(b) by 401 days.

(21) Appl. No.: 16/211,439

(22) Filed: Dec. 6, 2018

Related U.S. Application Data

(60) Provisional application No. 62/597,208, filed on Dec. 11, 2017.

(51) Int. Cl.
*G06Q 40/06* (2012.01)
*G06Q 10/06* (2012.01)
(Continued)

(52) U.S. Cl.
CPC ............ *G06Q 40/06* (2013.01); *G06F 30/20* (2020.01); *G06Q 10/04* (2013.01); *G06Q 10/0635* (2013.01); *G06Q 10/06312* (2013.01)

(58) Field of Classification Search
CPC .... G06F 16/3322; G06F 9/453; G06F 3/0237; G06F 40/216; G06Q 40/00; G06Q 40/04; G06Q 40/06
See application file for complete search history.

(56) References Cited

U.S. PATENT DOCUMENTS 8,180,695 B2  5/2012  Ameriks et al.
8,185,464 B1  5/2012  Ameriks et al.
(Continued)

FOREIGN PATENT DOCUMENTS

JP   2007515017   *  1/2018  ............ G06Q 40/06
WO  2017024039 A1   2/2017

OTHER PUBLICATIONS

Garud Iyengar ■ Alfred Ka Chun Ma Fast gradient descent method for Mean-CVaR optimization Ann Oper Res (2013) 205:203-212.*
(Continued)

*Primary Examiner* — Richard C Weisberger
(74) *Attorney, Agent, or Firm* — Banner & Witcoff, Ltd.

(57) ABSTRACT

Embodiments provide systems and methods for modeling future asset value, which may establish planning simulation and optimization parameters for an individual, execute a planning simulation based on the parameters, analyze results of the planning simulation to determine candidate plans with highest chances of success, determine, from among the candidate plans, an optimal plan, based on executing concurrent gradient descent that includes executing steps of gradient descent in parallel, and report the optimal plan. Embodiments may also provide systems and methods for describing a portfolio and investment goals in a manner comprehensible by the investor, modeling financial plans that meet those goals, simulating those plans over time, selecting the plans that demonstrate the greatest utility for the investor, executing those plans in the market, and continually revising plans as circumstances change.

19 Claims, 31 Drawing Sheets

(51) Int. Cl.
*G06Q 10/04* (2012.01)
*G06F 30/20* (2020.01)

(56) References Cited

U.S. PATENT DOCUMENTS

| | | |
|---|---|---|
| 8,341,063 B1 | 12/2012 | Cernyar |
| 8,571,963 B2 | 10/2013 | Ameriks et al. |
| 9,633,395 B2 | 4/2017 | Ameriks et al. |
| 2006/0218068 A1* | 9/2006 | Loeper .................. G06Q 40/00 705/35 |
| 2010/0280935 A1 | 11/2010 | Fellowes et al. |
| 2011/0166978 A1 | 7/2011 | Mastrogiovanni |
| 2014/0114882 A1 | 4/2014 | Thoma |
| 2016/0300308 A1 | 10/2016 | Wakeman et al. |
| 2017/0011462 A1 | 1/2017 | Anliker et al. |
| 2017/0193604 A1 | 7/2017 | Johansen et al. |
| 2017/0323385 A1* | 11/2017 | Sivaramakrishnan ....................... G06Q 40/06 |

OTHER PUBLICATIONS

Forecasting and trading high frequency volatility on large indices Fei Liu†, Athanasios A. PantelousQuantitative Finance, 2018 vol. 18, No. 5, 737-748, https://doi.org/10.1080/14697688.2017.1414489.*

Davis et al., An examination of the Federal Employee Retirement System (FERS) survivor annuity benefit 2018.*

* cited by examiner

FTUX (First time user experience):

- First and last name
- Date of birth
- Email
- Zip
- Gender
- Highest level of education
- Salary relative to others (less, average, more)
- Work status
- Future dream Financial plan data collection:

- Household Profile
    - Marital status
    - Spouses name
    - Marriage date
    - Spouses Date of birth
    - Race
    - Spouses gender
    - Spouses race
    - Spouses education level
    - Other children/family members in household
    - Last year Taxable income and long-term capital gains
    - State taxes are filed
    - Total value of household retirement accounts last year
    - Primary residence – rent, mortgage, own
    - Length remaining on mortgage
    - Wish to estimate life expectancy? (Estimate or enter own)
    - Wish to estimate spouse life expectancy? (Estimate or enter own)
    - Confirm favorite retirement dream
    - Know when you want to retire? (Recommend or enter own time)
    - Spouse work status
    - Spouse know when to retire? (Recommend or enter own time)
    - Review info
- Health Profile
    - Self-rated health
    - Height/weight
    - Diabetes
    - Exercise habits
    - Smoking habits
    - How long ago did you quit
    - How much did you smoke

FIG. 21

- o Alcohol habits
- o Spouse self-rated health
- o Spouse height/weight
- o Spouse diabetes
- o Spouse exercise habits
- o Spouse smoke
- o Spouse alcohol
- o Review info
- Benefits Profile
    - o You/Spouse receiving SS benefits? Collect amounts if so.
    - o Worked in US for 10+ years?
    - o Typical amount earned from job in recent years
    - o Spouse worked in US for 10+ years?
    - o Spouse typical amount earned
    - o Know when want to claim SS
    - o Review info
- Spending goals
    - o Essentials
        - Which estimate to use
        - How much currently spending on essentials
        - How long that will continue
        - What it will change to after that
        - Use UI's inflation rate?
        - Investment strategy (risk)
        - Rank spending goals
        - Review info
        - How to invest leftover money
    - o Lifestyle
        - Which estimates to use
        - How much currently spending on lifestyle
        - Use UI's inflation rate?
        - Investment strategy (risk)
        - Rank spending goals
        - Review info
    - o Healthcare
        - Which estimates to use
        - How much currently spending on healthcare
        - Use UI's inflation rate?
        - Investment strategy (risk)
        - Rank spending goals
        - Review info
    - o Experience
        - Name it
        - Amount planning to spend

*FIG. 22*

- Use UI's inflation rate?
- When plan to start spending in this
- Frequency of spend
- Start and start of spend
- Investment strategy (risk)
- Rank spending goals
- Review info
  - Gift
    - Name it
    - Who will receive it (tax exempt)?
    - Amount planning to give
    - Use UI's inflation rate?
    - When plan to start spending in this
    - Frequency of spend
    - Start and start of spend
    - Investment strategy (risk)
    - Rank spending goals
    - Review info
  - Bequest
    - Name it
    - Who will receive it (tax exempt)?
    - Who (you or spouse) and amount planning to give
    - Use UI's inflation rate?
    - Investment strategy (risk)
    - Rank spending goals
    - Review info
  - Left over funds risk score
- Income
  - Job Income
    - Name
    - You or spouse's job
    - Amount annually
    - Expect to end?
    - Increase rate
    - Review
  - Rental Income
    - Name
    - You or spouses property
    - Amount annually
    - Expect to end?
    - Increase rate
    - Review
  - Other income
    - Amount and frequency

FIG. 23

- Date of start and end
- Increase rate
- Review
- Accounts
    - Annuity
    - Banking
    - Inheritance
    - Investment
        - Name
        - You or spouse owns
        - Type of investment account
        - Monthly contribution to account and employer contributions if applicable
        - Dividends/interest reinvested?
        - Which estimate/strategy to use
        - Current balance/unrealized gains or losses
        - Review
    - Life Insurance
    - Pension
    - Real Estate
    - Trust

FIG. 24

|  | TRUST | | BROKERAGE | |
|---|---|---|---|---|
| YEAR | ESSENTIALS | TRAVEL | ESSENTIALS | TRAVEL |
| 2030 | 0 | 0 | 1 | 1 |
| 2031 | 0 | 0 | 1 | 1 |
| 2032 | 0 | 0 | 1 | 1 |
| 2033 | 0 | 0 | 1 | 1 |
| 2034 | 0 | 0 | 1 | 1 |
| 2035 | 0.6 | 0.6 | 1 | 1 |
| 2036 | 1 | 1 | 1 | 1 |
| 2037 | 1 | 1 | 1 | 1 |
| 2038 | 1 | 1 | 1 | 1 |
| 2039 | 1 | 1 | 1 | 1 |

*FIG. 27A*

|  | TRUST | | BROKERAGE | |
| --- | --- | --- | --- | --- |
| YEAR | ESSENTIALS | TRAVEL | ESSENTIALS | TRAVEL |
| 2070 | 1 | 1 | 1 | 1 |
| 2071 | 1 | 1 | 1 | 1 |
| 2072 | 1 | 1 | 1 | 1 |
| 2073 | 1 | 1 | 1 | 1 |
| 2074 | 1 | 1 | 1 | 1 |
| 2075 | 0.8 | 0.8 | 1 | 1 |
| 2076 | 0.8 | 0.8 | 1 | 1 |
| 2077 | 0.8 | 0.8 | 1 | 1 |
| 2078 | 0.8 | 0.8 | 1 | 1 |
| 2079 | 0.8 | 0.8 | 1 | 1 |

*FIG. 27B*

|      | TRUST      |        | BROKERAGE  |        |
|------|------------|--------|------------|--------|
| YEAR | ESSENTIALS | TRAVEL | ESSENTIALS | TRAVEL |
| 2070 | 1    | 1    | 1 | 1 |
| 2071 | 1    | 1    | 1 | 1 |
| 2072 | 1    | 1    | 1 | 1 |
| 2073 | 1    | 1    | 1 | 1 |
| 2074 | 1    | 1    | 1 | 1 |
| 2075 | 0.88 | 0.88 | 1 | 1 |
| 2076 | 0.8  | 0.8  | 1 | 1 |
| 2077 | 0.8  | 0.8  | 1 | 1 |
| 2078 | 0.8  | 0.8  | 1 | 1 |
| 2079 | 0.8  | 0.8  | 1 | 1 |

*FIG. 27C*

SYSTEMS AND METHODS FOR MODELING FUTURE VALUE

CROSS-REFERENCE TO RELATED APPLICATION

This application claims the benefit of U.S. Provisional Patent Application No. 62/597,208, filed Dec. 11, 2017, and entitled "Systems and Methods for Modeling Future Value," which is incorporated herein by reference in its entirety.

BACKGROUND

Automated planning is widely utilized in many different scenarios. For example, automated planning may be used in determining an optimal financial plan. Various computational frameworks may be used, which may provide varying levels of accuracy, and which may generate results using varying levels of computational resources, which is a common technical problem associated with computing. For example, a computational framework may use pre-defined approximation techniques to converge to an acceptable solution. This differs from human calculation, as a human is not concerned with the same constraints as for computer calculations (e.g., predetermined finite number of bits for storing values, internal routines for performing arithmetic on internal numeric representations, significant loss of accuracy with bit loss (e.g., bit cutoffs due to the internal numeric representations and corresponding internal routines) in iterative computation, etc.).

Further, while computing devices may be used for simple brute force computations, to calculate every possibility of results for plans, in many cases, this requires significant computing resources, and may require significant time to get results indicating an optimal plan, given particular user input for the plan. Such performance by computing devices may be unacceptable, for example, for users that may simply give up after a few seconds/minutes, if they are researching different possibilities in input for a plan. Additionally, the cost of such computing resources may become prohibitive for brute force computing on several variables in a plan.

Significant research has been performed since the advent of computing devices, to develop both hardware and software that may provide more timely, less expensive, and more accurate results, and it is common for different hardware and/or software to generate different results in solving common problems that may involve iterative manipulations of numeric values, with their respective internal representations, which may vary from one platform to another (including both hardware and software platforms).

As an example, businesses may have needs for financial plans that may involve multiple variables whose values may change over time. As another example, investors may have needs for financial plans that are generated based on multiple variables, such as lifestyle, age, income, projected date of retirement, projected lifespan, etc. The investor may desire an optimal financial plan generated based on multiple possibilities (e.g., different retirement dates, different income levels, etc.). For example, the investor may want to see results of one plan, before requesting results for a different plan. Generating such plans may require substantial computing resources, as well as substantial processing time to obtain results.

There is a need in the art for a system and method that addresses the shortcomings discussed above.

SUMMARY

In one aspect, embodiments may provide computer-implemented methods for modeling future asset value. A method may include establishing planning simulation and optimization parameters for an individual, executing a planning simulation based on the parameters, analyzing results of the planning simulation to determine candidate plans with highest chances of success, determining, from among the candidate plans, an optimal plan, based on executing concurrent gradient descent that includes executing steps of gradient descent in parallel, and reporting the optimal plan.

In another aspect, a system may include at least one device processor, an application programming interface (API) in communication with a user interface; and a methodology engine in communication with the API, wherein the methodology engine comprises a computer processor programmed with instructions for performing: establishing planning simulation and optimization parameters; executing a planning simulation based on the parameters; analyzing results of the planning simulation to determine candidate plans with highest chances of success and highest utility; determining, from among the candidate plans, an optimal plan, based on executing concurrent gradient descent that includes executing steps of gradient descent in parallel; and reporting the optimal plan.

In a further aspect, a non-transitory computer-readable medium storing instructions that are executable by a device processor may model future asset value by establishing planning simulation and optimization parameters for an individual, executing a planning simulation based on the parameters, analyzing results of the planning simulation to determine candidate plans with highest chances of success, determining, from among the candidate plans, an optimal plan, based on executing concurrent gradient descent that includes executing steps of gradient descent in parallel, and reporting the optimal plan.

Other systems, methods, features, and benefits of the present embodiments will be, or will become, apparent to one of ordinary skill in the art upon examination of the following figures and detailed description. It is intended that all such additional systems, methods, features, and benefits be included within this description and this summary, be within the scope of the present disclosure, and be protected by the claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 21 is a listing of exemplary data collected from a user, according to an embodiment;

FIG. 22 is a listing of exemplary data collected from a user, according to an embodiment;

FIG. 23 is a listing of exemplary data collected from a user, according to an embodiment;

FIG. 24 is a listing of exemplary data collected from a user, according to an embodiment;

FIGS. 27A-27C are exemplary accessibility matrices, according to embodiments.

DETAILED DESCRIPTION

The present embodiments may provide systems and methods for financial planning and investment management. In particular implementations, embodiments may provide systems and methods for automating the financial planning decision making process by generating a plurality of plans, optimizing financial plans by selecting plans with high utility for the end-investor, and executing a financial plan in real-time by way of asset and investment management. In another aspect, embodiments may provide systems and methods for automating the financial planning decision making process by generating a plurality of plans, optimizing financial plans by selecting plans with high utility for the end-investor, and executing a financial plan in real-time by way of asset and investment management, based on executing concurrent gradient descent that includes executing steps of gradient descent in parallel.

Figure 26:
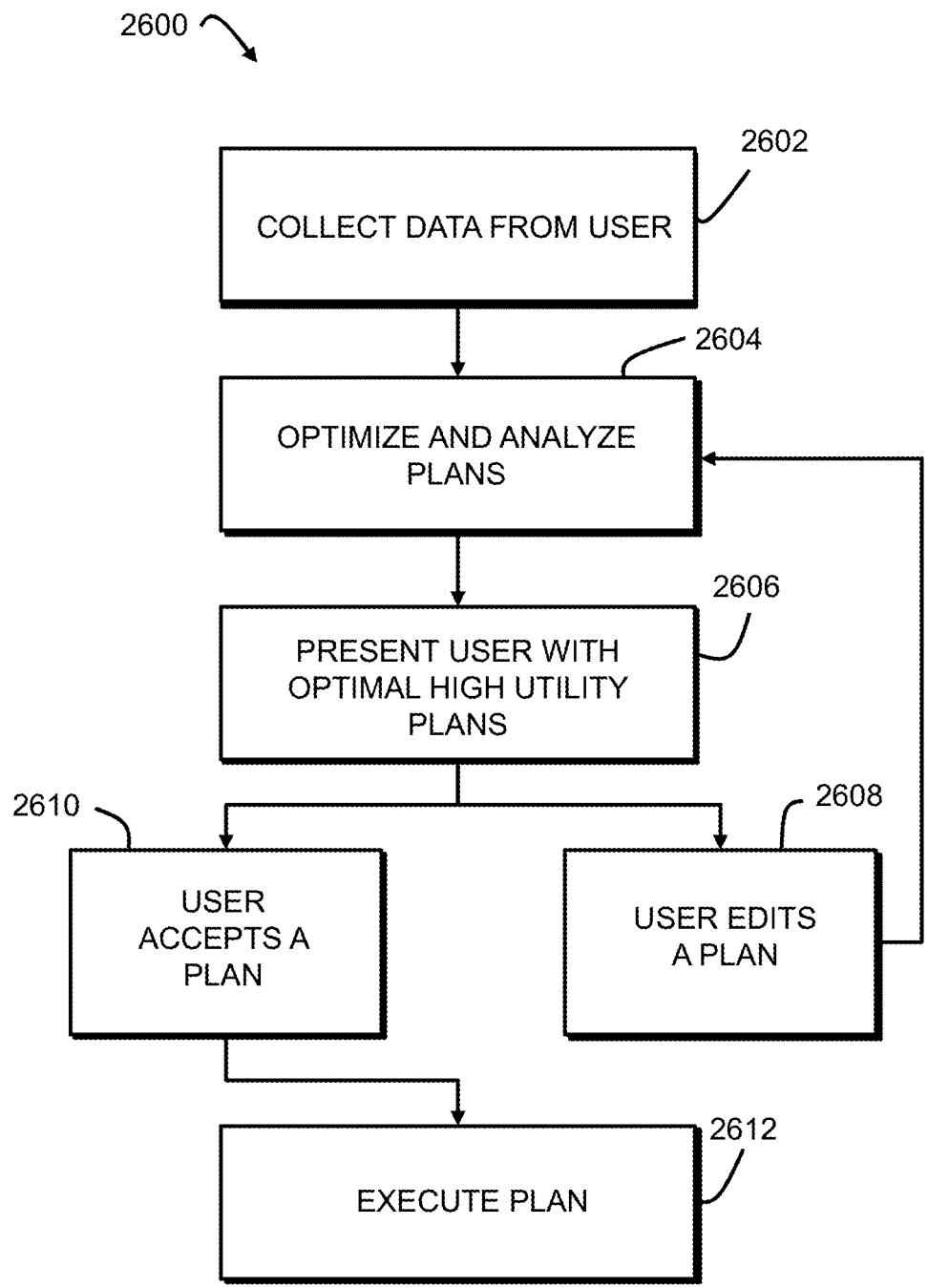
FIG. 26 is a flowchart illustrating steps from creation to execution of a financial plan, according to an embodiment.

As an example, FIG. 26 illustrates a method 2600 for creation to execution of a financial plan, according to an embodiment, including collecting data from a user (step 2602), optimizing and analyzing financial plans (step 2604), presenting the user with optimal high utility financial plans (step 2606), optionally receiving from the user edits to a plan (step 2608) and returning to the optimization and analysis (step 2604), receiving from the user acceptance of a plan (step 2610), and executing the accepted plan (step 2612).

Embodiments provide systems and methods for describing a portfolio and investment goals in a manner comprehensible by the investor, modeling financial plans that meet those goals, simulating those plans over time, selecting the plans that demonstrate the greatest utility for the investor, executing those plans in the market, and continually revising plans as circumstances change.

Figure 25:
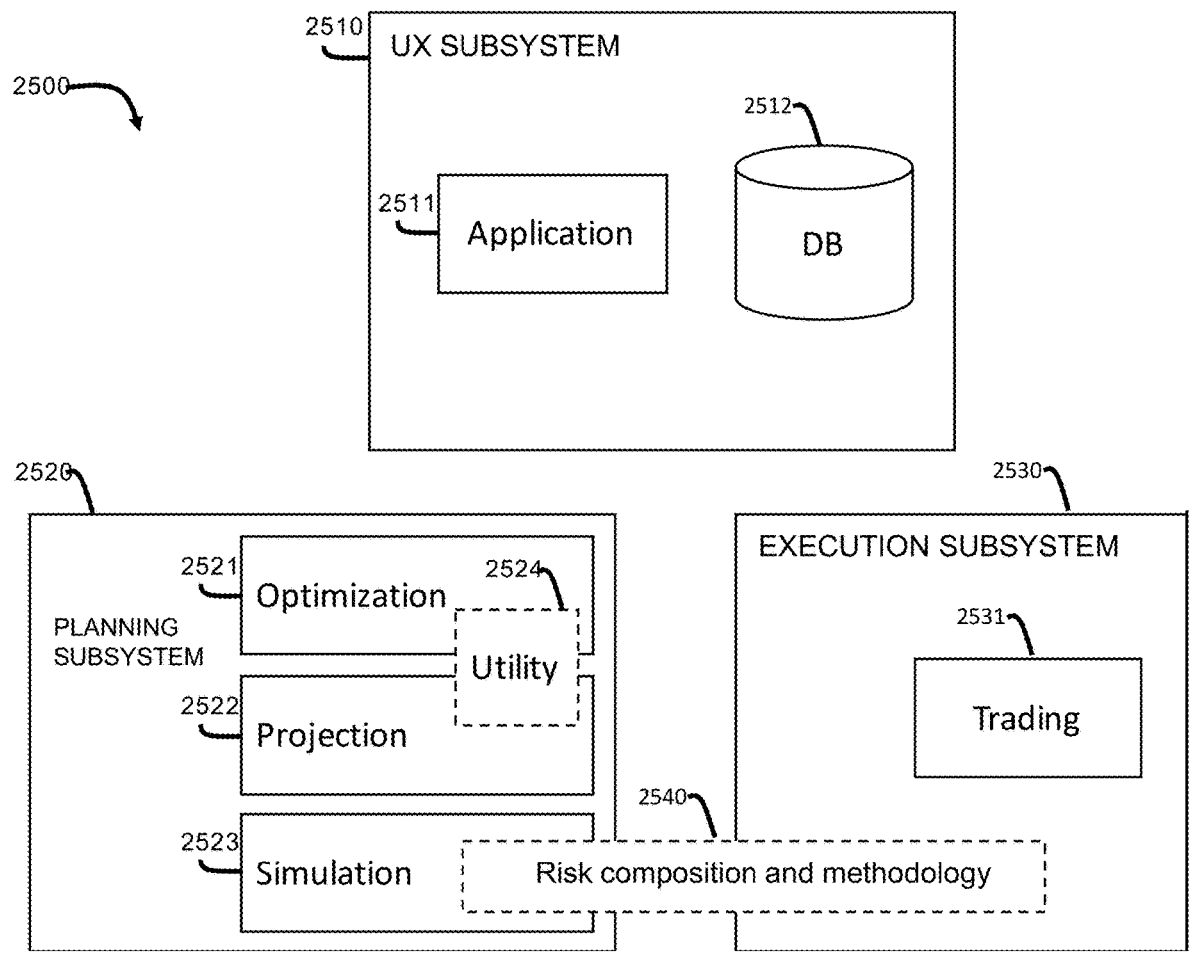
FIG. 25 is a diagram illustrating different aspects of an application for financial planning, according to an embodiment.

Referring to FIG. 25, the present embodiments may be understood as a system 2500, which may include three basic subsystems. These subsystems may be designed as a single system or as individual cooperating services, and those services themselves may be further designed as smaller services.

As shown in FIG. 25, a first subsystem 2510 may provide the initial user experience ("UX") of gathering data needed to assess the investor's portfolio and financial goals and selecting an optimal financial plan. Subsystem 2510 may additionally provide the continuing user experience of assessing the investor's portfolio, assessing progress towards goals, maintaining an optimal financial plan, and assisting with legal obligations such as filing taxes and required minimum distributions.

A component of subsystem 2510 may be an application 2511 that may present to the investor a visual interface, textual interface, auditory interface, or any other form of human computer interaction. A further embodiment of application 2511 may expose all human-directed functionality via an application programmatic interface to allow integration with other automated services.

An additional component of subsystem 2510 may be a database management system 2512 that stores all details relating to the investor, the investor's portfolio, and financial plan. Embodiments of this database management system 2512 may include databases based on the relational algebra, relational calculus, object relational models such as the SQL model, network databases, object databases, unstructured databases, and others. In an alternative embodiment, database management system 2512 may be a dedicated portfolio service that might embody logic to represent a plan in use and a prospective plan, or to enable the investor to have any number of plans to evaluate "what if" scenarios.

As shown in FIG. 25, system 2500 may also include a second subsystem 2520, which may embody the full methodology of describing an investor's complete portfolio and financial goals as mathematical and algorithmic devices which may be simulated by a computing device. Subsystem 2520 may further embody the methodology of evaluating the utility of different candidate plans and selecting the plan that demonstrates the highest utility to the investor. Subsystem 2520 may further embody the methodology of recognizing patterns within the data reported by the various components and summarizing this in actionable recommendations for the investor.

A component of subsystem 2520 may be a simulation service 2523 that embodies the risk composition and methodology 2540, as illustrated in FIG. 25. This simulation service 2523 may accept the investor's portfolio and financial goals stored within database management system 2512 or possibly a modified version of that data more suited to simulation. Simulation service 2523 may accept data about accounts managed directly by the system 2500, or simulation service 2523 may use projected data about accounts not managed by the application, or simulation service 2523 may use data about accounts not managed but that is collected manually or by automated means. Simulation service 2523 may then simulate events notable to the investor or the investor's household such as financial transactions, taxation, death, incomes, expenditures, and any other events that may be relevant to financial planning. Simulation service 2523 simulates the passage of time between fixed events by adjusting asset values in accordance with a mathematical model that accepts capital market assumptions about the assets. Simulation service 2523 captures observations during the simulation relevant to any aspect of the simulation, such as taxes paid, income earned, expenditures, and asset growth. Simulation service 2523 may further utilize a simplified mathematical model, for example, by assuming mean returns, and modified methodology to generate a short run timeline to recommend budgetary advice to the investor.

A further component of subsystem 2520 may be a projection service 2522 that embodies a utility function 2524. Projection service 2522 may run many simulations using the simulation service 2523, using new randomized market conditions and potentially other factors that may be randomized over a known distribution such as time of death. Projection service 2522 may aggregate the observations collected by the simulation and estimate parameters of their distribution. When these factors are presented to the utility function 2524, projection service 2522 may determine the absolute utility of a specific financial plan.

A further component of subsystem 2520 may be an optimization service 2521 that also partially embodies the utility function 2524. Optimization service 2521 may be different from the simulation service 2523 in that optimization service 2521 will accept a financial plan wherein certain parameters are unknown or, if known, the investor is not certain they are optimal. These parameters may include retirement date, when to pursue financial goals, whether to use financial devices like CDs, stocks, and annuities, different strategies to draw down accounts, different strategies to contribute to accounts, which assets to locate in various accounts, and so forth. Optimization service 2521 may use various mechanisms to determine optimal settings for these parameters, and several alternative mechanisms are disclosed herein. Optimization service 2521 may use the utility metric reported by the projection service 2522 to decide which settings are optimal for the investor.

A third subsystem of system 2500 may be an execution service 2530. Just as simulation service 2523 simulates the events occurring in the financial plan and the passage of time, execution service 2530 may execute trades in accordance with the strategies determined to be optimal within the financial plan, track contributions and distributions initiated by the investor, and report account balances and trading activity to the application 2511 to enable the investor to either act in accordance with the financial plan or modify the plan to account for deviations from the plan. The execution service 2530 may therefore be a further embodiment of the risk composition and methodology 2540, especially as execution service 2530 attempts to maintain the risk composition of the investor's portfolio to be in the state determined to be optimal by the financial plan.

A component of execution service 2530 may be a trading service 2531, which may be responsible for tracking account balances to include principal and earnings and the specific assets held within the investor's portfolio. Using the risk composition and methodology 2540, execution service 2530 may therefore determine whether rebalancing should take place. If the simulation was, for example, simplified to consider broad asset classes, the trading service 2531 may translate those asset classes into an equivalent representation of specific assets. If the simulation recommends percentages or dollar values, the trading service may translate those into shares using, for example, an apportionment method such as Hamilton's apportionment method, but may use any other technique known. The trading service 2531 may use current market data to perform optimizations that the simulation may or may not consider, such as allocating assets into tax lots to minimize capital gains or any other taxes. The trading service 2531 may report all trades made, any trades that are not able to complete or other exceptional situations, and other alerts for the investor back to the database 2512 so the application 2511 can recommend a course of action to the investor to resolve any situations timely.

A further embodiment of the system 2500 provides integration of the components of FIG. 25 into a holistic system that assists an investor to fully understand the investor's finances, to understand the extent of all financial goals that the investor can achieve with the investor's portfolio, to understand the extent of possible alternative courses of action the investor can take, to understand the potential impacts of those courses of action, to select an optimal plan, to assist the investor in executing that plan over time, to automate as much of that execution as possible, to alert the investor if a deviation from that plan is detected, and to devise a new plan that meets the investor's needs if it is not possible to execute the original plan.

The present embodiments may therefore provide systems and methods for financial planning and investment management. In particular implementations, embodiments may provide systems and methods for automating the financial planning decision making process, optimizing financial plans by selecting plans with high utility for the end-investor, and executing a financial plan in real-time by way of investment or asset management.

In aspects, embodiments may include an application programming interface (API) in communication with a user interface (UI) connected to a client browser, a financial planning methodology engine in communication with the API, and a trading engine in communication with the methodology engine and the API.

In other aspects, embodiments of a financial planning methodology engine may provide systems and methods for generating a high-utility financial plan that achieves the financial objectives of the end-investor. The methodology engine may further provide recommendations for implementing the financial plan, including but not limited to recommended attainable goals and goal timing, retirement timing, social security and pension claiming strategies, projected and recommended cash flows (spending, savings, taxes, etc.), projected investment balances, recommended account drawdown sequencing, recommended Roth conversion strategies, and recommended investment allocations.

In other aspects, a trading engine (see, e.g., subsystem 2530 of FIG. 25) may communicate with a methodology engine (see, e.g., subsystem 2520 of FIG. 25) daily or through pre-determined triggers and time intervals to execute a financial plan. The trading engine may then update investment allocations for the investor by way of rebalancing the investor's accounts, in addition to scheduling and executing withdrawals, paychecks, or deposits for the investor.

The present embodiments relate generally to modeling future value, and more particularly, to systems and methods for automated financial planning and asset and wealth management, and to systems and methods for financial planning optimization and real-time execution by way of investment management. Embodiments provide systems and methods for optimizing financial plans, generating financial plans that have high utility to the end-investor, and to the execution and implementation of a chosen financial plan in real time by way of asset and investment management.

Conventional financial planning and investment management tools typically present end-users with an analysis of their current and future projected financial state and outlook. These tools may present the individual with a financial plan including: a projected cash flow budget based on user inputs, a metric measuring the likelihood of achieving financial goals, investment recommendations, and projected performance, as well as steps to improve the financial plan.

In measuring the sustainability of financial plans, financial planning tools may use mathematical modeling methodologies such as Monte Carlo simulations to evaluate the plans. In financial planning tools, a Monte Carlo simulation may evaluate the same financial plan cash flow under different random market conditions and assess the number of times the plan succeeds; sometimes referred to as the 'chance' or 'probability of success' of a financial plan.

When generating a financial plan and assessing its sustainability, a financial planning tool typically provides the Monte Carlo simulation with a set of input parameters, such as the expected retirement timing of the individual, expected longevity, and the desired spending, among other possible variables. Investors, asset managers, and financial planners typically input these variables into the tool. The tool then runs a projection to generate a financial plan and the plan's chance of success. Next, the individual evaluates the financial plan output, commonly re-running the tool by adjusting the input parameters, such as longevity estimates, retirement timing, and pension claiming strategies, until the individual is presented with a satisfactory financial plan. The investor then uses the financial plan to guide the investor's investment and planning decisions.

The process of manually adjusting different possible input parameters may result in suboptimal financial plans for the end-investor. Because of the complexity of the mechanisms and accounting process of the tool, an individual may not fully understand the effect each parameter has on the chance of success of a financial plan, and so may compromise on life decisions such as early retirement or desired spending to generate a higher utility plan. Moreover, since the solution space of decisions may be large for an investor who has yet to make a decision on retirement timing, pension claiming strategy, or other financial goals timing, many financial planning tools have technology limitations that make it impossible to solve for optimal decisions for the user. Thus, the conventional financial planning tools resort to either solving the problems in silo or burdening the user with the trial-and-error process of trying different input parameters that may make their financial plan more successful.

Furthermore, in generating financial plans, conventional tools apply broad assumptions that may not account for the investor's circumstances, needs, and preferences. Additionally, conventional financial planning tools may often ignore many personalizable factors that can significantly affect a financial plan. In particular, conventional financial planning software has habitually provided financial plans to investors that:

(1) Ignore accurate modeling of policy and tax implications, such as assuming that an individual's tax bracket is constant over time; failing to model policy rules such as required minimum distributions; or advising on pension or social security claiming strategies without considering the holistic impact on the financial plan.

(2) Apply outdated industry rules of thumb to provide advice, such as the 3-4% withdrawal rule, thus providing individuals with unrealistic or generic advice on how much they should spend, rather than personalizing and adjusting the financial plan to achieve the individual's objectives and lifestyle needs.

(3) Ignore personal factors affecting longevity estimates, such as using an average population longevity estimate rather than customizing the estimate based on an individual's health profile.

(4) Ignore personal factors affecting spending estimates, such as assuming a fixed consumption rate over time rather than personalizing and customizing forecasted spending based on an individual's various categorical spending goals and preferences.

(5) Advise individuals to keep saving and delay retirement even if they cannot afford to do so rather than adjusting the financial plan to attempt to achieve the earliest retirement date possible.

(6) Ignore personalizable account drawdown and Roth conversion strategies that may minimize an individual's tax liability and thus enhance the sustainability of their financial plan.

As a further drawback, conventional investment management industry methodologies may have inefficiencies due to one-size-fits-all methodologies and simplistic assumptions, for example, 100-age or other age-based target date rebalancing strategies. These conventional approaches may also ignore how the individual is invested externally, ignore income streams that offset spending liabilities, ignore that each sleeve of spending may have a different risk tolerance for the investor, and ignore the individual's priorities of achieving multiple financial goals concurrently.

Moreover, many automated investment management solutions may disregard the financial decisions that an individual makes in real-time that may or may not be in line with the individual's financial plan, such as experiencing a spending or income shock. By failing to update the financial plan and investment strategies in real time to respond to this new reality, financial plans quickly become outdated for the end-investor and may no longer reflect realistic financial goals.

Focusing on the individual needs of a user, the systems and methods of the financial planning methodology engine may generate several holistic personalized financial plans that maximize the individual's utility and chance of success in achieving the individual's financial objectives. To accomplish this, embodiments may model a set of "open" life decisions that an individual can make, simulate different financial strategies such as account drawdown sequencing or Roth-conversion strategies, personalize spending and longevity estimates, simulate the financial, policy, and tax implications of each decision, employ innovative money management and investment allocation rebalancing strategies, and report to the individual several high utility financial plans along with recommended actions to execute the plans.

This approach may provide significant and surprising benefits over conventional financial planning tools and investment management methodologies, which typically suffer from the following drawbacks:

Financial planning tools that assess the sustainability of a financial plan either:
  Require the user to manually adjust different decisions such as retirement timing, pension decisions, or other life decisions to assess different financial plans, or
  Recommend decisions to the user by solving the open parameters in silo and not as one holistic problem.
Simplify or ignore modeling of accurate policy or tax laws.
Apply industry rule of thumb methodologies for drawdown strategies and rebalancing strategies that are not effectively personalized and optimized for an individual.
Ignore or implement simplistic assumptions for other personalizable factors such as longevity and spending estimates.
Fail to automate execution of a financial plan in real-time for the end-investor based on:
  real-time market performance and changes to an investor's asset values, and
  real-time financial behavior and circumstances of the investor such as shock withdrawals or deposits into their accounts.

Such events may signify a change in the investor's financial situation. As such, conventional solutions that fail to update an investor of the status of their financial plan as time progresses, or fail to employ dynamic rebalancing strategies, may result in the end-investor having an outdated financial plan.

The present embodiments address the above shortcomings by providing systems and methods for financial planning and investment management, which use one holistic model that may quickly, efficiently, and accurately determine an optimal financial plan with high utility that accounts for personal factors. In embodiments, the systems and methods may quickly process large volumes of data supporting the personalized analysis, by employing iterative or parallelized projections and simulations, and presenting the highest utility financial plans back to the investor. The systems and methods may, for example, simultaneously test multiple financial plans, multiple ages at which to claim social security, multiple ages for retirement date, multiple timings by which to accomplish each different variable timed goal, multiple account sequencing drawdown strategies, multiple Roth conversion strategies, and several combinations of those parameters. To increase computer processing speeds and to minimize memory usage and the costs of computation and networks, embodiments of the systems and methods may incorporate a serverless architecture and unique parallelization and optimization methods, such as methods of concurrent gradient descent, discussed further below.

Thus, unlike conventional financial planning tools, the present embodiments may analyze life, policy, and investment decisions in one holistic, coherent model that determines optimal financial plans of high utility to the end investor, rather than solving the problems for the individual in separate silos or burdening the user with trial-and-error processes. The financial planning generation and optimization process may account for the individual's personal information and circumstances (such as marital, family, health, benefits, financial, and employment profile), may reduce or eliminate industry assumptions that are outdated and unrealistic for the individual (such as projected longevity estimates and spending assumptions), may explore open life decisions that an individual can make that affect a financial plan (such as different retirement dates, different social security claiming strategies, different number of goals attained, different goal timing, different account sequencing drawdown strategies, and different Roth conversion strategies when applicable), and may improve the modeling of policy and tax implications on a financial plan to more accurately measure the sustainability of a plan.

Addressing the drawbacks of conventional planning and investment management tools, the present embodiments provide computer-implemented systems and methods that:
  (1) Automate the financial planning decision making process and optimization of an individual's financial plan by testing many or all possible combinations for different life and investment decision parameters, such as achievable goals, retirement timing, social security and pension claiming strategies, goal timing, account sequencing drawdown, and Roth conversion strategies, among other open parameters; and
  (2) Automate the execution of a financial plan in real-time to account for observed changes in an individual's financial situation.

To achieve more realistic, personalized and dynamic financial plans for the end-investor, embodiments of systems and methods may furthermore:
  (1) Improve the modeling of several policy and tax laws, and continue to update such laws;
  (2) Personalize longevity and spending forecasts; and
  (3) Employ holistic and dynamic rebalancing strategies that improve risk management by accounting for changes in the market, consumer financial behavior, projected income and spending cash flows, financial goal priorities and real-time goal achievements, as well as externally managed investment strategies.

Embodiments may provide systems and methods for sustaining the value of assets over a given period, and accounting for the particular individual, public, and market dynamics associated with the assets. In addition, embodiments may provide systems and methods for administering a financial plan for an individual investor.

In particular, the present embodiments may provide systems and methods for financial planning and investment management. In implementations, embodiments may provide systems and methods for automating the financial planning decision making process by generating a plurality of plans, optimizing financial plans by selecting plans with high utility for the end-investor, and executing a financial plan in real time by way of asset and investment management.

In embodiments, systems and methods may furthermore employ a money management methodology that is modeled and executed for the individual as part of the individual's financial plan whenever applicable, for example, if the individual's forecasted financial situation permits it (such as a savings opportunity), or the individual has invested with the administrator of the system and/or method. The approach may help individuals achieve their financial objectives in a more efficient and successful manner (e.g., as measured by a chance of success metric in a Monte Carlo simulation). In contrast to conventional approaches, the systems and methods of the present embodiments may implement money management methodologies that are differentiated in one or more of the following ways:
  (1) A dynamic rebalancing methodology as defined by the Risk Composition method, discussed below. Risk Composition may be defined as a liabilities-driven risk, money, and investment management approach (e.g., liabilities may have different risk profiles, and money not allocated to a liability may have a risk score) that accounts for income streams and projected cash flows.

(2) A holistic portfolio modification rebalancing strategy that modifies the investment methodology of the plan administrator to account for assets and holdings of an individual in external accounts not managed by the plan administrator.

I. Embodiments of Overall System Architecture and Methodology

Figure 12:
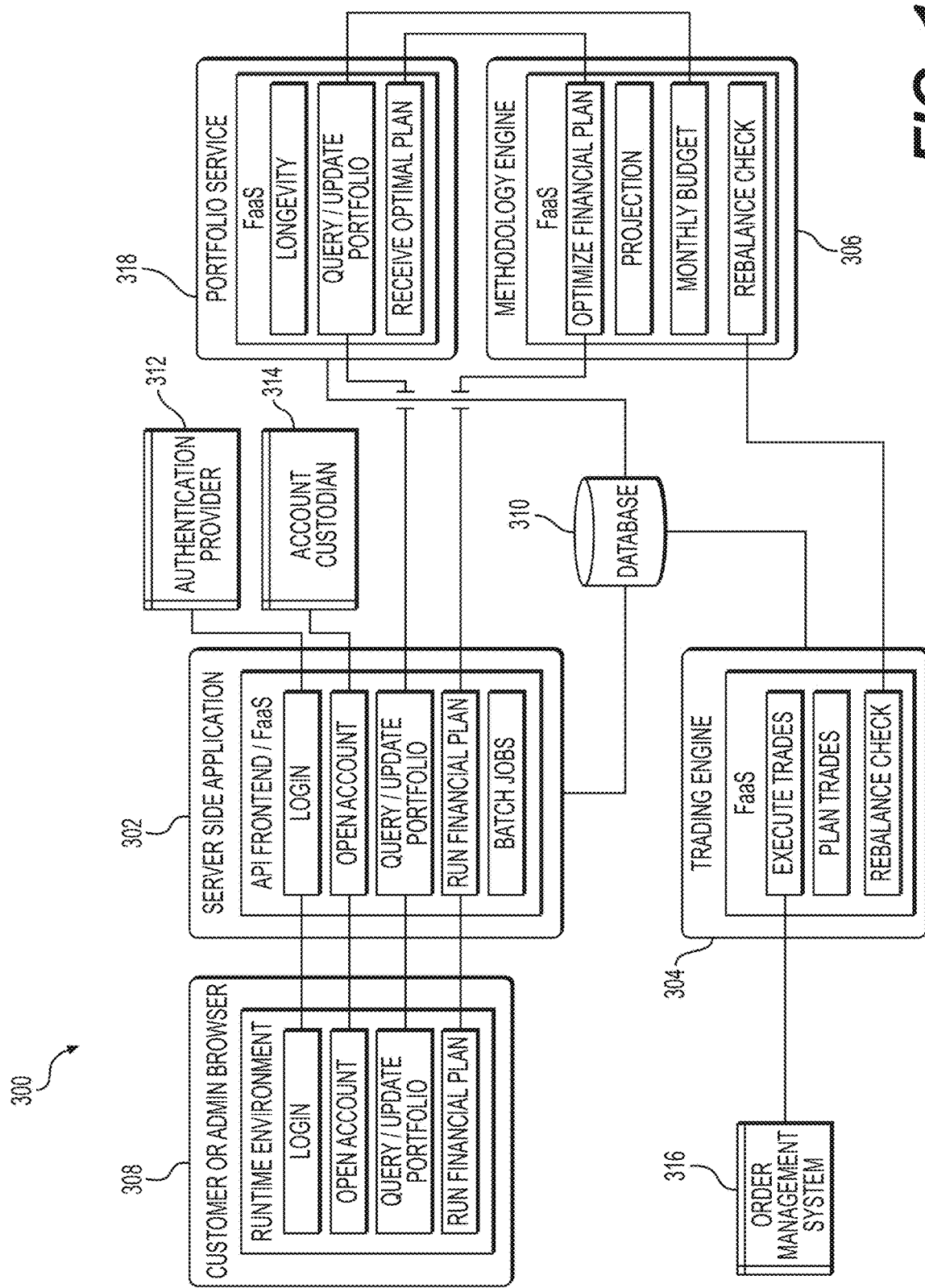
FIG. 12 is a schematic diagram illustrating embodiments of an application architecture for a system for optimizing and executing financial plans.

Referring to FIGS. 12 and 25, for example, embodiments of the methods and systems described herein may utilize various computer software and hardware components, including but not limited to, servers, desktops computers, databases, computer-readable media, input/output devices, wired and wireless networking components and other components, as would be known and understood by a person skilled in the art. Embodiments provide systems for implementing a method for determining an optimal financial plan for a particular investor, such as method 100 of FIG. 1A. In an embodiment, FIG. 12 illustrates a system 300 for determining an optimal financial plan. As shown, system 300 may include an application programming interface (API) 302, a client browser 308 in communication with API 302, a methodology engine 306 in communication with API 302, and a trading engine 304 in communication with methodology engine 306. System 300 may further include a database 310 accessible to API 302 and trading engine 304, and an order management system 316 in communication with trading engine 304. System 300 may also include an authentication provider 312 and a custodian 314, both in communication with API 302.

It should be understood that system 300 is only one example of a suitable networked environment for implementing methods described herein and is not intended to suggest any limitation as to the scope or functionality of the present disclosure. For example, in some embodiments, there may be more or fewer devices, or components depicted in FIG. 12 may be combined into a single device. For example, API 302, methodology engine 306, and database 310 may be physically located on the same device, and still function as described herein.

Components of system 300 may be connected to one or more networks for communication. Networks may be wired, wireless, or a combination of wired and wireless. For example, in some embodiments, certain components may be connected to a public data network such as the public Internet. In other embodiments, some components may communicate via a wireless network such as a mobile or cellular network. In at least one embodiment, a network exemplifies a combination of wired and wireless, where a wireless enabled mobile device may communicate with API 302 and/or client browser 308 via both a cellular network and a public data network.

In embodiments, components of system 300 may be provisioned on computers, which may include processors for processing data and serving data in the form of, for example, webpages, mobile portal applications, or other related software and data structures, to service devices having various functionalities. A processor may further include one or more processors, processing circuits, or controllers, and may be coupled to memory, which stores code (machine-readable or executable instructions) for performing the methods described herein. In at least one embodiment, memory may include computer-executable instructions for processing. In addition, as would be understood by those skilled in the art, system 300 may include additional components for operation, such as RAM, ROM, and/or input/out mechanisms (such as a keyboard, mouse, display, etc.).

A processor may include one or more local or distributed processors or controllers, and may be configured as a special purpose computer with processing logic for receiving and serving data. Memory may comprise one or more electronic, magnetic, or optical data-storage devices. Logic may include machine readable and/or executable instructions sets for performing and/or facilitating performance of methods and rendering graphical user interfaces as further described herein, including sharing one or more portions of this functionality in a mobile device portal application architecture, over a wireless or wireline communications network with one or more devices. Processing logic may be embodied in a variety of known languages as would be understood by those skilled in the art.

Databases described herein, such as database 310, may include one or more separate databases. Further, as would be understood in the art, a database may include one or more electronic, magnetic, optical data-storage devices, or other data-storage devices which can include or are otherwise associated with respective indices.

As shown in FIG. 12, API 302 may be in communication with client browser 308, database 310, authentication provider 312, account custodian 314, methodology engine 306, and portfolio service 318. In particular, API 302 may include one or more of the following communication channels:

Accessible to user agent via subdomain;
Manages CSRF token in sessions to prevent exploitation by "confused deputy" attack;
Direct connection to main database; and
Permission to reach out to third-party services listed in interoperability.

API 302 may include, for example, a set of subroutine definitions, protocols, and tools. As shown, API 302 may include a login function, a check balances function, an open account function, a run financial plan function, and a batch job function. In particular, API 302 may include one or more of the following components:

Login and Session management;
Impersonation;
User account storage;
Interoperability;
Authentication provider;
Account custodian;
Methodology;
Trading; and
Scheduled jobs.

In embodiments, API 302 may include one or more of the following deployment features:

Code is transpiled and minified;
Artifacts are published to storage service;
Configuration is published to configuration service;
Configuration service deploys artifacts to virtual hosts; and
Secrets requested from secure parameter store at runtime.

As shown in FIG. 12, client browser 308, which may also be considered the user frontend, may be in communication with API 302 and may provide a user interface, such as a graphical user interface, through which a user (e.g., investor or administrator) may access and control API 302. In particular, client browser 308 may include one or more of the following communication channels:

All functions call a corresponding API component;

Permissions are restricted by the user agent's security model; and

Cross-site request forgery is prevented by a cookie-to-header token.

As shown, client browser 308 may include a login function, a check balances function, an open account function, and a run financial plan function. In particular, client browser 308 may include one or more of the following components:

Login and session management;
Impersonation;
Administrator state repository;
Initiate actions;
Open account; and
Run financial plan.

In embodiments, client browser 308 may include one or more of the following deployment features:

Code is transpiled and minified;
Artifacts are published to storage service;
Caching service reads contents from storage service; and
Loaded directly to user agent.

As shown in FIG. 12, trading engine 304 may be in communication with methodology engine 306, database 310, and order management system 316. In particular, trading engine 304 may include one or more of the following communication channels:

Access to methodology engine 306;
Access to main database 310; and
Access to order management system 316.

As shown, trading engine 304 may include a rebalance check function, a plan trades function, and an execute trades function. In particular, trading engine 304 may include one or more of the following components:

Rebalance checks;
Trade planner;
Trade executer; and
Scheduled jobs.

In embodiments, trading engine 304 may include one or more of the following deployment features:

Code is archived and optimized;
Artifacts are published to storage service;
Configuration is published to configuration service;
Configuration service deploys artifacts to virtual hosts; and
Secrets requested from secure parameter store at runtime.

As shown in FIG. 12, methodology engine 306 may be in communication with API 302, trading engine 304, and portfolio service 318. In particular, methodology engine 306 may include one or more of the following communication channels:

May be called by API 302 and trading engine 304; and
Internal queue manages distribution of tasks to optimizer.

In embodiments, methodology engine 306 implements steps 104 through 108 of method 100 (FIG. 1A), including the execution of the planning simulation, the analysis of the simulation results, and the determination of optimal financial plans. As shown in FIG. 12, methodology engine 306 may include a spending curve estimate function, a longevity estimate function, a rebalance check function, and a run financial plan function. In particular, methodology engine 306 may include one or more of the following components:

Projection worker;
Optimizer;
Simulation variants;
Timeline;
Allocation; and
Financial plan.

In embodiments, for all of the methodology engine's components except for the optimizer, methodology engine 306 may include one or more of the following deployment features:

Code is archived and optimized;
Artifacts are published to storage service;
Configuration is published to configuration service;
Configuration service deploys artifacts to virtual hosts; and
Secrets requested from secure parameter store at runtime.

For the optimizer, in embodiments, methodology engine 306 may include one or more of the following deployment features:

Code is built on virtual instance;
Image of virtual instance deployed to container repository; and
Container service does redeploy of new virtual instance to a fleet of real systems that are managed in a datacenter.

Embodiments of methodology engine 306 may execute, analyze, and optimize financial plans using improved data processing techniques, which maximize processing speed and minimize memory and processor usage. To that end, methodology engine 306 may include one or more of the following services:

A portfolio service that may manage the domain specific details of a client portfolio;
A projection service that may include:
A planner that collects actions to perform within simulation, and
An executor that executes those actions and returns output;
An optimization service that may include:
A permuter that considers possible plans,
A distributor to push the work out to individual computers,
A utility function to evaluate results, and
A result sink to collect the responses and track which settings are optimal;
A second, more advanced optimization service that may modify the optimization service, and may include:
A problem space object to choose an initial guess and then neighboring candidates; and
A distributed concurrent gradient descent process to continuously "move" through the problem space until no better result is available.
The problem space represents the 'n' different open parameters as vectors in an n-dimensional space. At any point in this space, a utility function may represent the preference of that point over any other. As an example, if n=2 and utility is represented as altitude, this may be considered as analogous to determining a highest peak in a region of land.

Portfolio Service:

In embodiments, there may be several different conceptual models relating to a user's portfolio, such as:

The user's understanding of what the user's portfolio is;
The user's understanding of what the user would like to change;
The legal details that must be reported to the government;
The technical details necessary for simulation of the portfolio; and
The business details needed to make trades.

In order to centralize the definition and business logic relating to this information, a portfolio service may be responsible for storing it, enforcing certain invariants, and performing queries and mutations.

Figure 13:
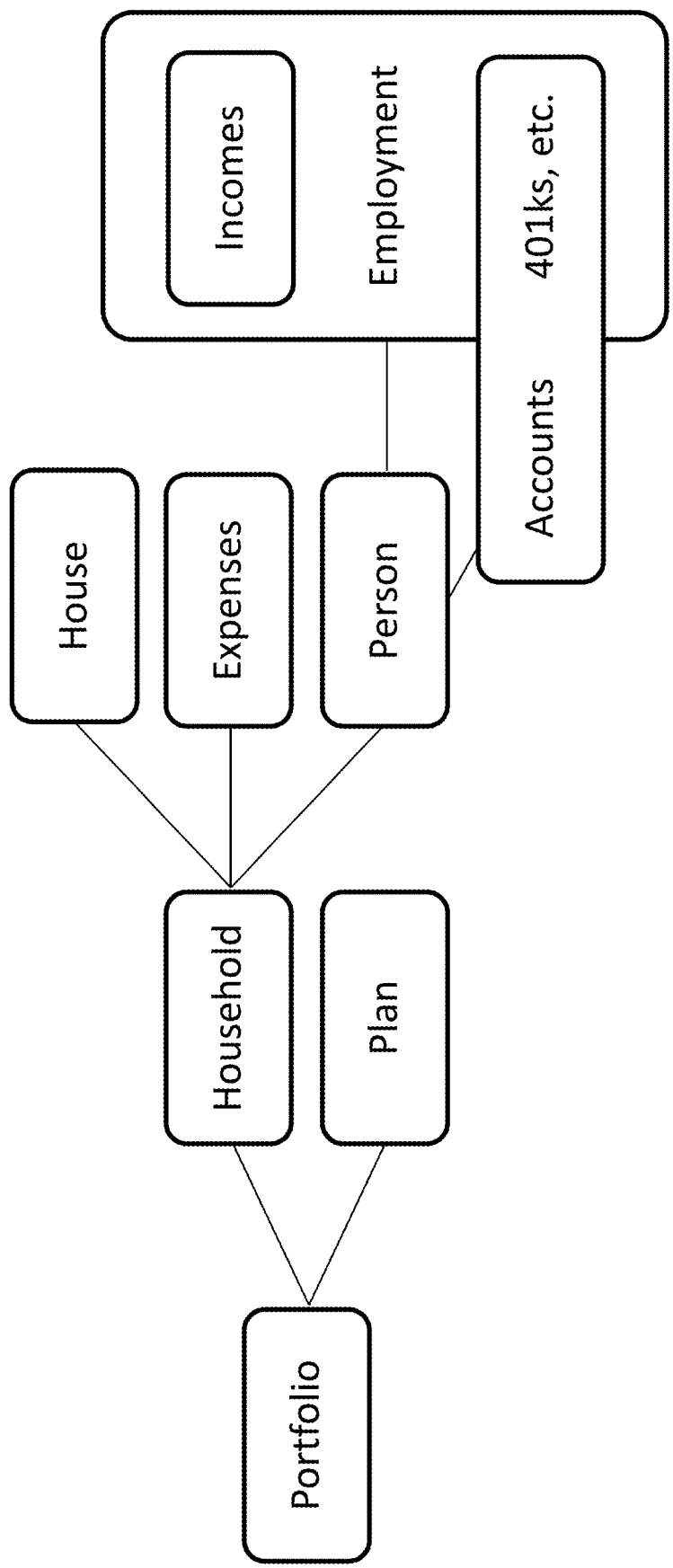
FIG. 13 is a diagram of exemplary high level objects of a portfolio service, according to an embodiment.

FIG. 13 illustrates exemplary high-level objects and their relations to each other, according to an embodiment. For example, a given Portfolio may contain a Household and a Plan, and the Household may include some number of Houses, some number of Persons, etc.

In embodiments, the portfolio service may provide several methods:

Create: Constructs an empty portfolio and returns an identifier;

Query: Gets information about either the accepted plan or the pending plan;

Update: Sets the portfolio into pending mode and adds some changes:

Lock for run: Obtains the data the methodology engine 306 needs to run the plan, and sets the portfolio into the locked mode;

Post results: Updates the plan with the results of the run, and sets the portfolio into the Review mode; and Accept: Sets the accepted plan to the pending plan and clears the pending changes.

In embodiments, if a caller is constructing a new Portfolio, the caller can do so by issuing a Create call. Queries may invoke objects that are then populated by data from the database and construct a result payload. This process may be recursive, so that if additional detail is needed about a related object, the query object may contain a subquery object. As the call stack completes, the contained objects may then be composed into their containers.

In embodiments, an update call may contain mutations. These mutations may be structured similarly to query objects but contain data changes. When a mutator request is detected, a transaction may be opened with the database. The data object may issue insert, update, or delete commands within the scope of the transaction. When the request is fully recursively evaluated, the service may attempt to commit the change and return either a success code or any errors detected. In the case of any errors, the transaction may be rolled back.

In embodiments, the portfolio service may allow for synthetic query objects. Query objects, in particular, may not have a one-to-one correspondence to data in the database. A caller may request specialized query objects that are not directly represented in the database. For example, a user might have filled out data relating to the user's social security account. A caller might request a schedule of social security decisions the user has. The engine may need this information to optimize social security, and the frontend user interface may need this information to issue recommendations to the user.

Figure 14:
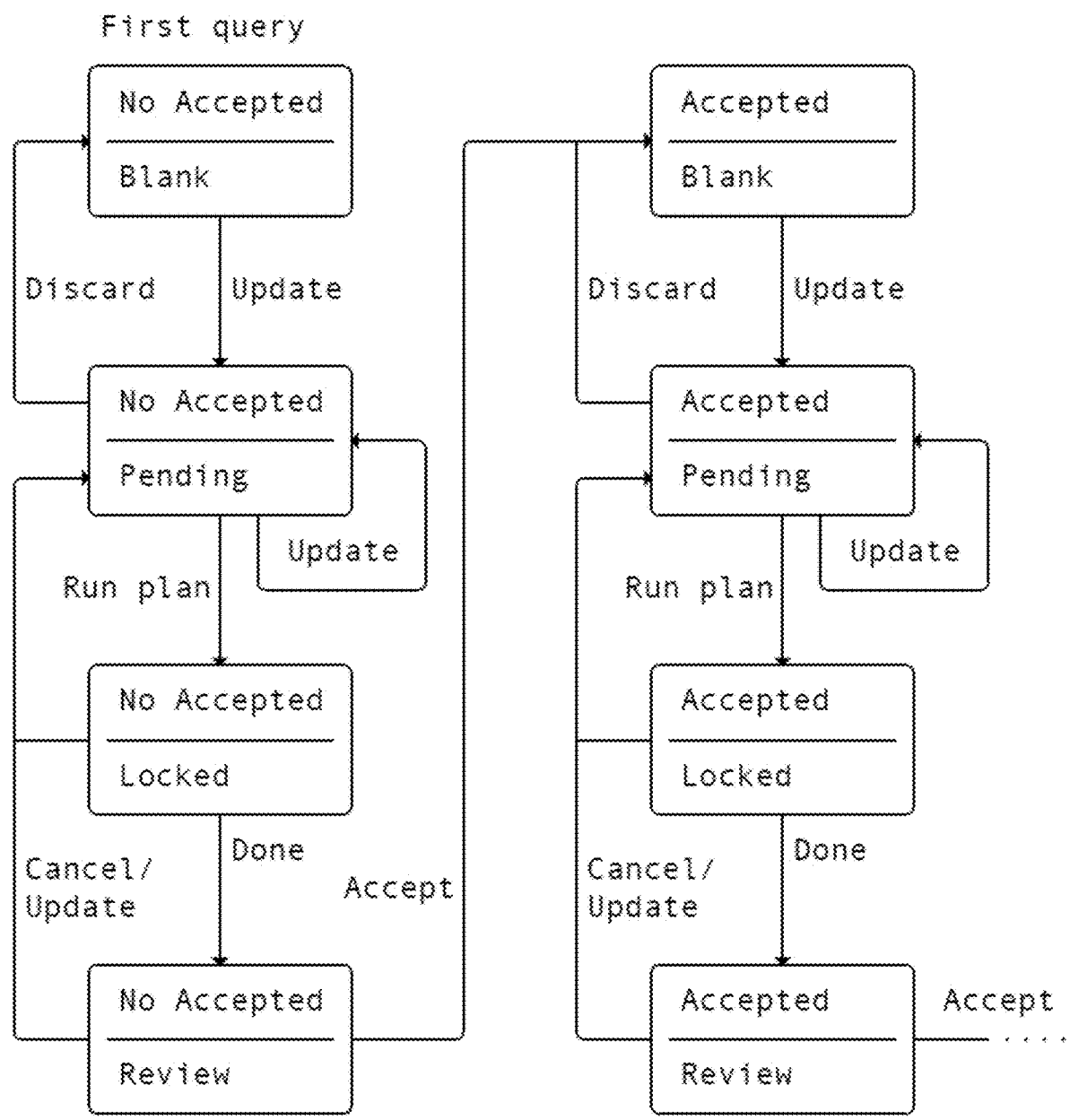
FIG. 14 is a schematic diagram illustrating an embodiment of a pending/accepted lifecycle of a financial plan.

In embodiments, the portfolio service may provide a method for managing a financial plan through a "pending/accepted lifecycle." In order for a user to make an informed decision, a user may need to compare changes under consideration to the user's currently accepted plan. To simplify the possible states, the portfolio service may maintain two financial plans: (1) an accepted plan; and (2) a pending plan. Either financial plan may be in a "blank" state. In an embodiment, FIG. 14 illustrates a pending/accepted lifecycle, showing how a financial plan is first constructed and how user changes are then accepted. As shown, an embodiment of the method may include:

1) A caller (generally the API 302 or frontend service 308) may issue a first Create call and receive a token;
2) The caller may issue update calls that affect the pending plan;
3) The caller may request that the engine run the plan;
4) The engine may call the portfolio service to lock the plan:
   a. This may be to ensure that simulation results correspond to the present state of the pending plan, and
   b. The lock may be broken at any time, but the simulation results may be invalidated;
5) The engine may post its results, putting the portfolio in review status;
6) The caller may continue to update the portfolio (this may put the portfolio back in pending status);
7) Or the caller may accept the portfolio (this may move the pending plan into the accepted slot and set the pending slot to blank); and
8) The caller may again request an update to the portfolio (this may copy the accepted plan to the pending slot and update the status to pending).

Network:

Referring again to the system 300 of FIG. 12, further embodiments may provide systems and methods for networking the system components. In an embodiment, a networking system may include a main network and an optimizer network.

Figure 20:
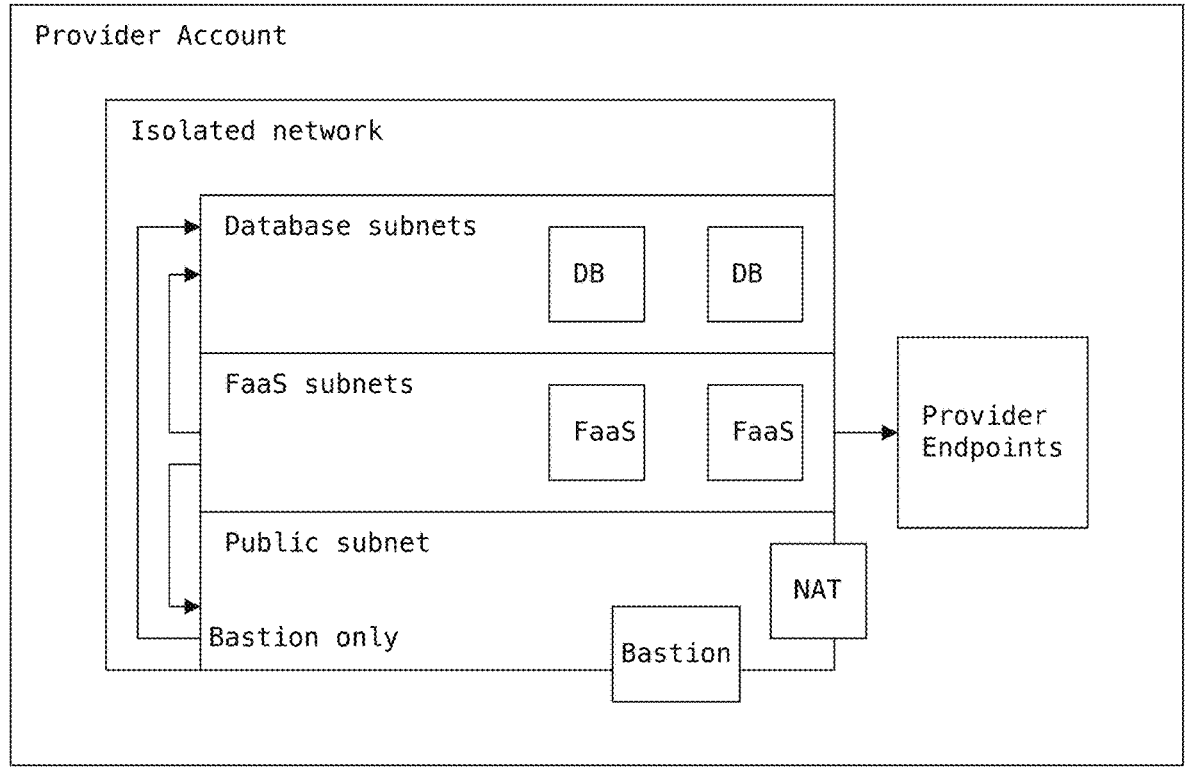
FIG. 20 is a schematic diagram illustrating an embodiment of a main network.

A main network may provide a single isolated network on which the networking for the API 302, trading engine 304, and methodology engine 306 all operate. FIG. 20 illustrates an embodiment of a main network. As shown, the main network may be broken into many subnets that are distributed across geographically close but independently available physical datacenters. The main network preferably has independent internal routing.

In the main network, public subnets may provide outgoing-only access to the Internet via a stateful port address translation instance. PAT (Port Address Translation) is more commonly known as network address translation. PAT is stateful because once a connection is established to a service, it will keep the incoming port address translation rule until the connection is lost.

All function as a service may be instantiated within dedicated FaaS (Function as a Service) subnets that require connectivity to:

connect to the database instances in the database subnets;
other services the provider offers such as storage, distributed queuing internal authentication, metrics, etc.; and
services on the public Internet, such as:
an authentication provider, and
an account provider.

The FaaS subnet may access provider services through provider endpoints that do not route through the public Internet. All database subnets may be unable to make outgoing connections, accepting connections only from the FaaS subnet and the bastion instance specifically (assuming the database is a managed instance that has a provider-side administrative connection.) The bastion instance may be specifically hardened to allow tunneling of connections from the on-premises network to the database for administrative work.

Figure 19:
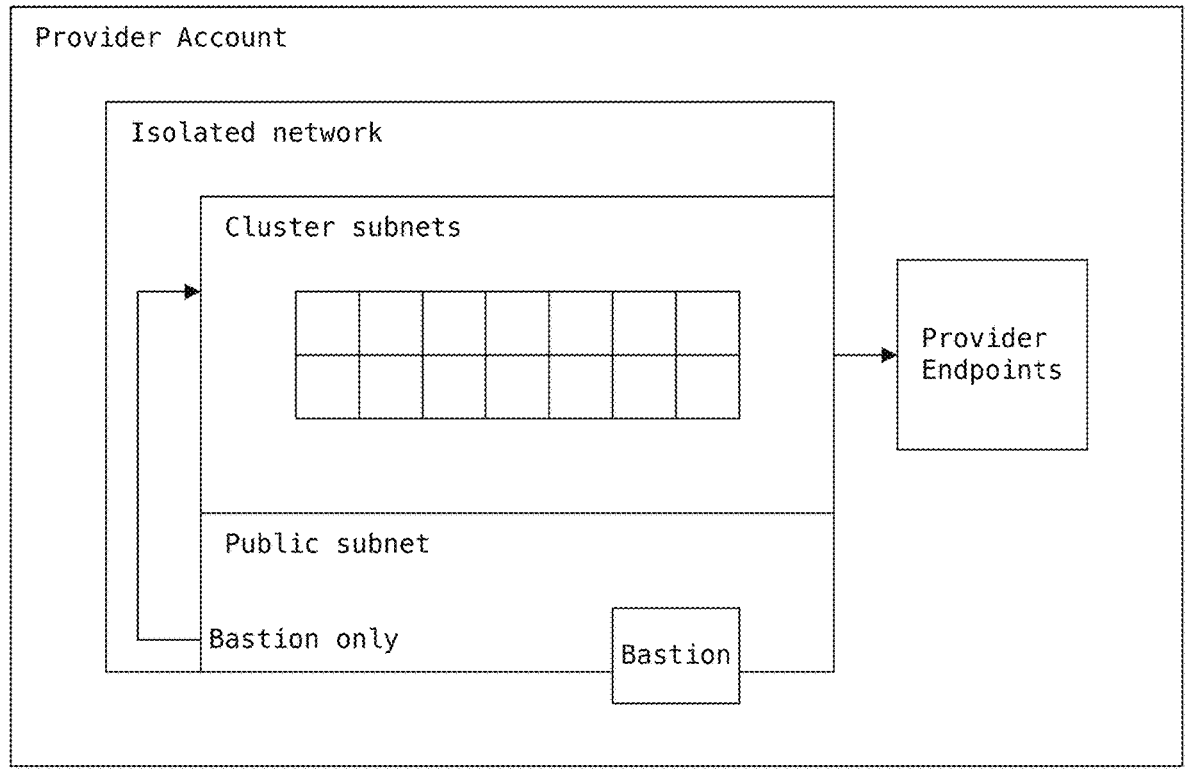
FIG. 19 is a schematic diagram illustrating an embodiment of an optimization network.

FIG. 19 illustrates an embodiment of an optimizer network. An optimizer cluster may have a design simpler than that of the main network because the optimizer cluster has no routing to the public Internet. An optimizer network may only need to connect to provider services, e.g., a pair of distributed queues to receive payloads and place responses. Cluster nodes may have routing internally to distribute work. A bastion may be on the public subnets to enable administrative and diagnostic access to the cluster instances.

These systems and method for networking may provide benefits in handling different stages of deployment. In embodiments, the networking design may allow for multiple stages with options for increasing isolation of stages to prevent issues in the production environment. In particular, the production environment may be loaded on a completely isolated provider account that is logically distinct from the development account, with entirely separate credentials, domain name, and x509 certificate. The development environment, on the other hand, may also host individual developer stages so that developers can test fixes on their own copies of the database or their own copies of the service without having to set up a completely new instance of the service.

II. Embodiments of Financial Planning Engine (e.g., FIG. 25, 2520)

A. Embodiments of Methods

As discussed earlier, referring to FIG. 12, the methodology engine 306 may be responsible for generating and optimizing financial plans, as well as assisting with execution of a financial plan by way of communication with the API 302 and the trading engine 304.

To execute a financial plan in real-time, the methodology engine 306 may be, for example, called by API 302 to re-run an accepted plan for an investor and provide an updated chance of success. The methodology engine 306 may furthermore be called by the trading engine 304 with updated account balances to perform a rebalance check and supply the trading engine 304 with an updated target portfolio.

Figure 1A:
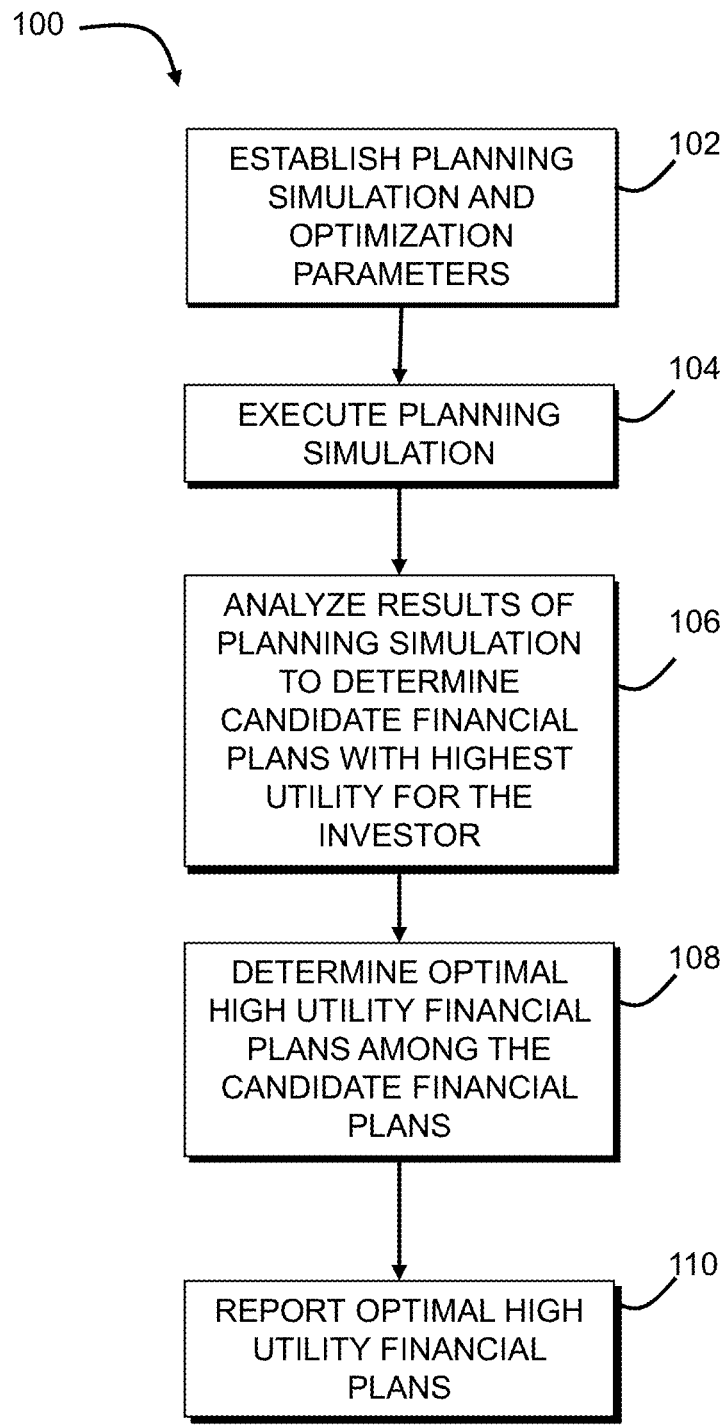
FIG. 1A is a flowchart illustrating an embodiment of a method for determining optimal high utility financial plans for a particular investor.

To automate the financial planning decision making process, the methodology engine 304 may employ, for example, method 100 as shown in FIG. 1A, and in more detail in FIGS. 2-8. This financial planning methodology is discussed in further detail in the "Embodiments of Financial Planning Decision Optimization Methodology" section below. Next discussed are the embodiments of systems and methods of the methodology engine implementing this financial planning process.

B. Embodiments of Financial Planning Decision Optimization Methodology

The automation of the financial planning decision making process may be described using several embodiments. In particular, the methodological steps of establishing open parameters, iterating over different combinations of decisions, simulating outcomes of those decisions, and selecting optimal financial plans using a utility function may vary in order. FIGS. 1A and 2-8 illustrate just one possible ordering of a step by step process. Other orders are possible.

FIG. 1A illustrates a method 100 for determining optimal financial plans with high utility for a particular investor, according to an embodiment. As shown, method 100 begins with a step 102 of establishing planning simulation and optimization parameters. The parameters may include, for example, the longevity for the user and the user's spouse (if applicable), the income streams with given time frames and inflation rates dependent on the source of income stream, the current and future costs of all goals, the rank order of the goals, a financial plan for achieving each goal, and a set of open life decisions for each financial plan.

Figure 2:
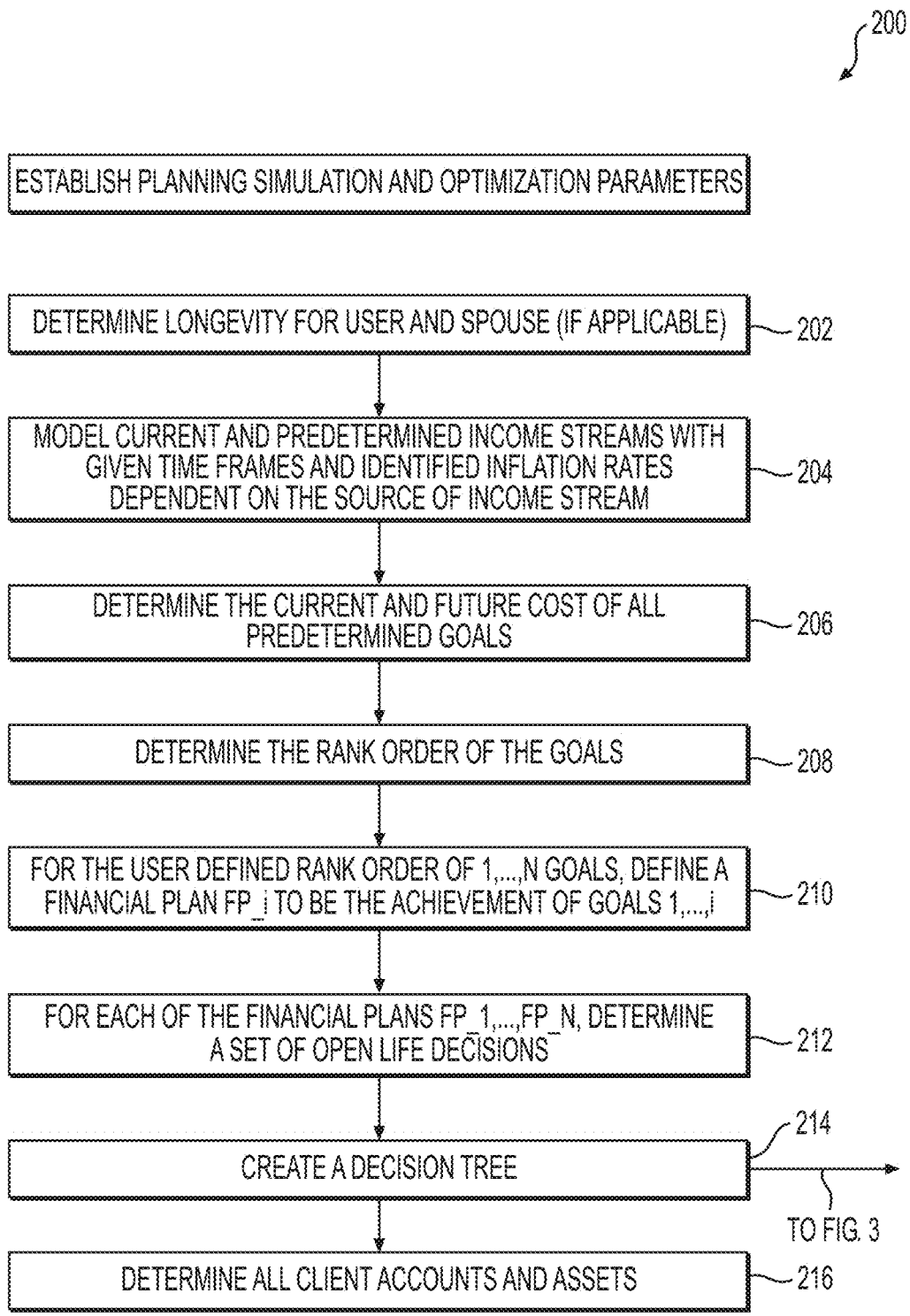
FIG. 2 is a flowchart illustrating an embodiment of a method for establishing planning simulation and optimization parameters.

In an embodiment, FIG. 2 illustrates and describes a method 200 for establishing planning simulation and optimization parameters. As shown, in step 202, the longevity for an investor and the investor's spouse (if applicable) may be determined using a longevity model, which may estimate longevity based on a health profile and/or by user input (see, e.g., FIGS. 21 and 22). The longevity may determine the ending of certain events in the simulation and the end of the simulation timeframe, which may also be the beginning of an event such as bequest goals.

Method 200 continues to a step 204, which may model current and predetermined income streams with given time frames and identified inflation rates dependent on the source of income stream. In an embodiment, an income stream may be onetime income streams, recurring within time intervals, curvilinear in shape or not, or occurring at customizable frequency. Each income stream may have its own inflation rate (see, e.g. FIGS. 23 and 24).

In step 206, method 200 continues by determining the current and future cost of all predetermined goals. The models may be different for each goal type, as defined in an associated goal or spending profile (see, e.g., FIGS. 22 and 23). In embodiments, the future value of goals that do not have specified time periods may be inflated for all potential time periods. This adjustment may be part of the simulation as the optimal time period for that goal to occur is sought. In embodiments, each goal may have its own start and end date and may have its own inflation rate. These can be one time liabilities at specific times, recurring within time intervals, curvilinear in shape or not, or occurring at customizable frequency. Each liability may have a risk score defined by the user input. Each user may be asked to rank order their goals from most important to achieve to least important.

Method 200 continues to a step 208 by determining the rank order of the goals. This rank order may be determined from user input (see, e.g., FIGS. 22 and 23).

In step 210, method 200 continues by defining, for the user defined rank order of 1, ..., N goals, a financial plan FP_i to be the achievement of goals 1, ..., i. As an example, if an investor has ten goals, then the number of financial plans equals ten. Some examples of these are: Financial Plan #1: Goal 1; Financial Plan #2: Goals 1 and 2; Financial Plan #3: Goals 1-3; etc. In embodiments, the number of financial plans to be simulated may be constrained by relying on the investor's rank-ordering of the goals. That constraint may be implemented under the assumption that the investor wants to achieve goals in the preferred sequence the investor has identified.

In step 212, method 200 continues by determining, for each of the financial plans FP_1, ..., FP_N, a set of open life decisions. Life decisions may be decisions that the investor (a) has already made, or (b) has yet to make. In cases in which the investor has already made a life decision, the values may be taken as fixed going forward in the planning simulation. In alternative embodiments, post-simulation, the values may be open for the investor to modify. In cases in which the investor has yet to make a life decision, the ideal activation dates of the life decisions may be simulated in the planning simulation. In embodiments, life decisions may be: (1) social security claim date; (2) retirement date; and (3) goal timing (this may only apply to those goals for which the investor has indicated the investor wants to accomplish a specific goal within a defined time period but where no specific time period has been provided). As an example of life decisions yet to be made, if an investor has not yet claimed social security benefits, then different claims dates (e.g., ages 62-70) may be simulated to assess which date is ideal.

With the various parameters determined through steps 202-212, the method 200 may continue to a step 214 in which a decision tree is created. In embodiments, a decision tree may include all possible combinations in the following order: (1) social security timing (and its deterministic estimate, drawn from, e.g., models for social security claim dates an estimates); (2) retirement date possibilities (drawn from, e.g., a retirement date recommendation model); and (3) $1^{st}$ undetermined time goal possible date ranges, $2^{nd}$ undetermined time goal possible date ranges, . . . , last undetermined time goal possible date ranges (drawn from, e.g., calendar ranges collected from a user from a spending target module for undetermined time goals).

Figure 3:
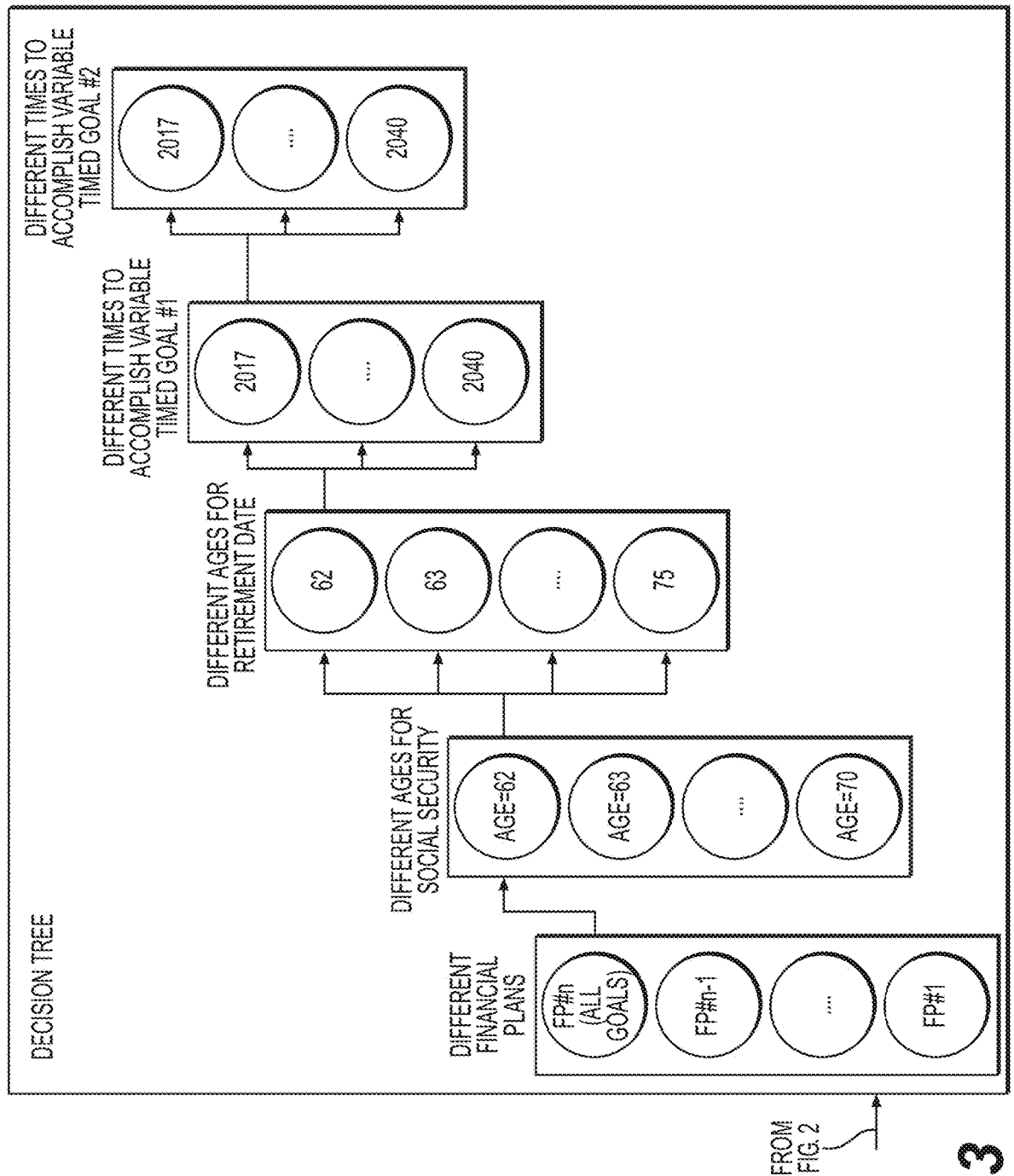
FIG. 3 is a schematic diagram of an embodiment of a decision tree.

In an embodiment, FIG. 3 illustrates an example of a decision tree that could be created from step 214. As shown, a decision tree may cover all possible paths in a planning simulation, including different financial plans, different ages at which to claim social security, different ages for retirement date, and, for each variable timed goal (#1, #2, . . . #N), different times to accomplish the variable timed goals.

With a decision tree established, method 200 may conclude by determining all client accounts and assets in step 216, which will be input into the planning simulation, discussed below. This may also mark the completion of step 102 in FIG. 1A, with inputs and parameters established and optimized for the planning simulation.

Referring again to FIG. 1A, method 100 may continue to a step 104 in which the planning simulation is executed. The details of this step are shown in the flowchart of FIGS. 4-7, illustrating an embodiment of a method 400 for executing a planning simulation. As shown, method 400 may begin at a step 402 in which a financial plan is chosen. The financial plan may be chosen from the plurality of financial plans defined in a decision tree, for example, through steps 210-214 of FIG. 2 and the decision tree shown in FIG. 3. As an example, for an investor with five goals, with one variable goal (e.g., wanting to accomplish the goal before age 80), one financial plan may include all five goals. In addition, a selected decision tree path for the financial plan may assume a social security claim date of 63, a retirement date of 62, and an age at which the investor will accomplish the goal of 74.

In embodiments, method 400 may run through all financial plans defined in method 200 of FIG. 2 and all decision tree options (or combinations), and may begin by simulating one financial plan at a time, starting with the financial plan that includes all of the investor's goals. In alternative embodiments, processes may be applied so that not all of the decision trees for each of the different financial plans must be simulated. Embodiments of those alternative processes may be done by way of an optimizer and concurrent gradient descent, as discussed below.

With a financial plan chosen, method 400 may continue in a step 404 in which one of the decision tree paths for the chosen financial plan is selected. Then, in step 406, social security income may be added if that income is part of the chosen financial plan and decision tree path for the year being simulated. This addition of social security income may be accomplished using an associated social security model, which may be associated with a social security benefits object or profile (see, e.g. FIG. 22).

The method 400 may continue in a step 408 by selecting the first year or next year in the chosen financial plan and decision tree path.

With those parameters set, method 400 may continue in a step 410 in which a risk composition score is determined. As used herein, a risk composition score may be the liability-weighted risk score for the investor across all of the investor's different goals within the chosen financial plan being simulated for each of the years in the simulated financial plan. In embodiments, risk composition score may vary over time for an investor, depending, for example, on the goals that are being accomplished in the simulated path. As an example, an investor may be comfortable with a high risk strategy to go to Paris (goal), but a low risk strategy elsewhere, and then, after going to Paris (accomplishing the goal), the investor's risk composition score will become less risky. In embodiments, a risk composition score may be determined using an associated risk composition model, which may be associated with a risk tolerance and capacity object, as discussed in further detail below.

Method 400 may continue in step 412 by determining an ideal target portfolio. In embodiments, an ideal target portfolio may be determined using an associated portfolio selector engine, which may be associated with a portfolio selector object.

In step 414, method 400 may continue by determining external account portfolios. In embodiments, external account portfolios may be determined using an associated external account portfolio model, which may be associated with a financial accounts and investments object (see, e.g. FIG. 24). In embodiments, at this point in method 400, the administrator may begin a process of creating the investor's portfolio to be managed by the administrator, adjusting the ideal portfolio, for example, for external accounts holdings, home sales, social security, and do-not-sell holdings. Accordingly, in step 416, method 400 may continue by determining the do-not-sell holdings inside of the investor's administrator-managed accounts, which may be held, for example, in a brokerage account of the administrator. As an example, an investor may mark that the investor does not want to sell a particular stock holding that the investor has rolled over into an administrator-managed brokerage account.

Figure 5:
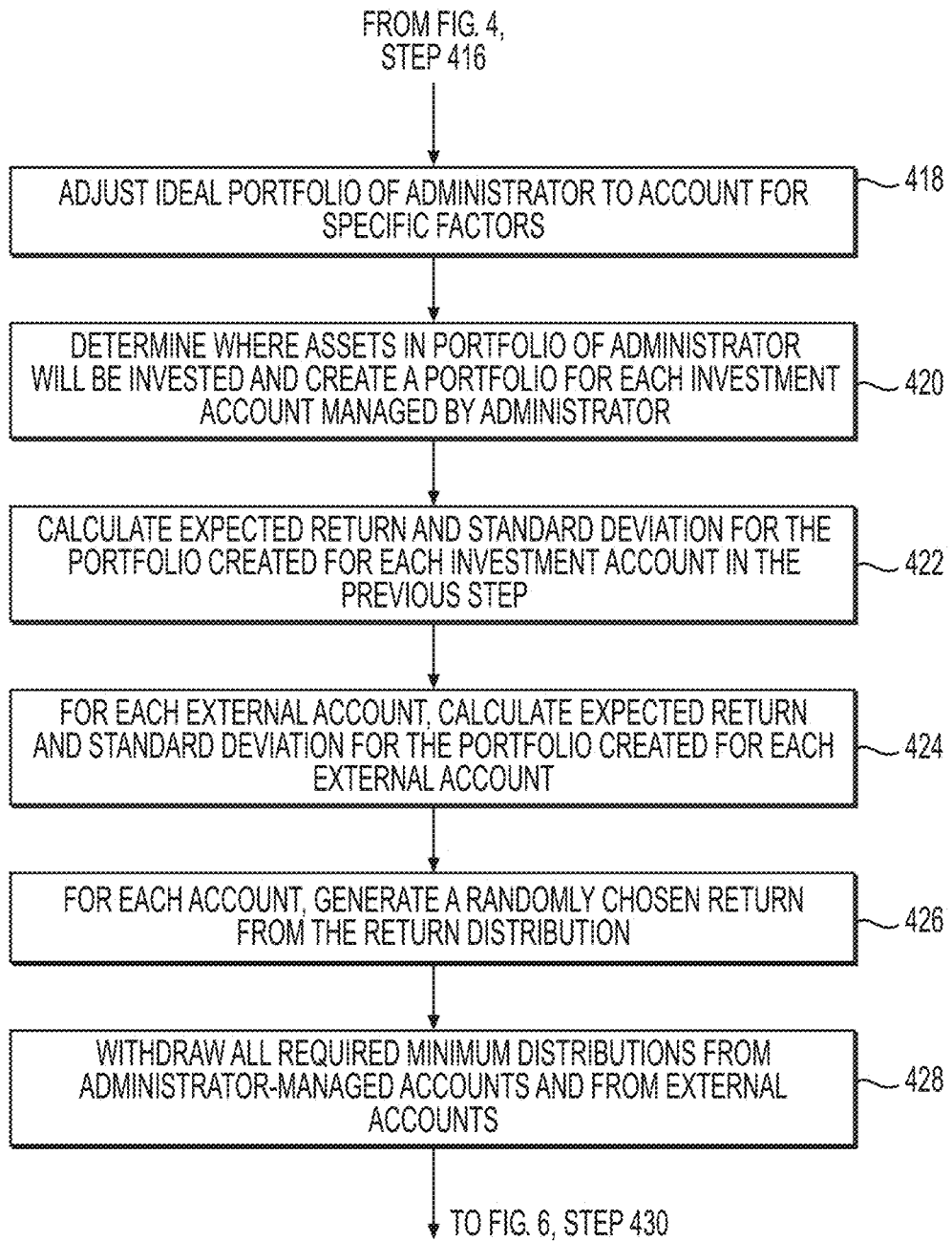

Referring now to FIG. 5, method 400 may continue in a step 418 in which an ideal portfolio of the administrator may be adjusted to account for factors such as external holdings, do-not-sell holdings, social security benefits for the chosen financial plan and the decision tree path being simulated, and a home sale date if applicable. In embodiments, this adjustment may be accomplished using an associated portfolio modification model. At this point in method 400, a portfolio has been created for the chosen financial plan and the decision tree path being simulated. In embodiments, that portfolio may adjust over time based on goal fulfillment.

In step 420, method 400 may continue by determining where assets in the portfolio will be invested and by creating a portfolio for each investment account managed by the administrator. In embodiments, the investments and portfolio may be determined using an associated asset location model, which may be associated with an asset location object, as shown in FIG. 5. In this manner, step 420 may create the portfolio of investments that will be held in each investor account managed by the administrator Method 400 may continue in step 422 by calculating the expected return and standard deviation for the portfolio created for each investment account managed by the administrator (from step 420). These administrator-managed portfolios may change over time, based on rebalancing and goal obtainment.

In step 424, method 400 may continue by calculating the expected return and standard deviation for each external account, for the portfolio created for each external account.

In embodiments, steps 422 and 424 may be accomplished using capital market assumptions, which may be associated with a capital market object.

Method 400 may continue in step 426 by generating, for each account, a randomly chosen return from the return distribution. Then, in step 428, all required minimum distributions may be withdrawn from the administrator-managed accounts and from the external accounts. In embodiments, the withdrawals may be accomplished using an associated required minimum distribution model, which may be associated with a required minimum distribution object.

Figure 6:
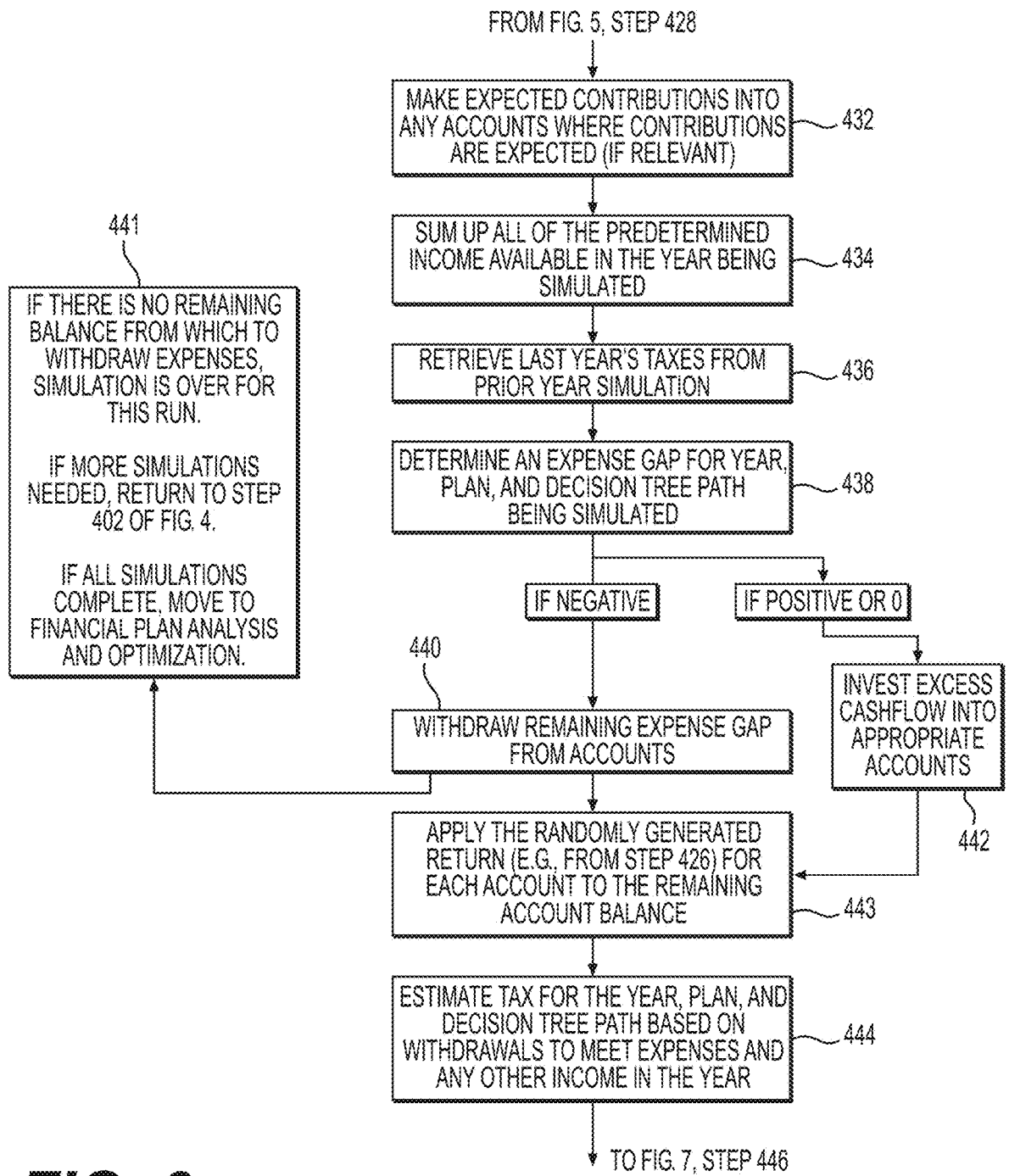

Referring now to FIG. 6, method 400 may continue in a step 432, by making expected contributions into any accounts where contributions are expected (if relevant). In embodiments, the contributions may be made using an associated account contributions model, which may be associated with an account contributions object.

In step 434, method 400 may continue by summing all of the predetermined income available in the year being simulated, which may include (if applicable) the social security income expected in the year, plan, and decision tree path being simulated. In embodiments, required minimum distributions may be included as predetermined income, as determined previously, for example, in step 428.

In step 436, method 400 may continue by retrieving last year's taxes from the prior year simulation (which are generated in a subsequent step of method 400, discussed below).

Method 400 may then continue in a step 438 by determining an expense gap for the year, chosen financial plan, and decision tree path being simulated. In embodiments, the expense gap may be equal to: (Total low-risk income)–(Total goal costs)–(Total tax liability).

If the expense gap of step 438 is negative, then method 400 may continue in a step 440 in which a remaining expense gap may be withdrawn from accounts. In embodiments, the withdrawal may be completed using an associated account sequencing model, which may be associated with an account sequencing object. As shown in step 441, if there is no remaining balance from which to withdraw expenses, then the simulation for the year, chosen financial plan, and decision tree path is over. If more simulations are needed as defined in the decision tree, then the method 400 returns to step 402 of FIG. 4. If all simulations are complete, then method 400, as well as step 104 of method 100 of FIG. 1A, are complete, and method 100 can move on to financial plan analysis and optimization, discussed further below.

As shown in FIG. 6, if the expense gap of step 438 is positive or 0, then method 400 may invest excess cash flow into appropriate accounts (step 442) and continue in step 443 by applying the randomly generated return (e.g., as determined in previous step 426) for each account to the remaining account balance.

Method 400 may then continue in a step 444 in which tax is estimated for the year, chosen financial plan, and decision tree path, based on withdrawals to meet expenses and any other income in the year. In embodiments, the tax may be estimated using an associated income tax model, which may be associated with an income tax object and an income profile object (e.g., tracking other income).

Figure 7:
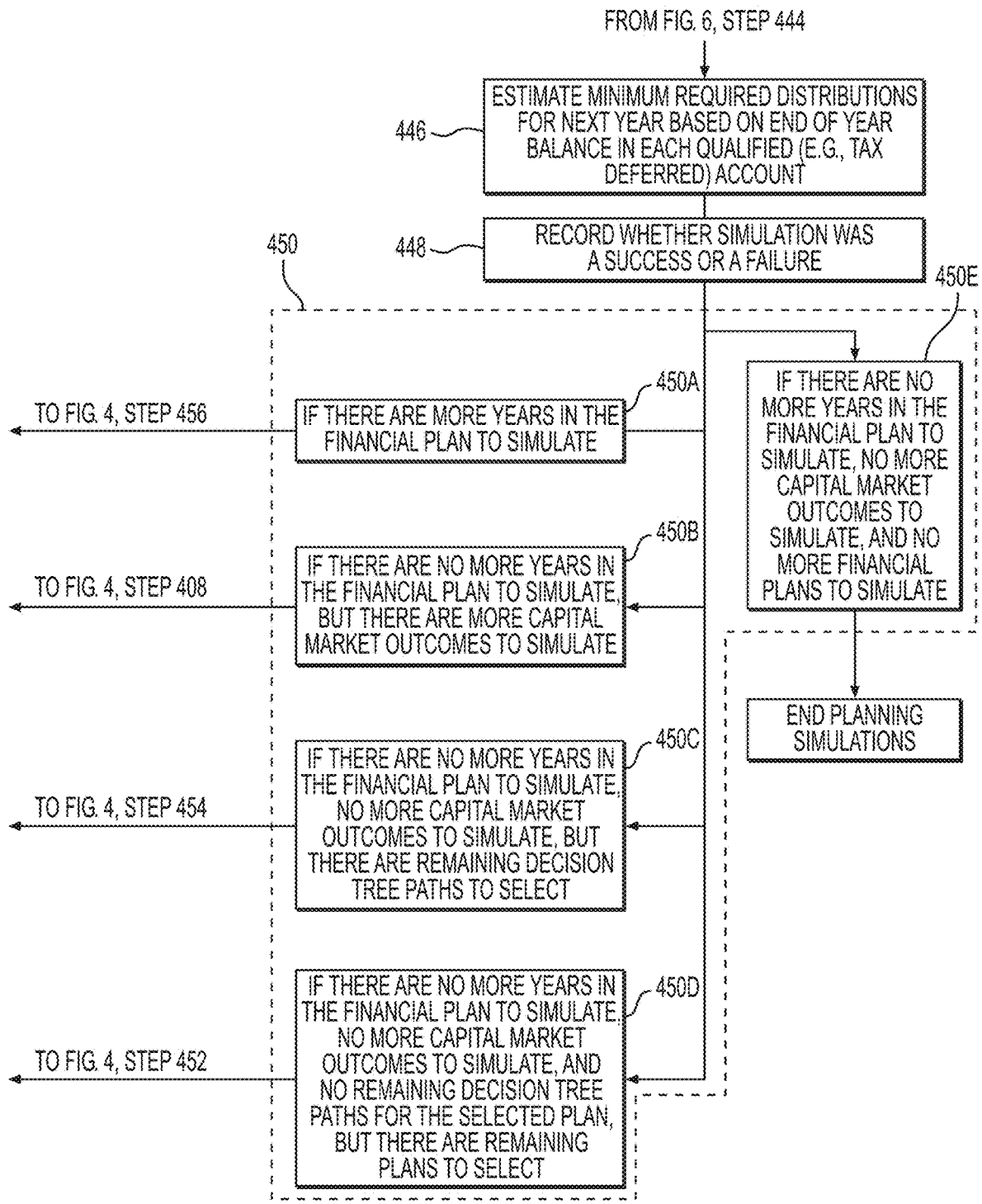

Referring now to FIG. 7, method 400 may continue in step 446 by estimating minimum required distributions for the next year based on end of year balance in each qualified (e.g., tax deferred) account. In embodiments, minimum required distributions may be estimated using an associated minimum required distribution object.

In step 448, method 400 may then record whether the simulation was a success or a failure.

With the simulation complete, method 400 proceeds to step 450, which determines which, if any, simulations have yet to be run, based on the decision tree (e.g., as shown in FIG. 2). In step 450A, if there are more years in the financial plan to simulate, then method 400 returns to step 456, at which the next year in that financial plan and decision tree path is selected. In step 450B, if there are no more years in the financial plan to simulate, but there are more capital market outcomes to simulate, then method 400 returns to step 408. In embodiments, the capital market outcomes may be simulated many times (e.g., 1000 times) for each financial plan and decision tree path option. In step 450C, if there are no more years in the financial plan to simulate and no more capital market outcomes to simulate, but there are remaining decision tree paths to select, then method 400 returns to step 454, at which a next decision tree path is chosen for the financial plan. In step 450D, if there are no more years in the financial plan to simulate, no more capital market outcomes to simulate, and no remaining decision tree paths to select, but there are remaining financial plans to select, then method 400 returns to step 452, at which a next financial plan is chosen. Finally, if there are no more years in the financial plan to simulate, no more capital market outcomes to simulate, no remaining decision tree paths to select, and no remaining financial plans to select, then the planning simulations, along with method 400, are considered complete. This also marks the completion of step 104 of method 100, as shown in FIG. 1A.

Referring again to FIG. 1A, method 100 for determining an optimal financial plan for a particular investor may continue in step 106 by analyzing results of the planning simulation of step 104, to determine candidate financial plans with the highest utility for the investor. Method 100 may then continue in step 108 by determining optimal high utility financial plans from among the candidate financial plans, based on executing concurrent gradient descent that includes executing steps of gradient descent in parallel and in step 110 by reporting optimal high utility financial plans. Further details of these steps are shown in the analysis, optimization, and reporting method 800 of FIG. 8.

Figure 1B:
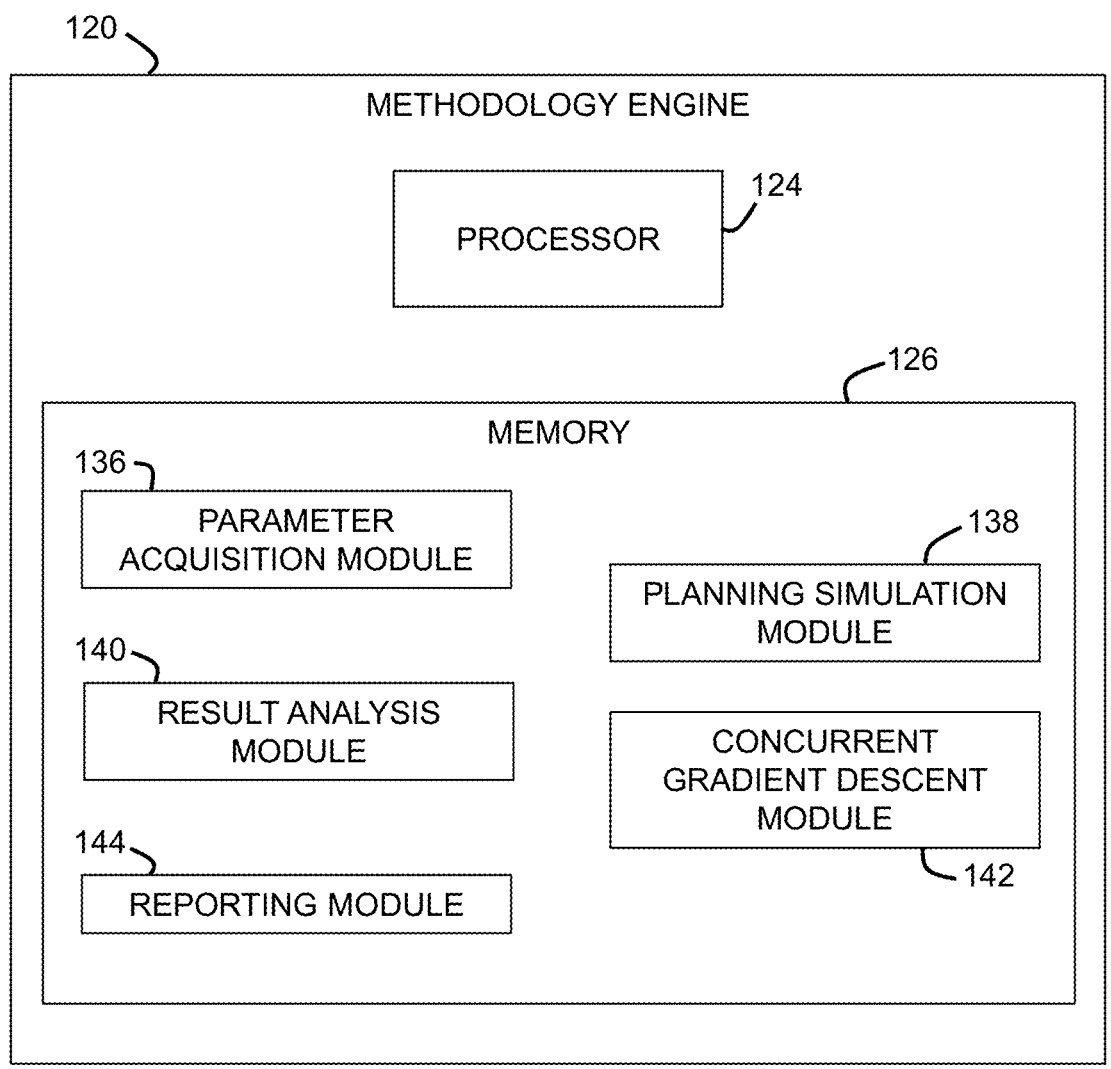
FIG. 1B is a schematic diagram illustrating an example methodology engine according to some embodiments.

FIG. 1B illustrates further details of a methodology engine 120, according to some embodiments. Methodology engine 120 may model future asset values, as further discussed herein. As shown in FIG. 1B, methodology engine 120 includes a device processor 124 and a memory 126. Device processor 124 may include a single device, a distributed device, a plurality of devices, one or more device having multiple cores, and/or any device capable of executing a plurality of worker processes. Memory 126 may include any memory device capable of storing information such as data and/or instructions, and may include a single device or a plurality of devices, including devices communicating over a network.

A parameter acquisition module 136 may establish planning simulation and optimization parameters for an individual. In some embodiments, establishing the planning and optimization parameters may include determining a plurality of goals of the individual, determining a plurality of plans based on defining for each goal of the plurality of goals an associated plan to achieve the each goal, defining, for each plan of the plurality of plans, open life decisions, and defining a decision tree that associates each plan with combinations of timing associated with the open life decisions.

In some embodiments, establishing the planning and optimization parameters may include determining longevity of the individual, determining income streams of the individual, determining current and future cost of goals of the individual, and determining a rank order of the goals.

A planning simulation module 138 may execute a planning simulation based on the parameters. In some embodiments, executing the planning simulation may include selecting a plan from the plurality of plans, selecting a path of the decision tree for the selected plan, and determining a risk composition score associated with the selected plan and the selected path of the decision tree. In some embodiments, determining the risk composition score may include determining a plurality of liability streams of the individual, receiving from the individual a rank order for each liability stream of the plurality of liability streams, receiving from the individual a risk score for each liability stream, establishing a cost for each liability stream, establishing a timeline having a plurality of time intervals, assigning, for each time interval, liability streams associated with the each time interval, assigning, for each time interval, income streams associated with the each time interval, and calculating the risk composition as a weighted average of the risk scores of the liability streams, wherein weight is determined by remaining liabilities yet to be funded by a balance of a portfolio of the individual.

In some embodiments, executing the planning simulation may include simulating, for each plan of the plurality of plans, all combinations of timing associated with the open life decisions and a plurality of capital market outcomes for each combination, and terminating the planning simulation when there are no more years of a last plan left to simulate, no more capital market outcomes, and no more plans left to simulate.

A result analysis module 140 may analyze results of the planning simulation to determine candidate plans with highest chances of success. A concurrent gradient descent module 142 may determine, from among the candidate plans, an optimal plan, based on executing concurrent gradient descent that includes executing steps of gradient descent in parallel.

In some embodiments, determining the optimal plan may include selecting an initial guess of the optimal plan, selecting neighboring optimal plan candidates of the initial guess, and simulating the neighboring optimal plan candidates based on executing concurrent gradient descent until determining that no better result is available. In some embodiments, determining the optimal plan may include iteratively adjusting a cardinality of active worker processes for simulating the neighboring optimal plan candidates, in accordance with a predetermined value indicating a cardinality of a pool of worker processes.

Figure 18:
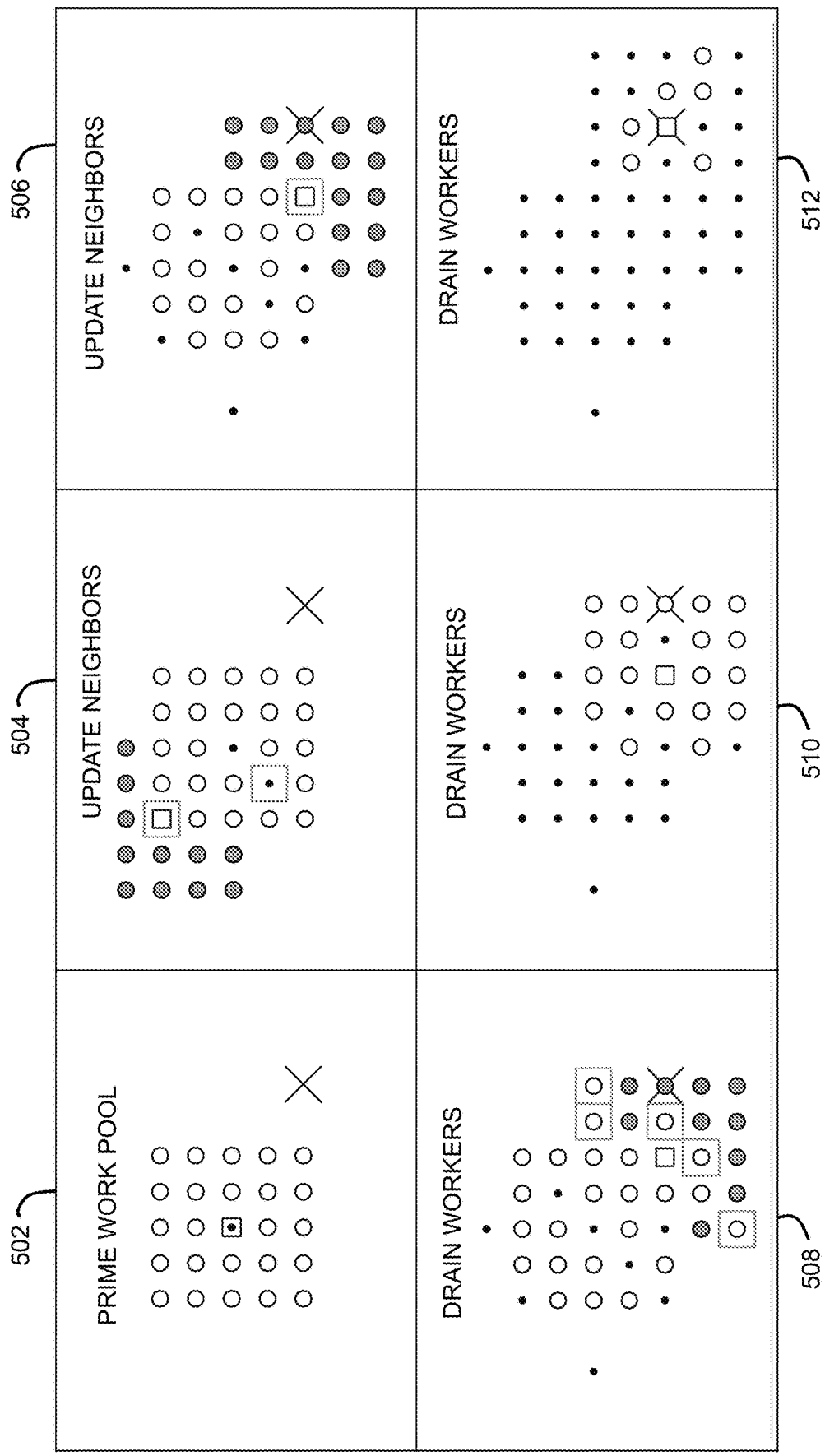
FIG. 18 is a schematic diagram illustrating an embodiment of a method for minimizing the number of iterations and/or the processing time, in optimizing a financial plan, using a concurrent gradient descent technique.

In some embodiments, determining the optimal plan may include determining that an active worker process has completed a simulation of one of the neighboring optimal plan candidates, and reassigning the active worker process to simulate a different neighboring optimal plan candidate, based on the determination that the active worker process has completed a simulation of one of the neighboring optimal plan candidates. FIG. 18, as discussed below, illustrates example operations of concurrent gradient descent, according to some embodiments.

In some embodiments, a timing of fund availability may be determined using an accessibility matrix.

A reporting module 144 may report the optimal plan.

Figure 8:
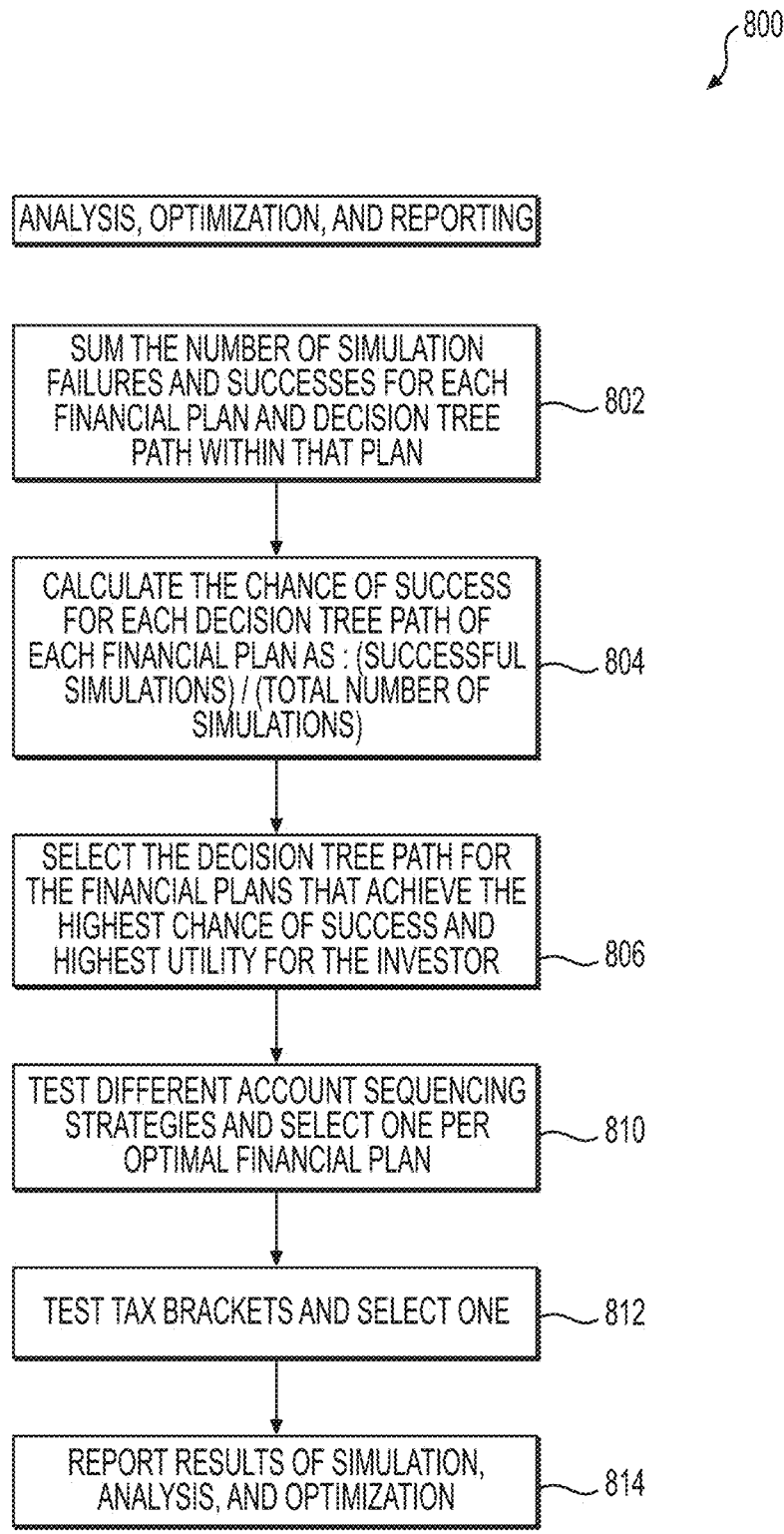
FIG. 8 is a flowchart illustrating an embodiment of a method for analyzing results of a planning simulation to determine candidate financial plans with the highest chances of success and highest utility, simulating additional financial strategies, and reporting optimal financial plans to the end-investor.

As shown in FIG. 8, method 800 may begin at a step 802 by summing the number of simulation failures and successes for each financial plan and decision tree path within that plan. Then, in step 804, method 800 may continue by calculating the chance of success for each decision tree path of each financial plan as: (successful simulations)/(total number of simulations).

Method 800 may then continue in step 806 by selecting the decision tree path for the financial plans that achieve the highest chance of success and highest utility for the investor. These may be considered the optimal plans for each FP_i. This selection may be done using a utility function and an optimization model that is associated with an optimization method object. Embodiments of optimization methods are discussed in further detail below. After step 806, each financial plan may have one decision tree branch left that is associated with the financial plan.

With the optimal financial plans selected, method 800 may continue in step 810 by testing multiple (e.g., up to six) different account sequencing strategies and selecting one account sequencing strategy per optimal financial plan. In embodiments, that testing and selection may be completed using an associated post-planning account sequencing model, which may be associated with an account sequencing object.

Method 800 may then continue in a step 812 by testing multiple tax brackets (e.g., up to six) and selecting one tax bracket. In embodiments, that testing and selection may be completed using an associated Roth conversion model, which may be associated with a Roth conversion object.

With the analysis and optimization complete, method 800 may continue to step 814, which reports (e.g., to the investor and/or administrator) the results of the simulation, analysis, and optimization. In embodiments, the report may include the chance of success, the goals reached, the retirement date, the social security claim date, the asset location, the account sequencing, the investment risk, the investment portfolio managed by the administrator, the investment portfolio for each investment account, the withdrawal options, the account sequencing information, the goal timing (if goal is variable), the possible future balances, and the post-planning recommendations. The completion of step 814 of method 800 also marks the completion of the final step 110 of method 100 as shown in FIG. 1A.

In a further aspect, establishing the planning and optimization parameters may include determining longevity of the individual; determining income streams of the individual; determining current and future cost of goals of the individual; determining a rank order of the goals; defining for each goal a plan to achieve the each goal, resulting in a plurality of plans; defining, for each plan of the plurality of plans, open life decisions comprising social security claim date, retirement date, and date for each goal; and defining a decision tree that associates each plan with combinations of timing associated with the open life decisions.

In a further aspect, executing the planning simulation may include selecting a plan from the plurality of plans, selecting a path of the decision tree for the selected plan, and determining a risk composition score associated with the selected plan and the selected path of the decision tree.

In a further aspect, determining the risk composition score may include determining a plurality of liability streams of the individual; receiving from the individual a rank order for each liability stream of the plurality of liability streams; receiving from the individual a risk score for each liability stream; establishing a cost for each liability stream; establishing a timeline having a plurality of time intervals; assigning, for each time interval, liability streams associated with the each time interval; assigning, for each time interval, income streams associated with the each time interval; and calculating the risk composition as a weighted average of the risk scores of the liability streams, wherein weight is determined by remaining liabilities yet to be funded by a balance of a portfolio of the individual.

In a further aspect, executing the planning simulation may include simulating, for each plan of the plurality of plans, all combinations of timing associated with the open life decisions and a plurality of capital market outcomes for each combination, and ending the planning simulation when there are no more years of a last plan left to simulate, no more capital market outcomes, and no more plans left to simulate.

In a further aspect, analyzing the results and determining the optimal plan may include selecting, for each plan of the plurality of plans, a decision tree path that yields a highest chance of success and highest utility, and identifying the optimal plan as the plan that achieves a highest number of goals with a lowest risk.

In a further aspect, identifying the optimal plan may include an optimization method including a concurrent gradient descent process that modifies a sequential gradient descent by performing steps of gradient descent in parallel to minimize at least one of processing time or a number of required iterations.

In a further aspect, the optimization method may select an initial guess of an optimal plan, select neighboring candidates of the initial guess, and use the concurrent gradient descent process to simulate the neighboring candidates until no better result is available.

In a further aspect, identifying the optimal plan may include an optimization method that considers all possible values of variables and ranks the variables according to which one is optimal.

In another aspect, embodiments may provide computer systems for modeling future asset value. A system may include an application programming interface (API) in communication with a user interface, and a methodology engine in communication with the API. The methodology engine may include a computer processor specially programmed with instructions for performing method steps including establishing planning simulation and optimization parameters, executing a planning simulation based on the parameters, analyzing results of the planning simulation to determine candidate plans with highest chances of success and highest utility, determining, from among the candidate plans, an optimal plan, and reporting the optimal plan The present embodiments may overcome inefficiencies in conventional asset management processes that rely on conventional calculations. In particular, the present embodiments may more accurately and quickly: (1) measure the risk a particular investor is willing to take, (2) project the amount a particular investor will spend in retirement; (3) account for public policy contingencies affecting investments (e.g., taxes); and (4) plan for and manage future events affecting investments (e.g., health issues). The net result may allow for modeling future value of assets and sustaining the value of assets over time (e.g., through retirement).

As used herein, an administrator of a system and/or method of the present embodiments may be, for example, an investment management firm.

C. Embodiments of Systems and Methods of the Methodology Engine

As seen from FIGS. 1A-8, the present embodiments may provide benefits to the financial planning decision making process by automating the iteration over open decisions and parameters of financial planning to select optimal financial plans that may be determined based on voluminous data, using iterative simulation techniques associated with a decision tree, such as the example shown in FIGS. 2 and 3. The models and objects associated with the embodiments allow for comprehensive analyses that formulate an optimal financial plan tailored for a particular investor. To describe an embodiment of a computer-implemented system that implements the methods shown in FIGS. 1A-8, the following describes elements and structures of a system.

A Financial Plan may be a data structure that identifies some or more of the following information:
1. demographic information about a customer (or married couple);
2. tax related information about the customer such as state of residence and dependents;
3. pension information about the customer, including government pensions or plans like Social Security;
4. pension plans for the customer, especially when to begin taking
Social Security;
5. employment information for the customer, including current salary;
6. retirement plans for the customer, especially the date on which to retire;
7. a schedule of expenses;
8. a schedule of bequests;
9. real estate assets, including mortgage payments and maturity;
10. internally managed investment account assets, including balances and dividends;
11. externally managed investment account assets, including balances, dividends and asset composition;
12. non-investment accounts such as checking and savings;
13. other assets;
14. strategies that prioritize which accounts to draw funds from; and
15. strategies that prioritize which accounts to reinvest or contribute funds to.

A plan may be regarded as a mapping of names to values. To accommodate structure within the plan, these names may be complex. For example, the principal balance of the first account might be "account1.balance.principal"

An Open Plan may be a financial plan where at least one key has an unknown value or the customer has requested that the methodology engine recommend the optimal value.

A Candidate Closed Plan may be a financial plan where all keys have specific values, but has not been determined to be the optimal plan.

An Optimal Closed Plan may be a Candidate Closed Plan that has been shown to have a greater utility than any other Candidate Closed Plan.

A Simulation may model the financial plan in or near to the present day. It will then advance time throughout the expected lifetime of the customer, tracking spending on goals, taxes paid, contributions made, income earned, RMDs, penalties, and other data. While time is advancing, random market returns are calculated using a mathematical model of the market such as modern portfolio theory. The simulation preferably follows all strategies prescribed in the plan with no deviation. If during the course of the simulation it is unable to draw enough funds to cover expenses, this is marked as a failure. All data such as spending, taxes paid, contributions made, income earned, asset growth, and whether or not the simulation succeeds may be recorded as Observations.

A Projection may take a Candidate Closed Plan and run many Simulations against it. Each simulation is run with new randomized market returns. The Observations made are then aggregated as samples within a distribution, and then estimators are applied. These can be as simple as estimating the mean taxes paid by taking the arithmetic mean of the observed taxes paid. The Observations collected from the simulations may thus be aggregated as Statistics.

A Utility Function may accept a Candidate Closed Plan and the Statistics obtained by running Projection against that Plan. It then may calculate some value that represents a measure of the utility of the Plan.

As mentioned, the Plan itself may contain many keys and values. It may contain, for instance, the retirement date of the customer. Assuming retiring sooner is more beneficial to the customer, it contributes to the overall utility of the plan. The Utility Function does not have to consider all values available; it may disregard any values that do not contribute to the overall utility of the Plan.

The Utility Function may also consider the Statistics obtained from Projection. It may consider or disregard Statistics depending on whether or not they contribute to the overall utility of the Plan. For instance, the probability of success of the Plan may be very important to the utility of the Plan.

Utility may be characterized in terms of a Utility Metric. There may be two alternative ways to represent a Utility Metric: the weighted sum metric and the complex metric.

To calculate a weighted sum metric, the Plan values and Statistics may be assigned alphas (weights) and exponents and a weighted sum may be calculated using the form:

$$a_0 v_0^{e_0} + a_1 v_1^{e_1} a_2 v_2^{e_2} + \ldots$$

The alphas are thus weights and the exponents are generally 1 but may be 2 or 3 for a more influential value. The values may be obtained either from the Plan values or the Statistics. Weights may be negative to reflect that an increased value corresponds to less utility; for example, greater taxes paid or more years worked would detract from the utility of the plan. Once calculated, the Utility Metric may then be assigned to each Candidate Closed Plan. The Optimal Closed Plan is thus the one with the greatest Utility Metric.

A complex metric may have more structure than an individual number. Instead of adding weighted values together, though, the values may be recorded as an n-tuple. This will have the form:

$$(v_0, v_1, v_2, v_3, \ldots)$$

As before, the values may be obtained either from the Plan values or the Statistics. Two complex metrics may be compared lexicographically. First, corresponding $v_0$ values may be compared. If those values differ, the greater value is chosen and comparison stops. If they are the same, comparison moves on to $v_1$ values. If they differ, the greater value is chosen and comparison stops. This continues until the tuple is exhausted. Furthermore, a complex metric itself may use a weighted sum metric as any of its values.

Regardless of which scheme is used, it is desirable to tailor the Utility Function to ensure that the utility of plans is always distinct so that a single Candidate Closed Plan is identified as the Optimal Closed Plan.

The functioning of an optimizer may be: given an Open Plan, construct Candidate Closed Plans, evaluate them using Projection and the Utility Function, and then identify the Optimal Closed Plan. The goal of optimization may be to consider "open" plans, those that have some unknown variables, and to determine the optimal values for those unknown variables, thus resulting in an optimal "closed" plan. A "brute force" approach (with methodology as described in FIGS. 1A-8, and the systems-based implementation below) may simply consider every possible value for the open variables and rank them according to which one is the most optimal, according to a utility function. Other approaches may attempt to avoid considering every possible value for open variables, such as the concurrent gradient descent method discussed below.

Projection Service:

In embodiments, projection may be the process of determining the efficacy of a financial plan by repeatedly simulating the plan under randomly changing market conditions and making statistical observations of the repeated trials.

The simulation may be expressed as a collection of algorithms that read and write data to a simulation timeline. Because these algorithms may cover a diverse set of tax rules and financial accounts, embodiments may manage the complexity of the simulation by enforcing a structure with some simplifying assumptions, or "realms."

Figure 15:
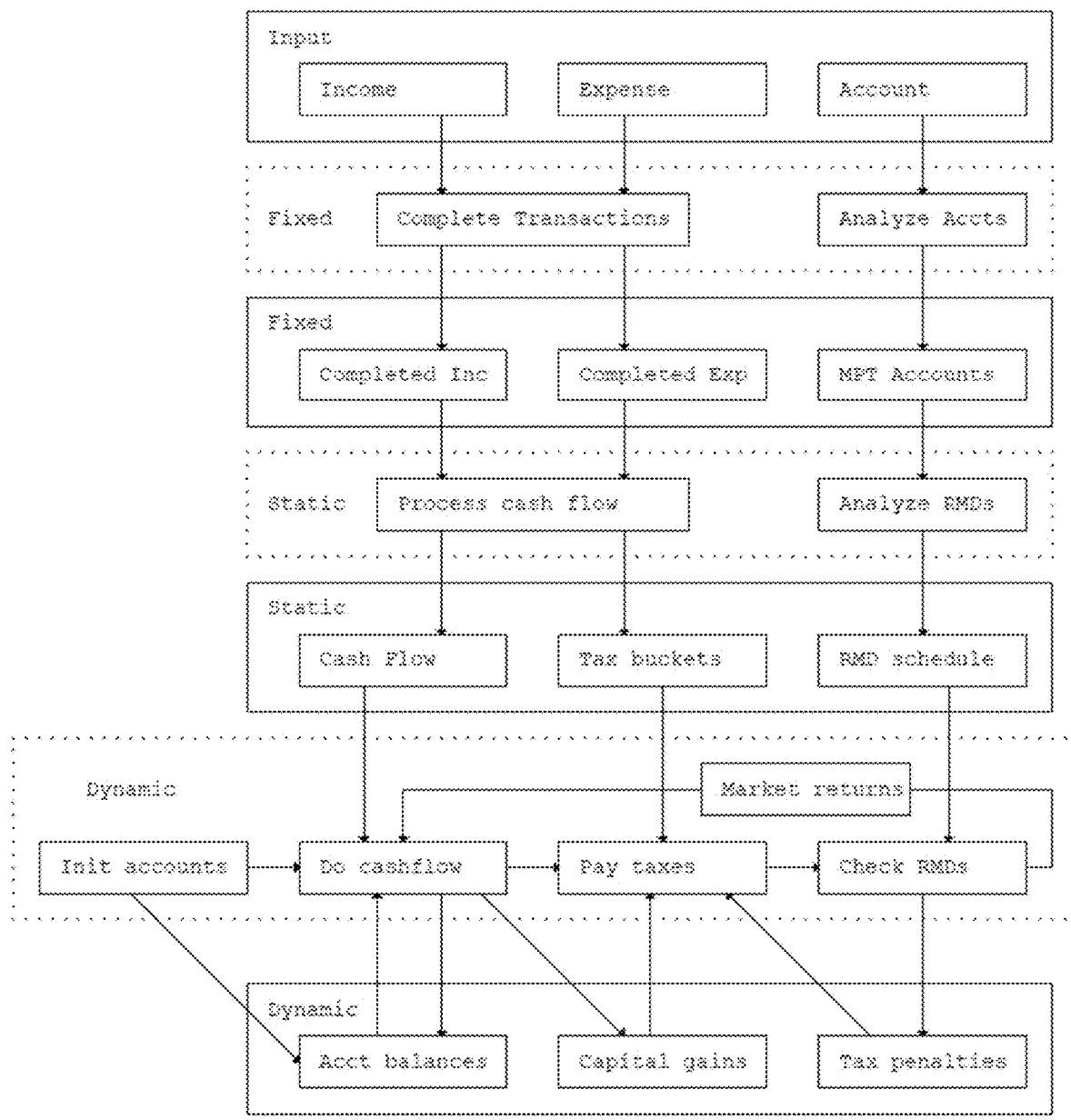
FIG. 15 is a schematic diagram illustrating an embodiment of realms of a simulation framework.

In embodiments, as shown in FIG. 15, a simulation may divide algorithms into one or more of the following realms:

Input analysis: this realm may be implicitly populated by simulation input;

Fixed variables: this realm may determine individual values;

Static timeline: this realm may calculate schedules that are not dependent on market data;

Dynamic timeline: this realm may perform the actual account sequencing and market simulation; and Post processing: this realm may summarize the results of the simulation into a structure suitable for output.

In preferred embodiments, each algorithm may be in a single realm. Each algorithm may describe what variables the algorithm consumes and which variables the algorithm provides. As each realm is also a namespace, an algorithm may consume a variable that was provided by an algorithm in an earlier realm. In embodiments, only one algorithm may provide a variable.

In embodiments, the planner of the projection service may identify dependencies. An algorithm that consumes variables A, B, and C may be dependent on the algorithms that provide those variables. The planner may construct a dependency graph based on these dependencies.

To execute these algorithms, embodiments may topologically sort the dependency graph. In embodiments, this sorting may be accomplished using Tarjan's strongly connected components algorithm or some similar algorithm.

In embodiments, the nature of the dynamic timeline may provide a logical cycle: the beginning of the year depends on the results of the prior year. To construct a plan, the cycle may be broken by denoting certain dynamic algorithms as "year 0" algorithms.

Embodiments may require that no prior realm depend on a later realm, in which case the planner of the projection service may be able to ignore dependencies that "cross" realms. That is, once the "fixed" realm has run, all variables are known to have been set correctly and later realms can assume that they exist.

In embodiments, the executor of the projection service may accept the financial plan and then step through each realm. The plan, itself, may be a simple ordered list of algorithms to execute. As the planner may guarantee the variables are present, there may be no need for error checking. Running the dynamic timeline may be a special case, as it is run repeatedly in order to perform Monte Carlo projections.

D. Embodiments of Optimization (i) Brute Force Optimization

Figure 16:
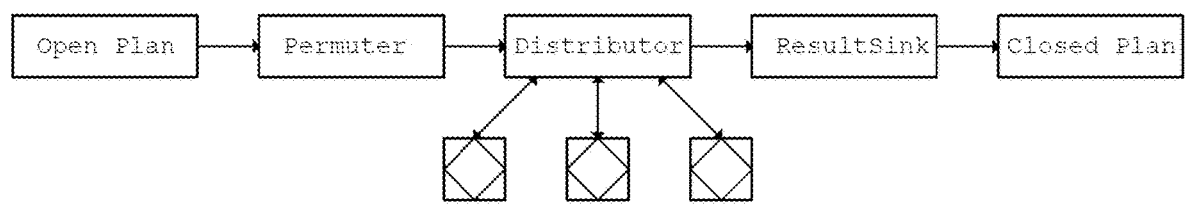
FIG. 16 is a schematic diagram illustrating an embodiment of an optimizer and an optimization process.

The overall components of brute force optimization are displayed in FIG. 16. As shown, the open plan is an input that is passed to a permuter. The candidate plans generated by the permuter are passed to a distributor. The distributor parcels out the work of evaluating plans to workers, and gathers their results. Those results are passed to a result sink that tracks the most optimal result. The most optimal result is a closed plan that is returned to the caller.

Preliminary: Coroutines

The following algorithms are expressed here as coroutines for clarity. A coroutine is a generalization of the common subroutine; whereas a subroutine has a single entry point and may return a single value and may be implemented by a simple stack, a coroutine has a single entry point, but may yield data back to a caller (at which the coroutine halts) and then the caller may yield back to the coroutine additional data (at which point the coroutine resumes), and this continues until the coroutine fully terminates.

Many implementation environments have support for coroutines, but if these algorithms are embodied in an environment that does not, they may be equivalently implemented, for example, by means of a state machine, by means of continuations, by means of communicating sequential processes, by means of threads, or by means of inter-process communication.

A reason for presenting these as coroutines is that presenting these using threading idioms would involve meticulously detailing where critical resources must be locked, whereas coroutines operate in a single thread of execution and are thus simpler to explain.

Furthermore, coroutines are often used to manage events happening outside the environment. A common idiom, to which this disclosure refers, is of an event loop. In an event loop, a subroutine is responsible for polling the operating system for events (file events, network events, etc.) and a coroutine may either schedule its own events or await other events. Its mode of operation is simply to poll the operating system for events, check for events posted in its internal list, and then invoke coroutines that are awaiting such events as necessary. This disclosure will indicate when the "caller" of the coroutine is really such an event loop manager.

Permuter Coroutine

In brute force optimization, a permuter coroutine is responsible for generating valid permutations of the open variables on request. An embodiment of this coroutine could simply generate a list of all results, but only if it is known that the list can be stored in memory or written to media. The coroutine embodiment has desirable run-time.

The permuter coroutine is called with an Open Plan named OPEN_PLAN, one which has variables whose optimal value is unknown. The permuter coroutine will then yield in sequence a series of Candidate Closed Plans that have values specified for all variables, but that are as yet not known to be optimal. The specific details of this operation follow.

Initial Phase

The coroutine will construct a list of the open variable names in OPEN_PLAN and sort them in a canonical order and assign it to NAMES.

The coroutine will construct a list of lists of possible values that correspond to each open variable in NAMES and assign it to VALUES.

The coroutine will construct a third list of ones that is equal in length to the first and second lists and assign it to COUNTER.

Permutation

The coroutine will create a copy of OPEN_PLAN and assign it to PLAN.

The coroutine will loop a variable named INDEX from one to the length of VALUES.

Within this loop, the coroutine will look up the INDEX item of COUNTER and assign this to VALUE_NUMBER.

Within this loop, the coroutine will look up the VALUE_NUMBER item of the INDEX item of VALUES and assign this to VALUE.

Within this loop, the coroutine will look up the VALUE_NUMBER item of NAMES and assign this to NAME.

Within this loop, the coroutine will look up the key NAME of PLAN and assign it VALUE.

This loop will increment INDEX and continue to loop.

The coroutine will now yield PLAN to the caller and wait to be resumed.

Upon resumption, the coroutine will set a variable named INDEX to one, and will begin to loop.

Within this loop, the coroutine will look up the INDEX item of COUNTER and assign it to COUNT.

Within this loop, the coroutine will look up the length of the INDEX item of VALUES and assign this to MAX.

Within this loop, the coroutine will increment COUNT by one.

Within this loop, if COUNT is less than or equal to MAX, the coroutine will assign COUNT to the INDEX item of COUNTER.

Within this loop, if COUNT is less than or equal to MAX, the coroutine will then break out of the loop.

Within this loop, the coroutine will assign one to the INDEX item of COUNTER.

Within this loop, the coroutine will increment INDEX.

Within this loop, the coroutine INDEX is greater than the length of COUNTER, the coroutine will terminate entirely.

If the coroutine has not terminated, the coroutine will continue execution at the top of the section Permutation.

Distributor Coroutine

Figure 17:
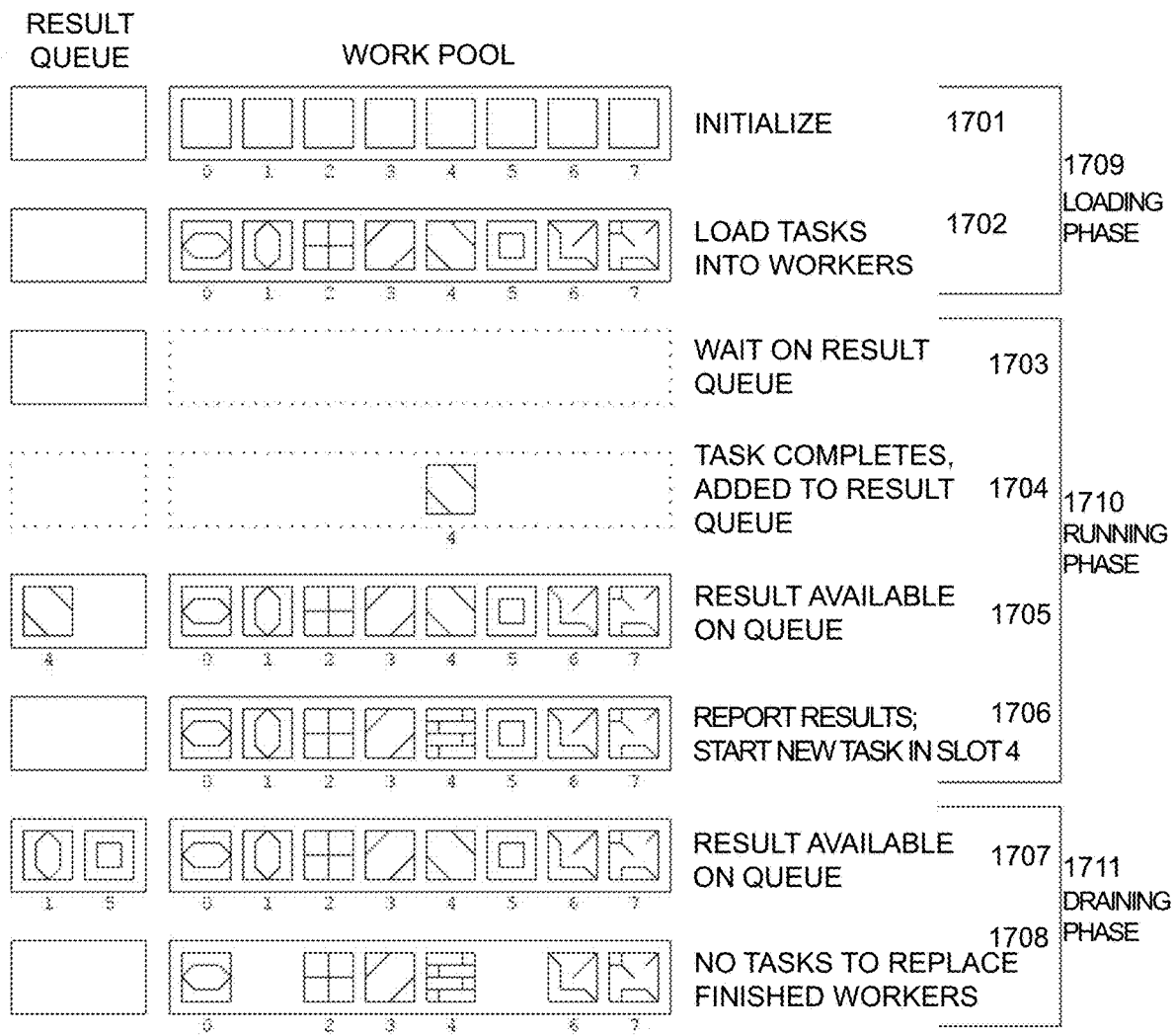
FIG. 17 is a schematic diagram illustrating an embodiment of a distributor's process.

The functioning of the distributor is demonstrated visually in FIG. 17, with certain details of the functioning of a coroutine omitted for clarity.

The distributor coroutine accepts a Permuter coroutine as a parameter. In environments that do not express coroutines as values, it may accept the parameters the Permuter coroutine is defined to accept here, and invoke it as necessary.

The distributor coroutine is configured, either hard-coded or determined at run-time depending on the needs of the application, an integer POOL_SIZE that reflects a number of available worker processes. These should reflect either individual machines or portions of the multiprocessing capacity of such machines.

The distributor coroutine is further configured to communicate with the Projection system, which has at least a number of workers equivalent to POOL_SIZE.

The distributor coroutine is further configured to communicate with an event loop subsystem.

The distributor coroutine is further configured to utilize a Utility Function.

Initialize

The initialize phase is represented in FIG. 17 as 1701, which is part of the loading phase 1709.

The coroutine allocates storage for a new queue named RESULT_QUEUE.

This queue may be embodied as an array dynamically allocated on the heap, or allocated in a fixed manner if testing indicates that its size is well known.

This queue preferably further has a counter indicating the number of elements assigned to the queue.

This queue preferably is further aware of the event loop subsystem and is able to notify listeners when new tasks are placed on it.

The coroutine sets a variable named OPTIMAL_PLAN to some null value.

The coroutine sets a variable named OPTIMAL_STATISTICS to some null value.

The coroutine sets a variable named OPTIMAL_UTILITY to some null value.

Invoke Coroutine

The distributor coroutine will create many coroutines called Invoke.

An Invoke coroutine will accept a Candidate Closed Plan named CLOSED_PLAN.

An Invoke coroutine will place a network request to the Projection subsystem and await a response, yielding processing to the caller. (The caller will be the event loop.)

When the response arrives, an Invoke coroutine will resume its processing and assign it to a variable named STATISTICS.

An Invoke coroutine is created within the domain of the distributor coroutine and is thus able to access the RESULT_QUEUE.

An Invoke coroutine will place a pair of the CLOSED_PLAN, STATISTICS on the RESULT_QUEUE. It will then terminate, yielding to its caller.

This behavior is demonstrated in FIG. 17 as 1705 and 1707.

First Batch

This phase of operation is represented in FIG. 17 as 1702, which is part of the loading phase 1709.

The Distributor coroutine will loop with the variable ACTUAL_POOL_SIZE from 1 to the length of POOL_SIZE.

Within this loop, the Distributor coroutine will yield to the Permuter.

Within this loop, upon resumption, the coroutine may be signaled that the Permuter has terminated. In this case, it will exit this loop and skip forward to Drain Remaining Workers.

Within this loop, upon resumption, the Permuter will return a Candidate Closed Plan to the Distributor coroutine which will assign this to a variable named PLAN.

Within this loop, the Distributor coroutine will construct an Invoke coroutine with PLAN.

Within this loop, the Distributor coroutine will schedule this Invoke for future execution with the event loop.

Drain the Permuter

This phase is represented in FIG. 17 as 1710.

The Distributor coroutine will loop indefinitely, except when exited as detailed below.

Within this loop, the Distributor coroutine will yield to the event loop, awaiting a result to be placed on RESULT_QUEUE, as in 1703 and 1704.

Within this loop, upon resumption, the Distributor coroutine will accept the pair of CLOSED_PLAN, STATISTICS and assign them to local variables of the same names.

Within this loop, the Distributor coroutine will submit CLOSED_PLAN and STATISTICS to the Utility Function and assign the result to a variable named CURRENT_UTILITY.

Within this loop, if OPTIMAL_UTILITY is null or if CURRENT_UTILITY is greater than OPTIMAL_UTILITY, the coroutine will assign CLOSED_PLAN to OPTIMAL_PLAN, it will assign STATISTICS to OPTIMAL_STATISTICS, and it will assign CURRENT_UTILITY to OPTIMAL_UTILITY.

Within this loop, the coroutine will yield to the Permuter.

Within this loop, upon resumption, the coroutine may be signaled that the Permuter has terminated. In this case, it will exit this loop and skip forward to Drain Remaining Workers.

Within this loop, upon resumption, the Permuter will return a Candidate Closed Plan to the Distributor coroutine which will assign this to a variable named PLAN.

Within this loop, the Distributor coroutine will construct an Invoke coroutine with PLAN and INDEX.

Within this loop, the Distributor coroutine will schedule this Invoke for future execution with the event loop. This is demonstrated in FIG. 17 as 1706.

This algorithm ensures the invariant is maintained at all times that no more than POOL_SIZE workers are ever active.

This Distributor coroutine will then continue this loop.

Drain Remaining Workers

This phase is represented in FIG. 17 as 1711.

The Distributor coroutine will loop from 1 to ACTUAL_POOL_SIZE with some counter.

Within this loop, the Distributor coroutine will yield to the event loop, awaiting a result to be placed on RESULT_QUEUE, as shown in FIG. 17 as 1707.

Within this loop, upon resumption, the Distributor coroutine will accept the pair of CLOSED_PLAN, STATISTICS and assign them to local variables of the same names.

Within this loop, the Distributor coroutine will submit CLOSED_PLAN and STATISTICS to the Utility Function and assign the result to a variable named CURRENT_UTILITY.

Within this loop, if OPTIMAL_UTILITY is null or if CURRENT_UTILITY is greater than OPTIMAL_UTILITY, the Distributor coroutine will assign CLOSED_PLAN to OPTIMAL_PLAN, it will assign STATISTICS to OPTIMAL_STATISTICS, and it will assign CURRENT_UTILITY to OPTIMAL_UTILITY.

This Distributor coroutine will then continue this loop until the count is complete, as in 1708.

At this point, the Distributor coroutine terminates and returns the triple OPTIMAL_PLAN, OPTIMAL_STATISTICS, OPTIMAL_UTILITY.

Optimization Controller Subroutine

The Optimization Controller is a subroutine that will accept an Open Plan named OPEN_PLAN.

The subroutine is configured, either statically or dynamically, with an event loop.

The subroutine will construct a Permuter coroutine with OPEN_PLAN.

The subroutine will construct a Distributor coroutine, passing it the Permuter coroutine.

The subroutine will schedule the Distributor coroutine with the event loop and await the result from the Distributor.

The subroutine will then return the triple OPTIMAL_PLAN, OPTIMAL_STATISTICS, OPTIMAL_UTILITY.

(ii) Optimization—Multiple Rounds Modification

A modification of any optimization algorithm can be used to reduce the computing power and time necessary. To illustrate this, one can approximate the computing power necessary to perform a full brute force optimization of a problem with N open variables that have M possible values. (Assume, for simplicity, that they all have the same number of possible values.) The computing power can be approximated by calculating $M^N$. Thus, each additional variable will increase the total computing power by a factor of M. While the time spent could be reduced by allocating more workers to the task of Projection, this approach involves the cost and expense of a larger fleet of workers, so the actual computing power has not changed.

The multiple rounds modification may require methodological confirmation that certain variables being optimized over are independent. If these are not, it is possible that this modification will result in a suboptimal plan.

Permuter Coroutine, Multiple Rounds Variant

In the multiple rounds variant, the Permuter coroutine accepts an additional array named DEFAULTS. DEFAULTS will have pairs of keys and values. The variant modifies the Initial Phase as shown below:

Initial Phase

The coroutine will construct a copy of OPEN_PLAN and all subsequent references to OPEN_PLAN shall refer to this copy.

The coroutine will loop with a variable INDEX from 1 to the length of DEFAULTS.

Within this loop, the coroutine will obtain the pair NAME, DEFAULT from the INDEX element of DEFAULTS.

Within this loop, the coroutine will check if NAME in OPEN_PLAN is open. If so, it will overwrite it with DEFAULT, thus closing it.

The coroutine will continue to loop until complete.

The coroutine will construct a list of the open variable names and sort them in a canonical order and assign it to NAMES.

The coroutine will construct a list of lists of possible values that correspond to each open variable in the first list and assign it to VALUES.

The coroutine will construct a third list of ones that is equal in length to the first and second lists and assign it to COUNTER.

Optimization Controller Subroutine, Multiple Rounds Variant

The Optimization Controller is a subroutine that will accept an Open Plan named OPEN_PLAN.

The subroutine is configured, either statically or dynamically, with an event loop.

The subroutine is configured, either statically or dynamically, with a list named ROUNDS.

Each element of ROUNDS is itself a list of default values.

The subroutine sets a variable named OPTIMAL_PLAN the value of OPEN_PLAN.

The subroutine sets a variable named OPTIMAL_STATISTICS to some null value.

The subroutine sets a variable named OPTIMAL_UTILITY to some null value.

The subroutine will loop with a variable named INDEX from 1 to the length of ROUNDS.

Within this loop, the subroutine will assign the INDEX element of ROUNDS to a variable named DEFAULTS.

Within this loop, the subroutine will construct a Permuter coroutine with OPTIMAL_PLAN and DEFAULTS.

Within this loop, the subroutine will construct a Distributor coroutine, passing it the Permuter coroutine.

Within this loop, the subroutine will schedule the Distributor coroutine with the event loop and await the result from the Distributor.

Within this loop, the subroutine will then assign the triple returned to the variables named OPTIMAL_PLAN, OPTIMAL_STATISTICS, OPTIMAL_UTILITY.

The subroutine will continue the loop.

The subroutine returns the triple OPTIMAL_PLAN, OPTIMAL_STATISTICS, OPTIMAL_UTILITY.

Optimization—Gradient Descent Variant

The concurrent gradient descent algorithm modifies the standard sequential gradient descent by performing many steps of gradient descent in parallel to minimize the time required.

As with any gradient descent, methodological confirmation of the Utility Function must be performed to confirm that there are not local maxima or the algorithm will falsely report them as globally optimal results.

FIG. 18 provides a visual representation of an embodiment of a gradient descent methodology 500.

Problem Space

To implement a gradient descent, certain details of the structure of the problem space may require more attention. The algorithm may require that all potentially open variables have a numeric representation or map to a numeric representation. This may involve a process of deconstruction and reconstruction.

For example, a strategy for drawdown might be represented naively as some ordering of the triple TAXABLE, DEFERRED, EXEMPT. There are thus six possible variants of this. Simply mapping them as the numbers 1 through 6 might work, but may prevent the descent algorithm from discovering certain combinations.

Thus, in an embodiment, the strategy is deconstructed into two values, primary and secondary. The values for primary might be 1, 2, 3, reflecting one of the three items. The values for secondary might be 1 or 2, reflecting that only two of the three types remain to be chosen. The reverse of the operation would reconstruct those numbers into the original strategy.

Determine Space

The subroutine Determine Space will accept an Open Plan named OPEN_PLAN.

The subroutine will construct a list of pairs named SPACE.

The subroutine will gather the open variables in OPEN_PLAN and assign them to SPACE such that each pair is the variable name, the list of possible values.

In the case where the list of possible values is very large and regular, it may be represented as a range of numbers or some equivalent mechanism.

If certain variables should be deconstructed, the subroutine will represent those in as many key value pairs as good methodology requires.

It will return the list SPACE.

Initial Guess

The subroutine Initial Guess accepts a list of pairs named SPACE.

The subroutine will construct a list of integers named GUESS of the same length as SPACE.

It can use any number of techniques that will depend on the methodology to pick reasonable values. These can involve techniques like machine learning, or a regression of customer data that shows which factors are predictive of the best values. Some values may have a methodological rule of thumb, for example, retiring at 70. A good guess will decrease the space that must be searched to find optimal values.

The subroutine will assign values to GUESS that are indexes into the possible values within SPACE.

It will return the list GUESS.

Apply Guess

The subroutine Apply Guess accepts an open plan OPEN_PLAN, a list of pairs SPACE, and a list of integers GUESS.

The subroutine will assign a copy of OPEN_PLAN to the variable PLAN.

The subroutine will loop the variable INDEX from 1 to the length of GUESS.

Within this loop, it will assign the INDEX pair of SPACE to the variables NAME and VALUES.

Within this loop, it will assign the INDEX element of GUESS to VALUE_INDEX.

Within this loop, it will update the variable NAME in PLAN to have the VALUE_INDEX element of VALUES.

The subroutine will continue the loop.

The subroutine will return PLAN.

Nearby Neighbors

The subroutine Nearby Neighbors accepts a list of pairs SPACE, a list of integers GUESS, and an integer MAX_FACTOR.

The subroutine will create an empty list NEIGHBORS.

The subroutine will loop the variable FACTOR from 1 to MAX_FACTOR.

Within this outer loop, the subroutine will further loop the variable PATTERN from 0 up to but not including 2 raised to the power of the cardinality of GUESS.

Within this inner loop, the subroutine will assign the binary decomposition of PATTERN to a list of integers named CHANGES.

Within this inner loop, the subroutine will replace all 0's in CHANGES with negative ones.

Within this inner loop, the subroutine will multiply all elements of CHANGES by FACTOR.

At this point, on the third iteration of the outer loop and the third iteration of the inner loop, CHANGES might be [−3, −3, 3, 3].

Within this inner loop, the subroutine will add corresponding elements of GUESS to CHANGES.

Within this inner loop, the subroutine will verify that all elements of CHANGES are valid indices within SPACE. If they are, it will append CHANGES to NEIGHBORS.

Within this inner loop, the subroutine will continue the loop.

Within the outer loop, the subroutine will continue the loop.

The subroutine will then return NEIGHBORS.

Steps Removed

The subroutine Steps Removed accepts a list of integers FIRST_GUESS and a list of integers SECOND_GUESS. In an embodiment, both lists must have the same length.

The subroutine will construct a list of differences of corresponding elements between FIRST_GUESS and SECOND_GUESS and assign it to DIFFERENCE.

The subroutine will square every element of DIFFERENCE.

The subroutine will calculate the sum of elements in DIFFERENCE and assign it to QUADRANCE.

In many applications, it is sufficient to simply return QUADRANCE.

The subroutine may, if it is required, calculate the square root of QUADRANCE and assign it to DISTANCE.

It will then return DISTANCE.

Optimizer

The optimizer is a coroutine that accepts an OPEN_PLAN, an integer POOL_SIZE and an integer FACTOR.

The integer FACTOR should be set such that Nearby Neighbors will return a list close to the length of POOL_SIZE.

Initialization

The coroutine allocates storage for a new queue named RESULT_QUEUE.

This queue may be embodied as an array dynamically allocated on the heap, or allocated in a fixed manner if testing indicates that its size is well known.

In an embodiment, this queue must further have a counter indicating the number of elements assigned to the queue.

In an embodiment, this queue must further be aware of the event loop subsystem and able to notify listeners when new tasks are placed on it.

The coroutine calls Determine Space with OPEN_PLAN and assigns the result to SPACE.

The coroutine calls Initial Guess with SPACE and assigns it to OPTIMAL_GUESS.

The coroutine sets a variable WORKING_GUESS to OPTIMAL_GUESS.

The coroutine sets a variable OPTIMAL_UTILITY to null.

The coroutine sets a variable OPTIMAL_PLAN to null.

The coroutine sets a variable OPTIMAL_STATISTICS to null.

The coroutine constructs a set GUESSES_MADE of lists of integers.

Invoke Coroutine

The optimizer coroutine will create many coroutines called Invoke.

An Invoke coroutine will accept a list of integers named GUESS.

An Invoke coroutine will invoke Assign Guess with GUESS, SPACE and OPEN_PLAN and assign the result to CLOSED_PLAN.

An Invoke coroutine will place a network request to the Projection subsystem and await a response, yielding processing to the caller. (The caller will be the event loop.)

When the response arrives, an Invoke coroutine will resume its processing and assign it to a variable named STATISTICS.

An Invoke coroutine is created within the domain of the distributor coroutine and is thus able to access RESULT_QUEUE.

An Invoke coroutine will place a triple of GUESS, CLOSED_PLAN, STATISTICS on the RESULT_QUEUE. It will then terminate, yielding to its caller.

Prime Work Pool

This phase of operation is represented in FIG. 18 as 502. A pool is primed by assigning workers to immediate neighbors of the initial guess, shown as a square with a dot. In this example, the "X" is being searched for.

The coroutine will construct an Invoke coroutine with WORKING_GUESS.

The coroutine schedules this Invoke for future execution with the event loop.

The coroutine adds GUESS to the set GUESSES_MADE.

The coroutine will call Nearby Neighbors with OPTIMAL_GUESS, SPACE and FACTOR and assign the result to NEIGHBORS.

The coroutine will assign ACTIVE_WORKERS a value 0.

The coroutine will loop with a variable INDEX from 1 to POOL_SIZE minus 1.

Within this loop, if NEIGHBORS is empty, it will exit the loop.

Within this loop, the coroutine will remove the first element of NEIGHBORS and assign it to GUESS.

Within this loop, the Optimizer coroutine will construct an Invoke coroutine with GUESS.

Within this loop, the coroutine schedules this Invoke for future execution with the event loop.

Within this loop, the coroutine adds GUESS to the set GUESSES_MADE.

Within this loop, the coroutine increments ACTIVE_WORKERS by 1.

The coroutine will continue this loop.

Descent Phase

The coroutine will yield to the event loop, awaiting data on the RESULT_QUEUE.

Upon resumption, the coroutine will assign the triple to variables GUESS, CLOSED_PLAN and STATISTICS.

The coroutine decrements ACTIVE_WORKERS by 1.

The coroutine sets the key GUESS of GUESS_RESULTS to STATISTICS.

The coroutine submits CLOSED_PLAN and STATISTICS to the Utility Function and assign the result to a variable named CURRENT_UTILITY.

If OPTIMAL_UTILITY is null or if CURRENT_UTILITY is greater than OPTIMAL_UTILITY, the coroutine will assign CLOSED_PLAN to OPTIMAL_PLAN, it will assign STATISTICS to OPTIMAL_STATISTICS, it will assign CURRENT_UTILITY to OPTIMAL_UTILITY, and it will assign GUESS to OPTIMAL_GUESS.

If NEIGHBORS is empty, the coroutine will skip ahead to Update Neighbors.

Otherwise, the coroutine will remove the first element of NEIGHBORS and assign it to GUESS.

The Optimizer coroutine will construct an Invoke coroutine with GUESS.

The coroutine schedules this Invoke for future execution with the event loop.

The coroutine increments ACTIVE_WORKERS by 1.

The coroutine adds GUESS to the set GUESSES_MADE.

The coroutine will continue processing at Descent Phase.

Update Neighbors

The operation of this subprogram is represented in FIG. 18 in both 504 and 506. For example, in 504, as better results arrive (shown as a square), OPTIMAL_GUESS and its neighbors (shown as gray circles) are updated. Less optimal results (shown as dots) are discarded. In 506, another better result immediately updates NEIGHBORS. Existing worker processes are not terminated.

If OPTIMAL_GUESS is the same as WORKING_GUESS, the coroutine will skip ahead to Drain Workers.

The coroutine will set WORKING_GUESS to OPTIMAL_GUESS.

The coroutine will call Nearby Neighbors with OPTIMAL_GUESS, SPACE and FACTOR and assign the result to NEIGHBORS.

The coroutine will remove any elements from NEIGHBORS that are present in GUESSES_MADE.

If NEIGHBORS is empty, the coroutine will skip ahead to Drain Workers.

The coroutine will loop with no variable from ACTIVE_WORKERS+1 to POOL_SIZE.

Within this loop, if NEIGHBORS is empty, it will exit the loop.

Within this loop, the coroutine will remove the first element of NEIGHBORS and assign it to GUESS.

Within this loop, the Optimizer coroutine will construct an Invoke coroutine with GUESS.

Within this loop, the coroutine schedules this Invoke for future execution with the event loop.

Within this loop, the coroutine increments ACTIVE_WORKERS by 1.

Within this loop, the coroutine adds GUESS to the set GUESSES_MADE.

The coroutine will continue this loop.

The coroutine will continue processing at Descent Phase.

Drain Workers

The operation of this subprogram is represented in FIG. 18 in 508-512. In 508, as worker processes complete, they are reassigned to work from the NEIGHBORS array, thus attempting to keep the pool of worker processes busy. In 510, workers may go idle if all work in NEIGHBORS is assigned. Any new worker may return a more optimal result, update NEIGHBORS and assign it to idle workers.

In 512, the process terminates when NEIGHBORS is drained, (no gray circles) and the remaining workers complete without finding a better result.

If ACTIVE_WORKERS is greater than 0, the coroutine will continue processing at Descent Phase.

Otherwise, the coroutine will return the triple OPTIMAL_PLAN, OPTIMAL_STATISTICS, OPTIMAL_UTILITY.

Based on the above optimization techniques, methodology engine 306 may provide significant and surprising benefits in quickly and accurately determining an optimal financial plan. As represented in the example of FIG. 18, the concurrent gradient descent approach continuously moves through the simulation of financial plans in fewer iterations, and decreases the time needed to process the different scenarios (e.g., as defined by a decision tree, described above), determine that no better result exists, and arrive at an optimal financial plan.

III. Embodiments of Plan Execution

Referring to FIG. 12, once results from the methodology engine 306 are presented to the investor, the investor may choose to either further edit their financial plan or choose a plan for execution, which may be referred to as the investor's current plan. Trading engine 304 may thus manage the execution of investment trades of internally administered accounts for investors with current plans. To do so, the trading engine 304 may send the current plan and real-time account holdings and balance information to the methodology engine 306 to determine the trades necessary to execute the plan.

Figure 4:
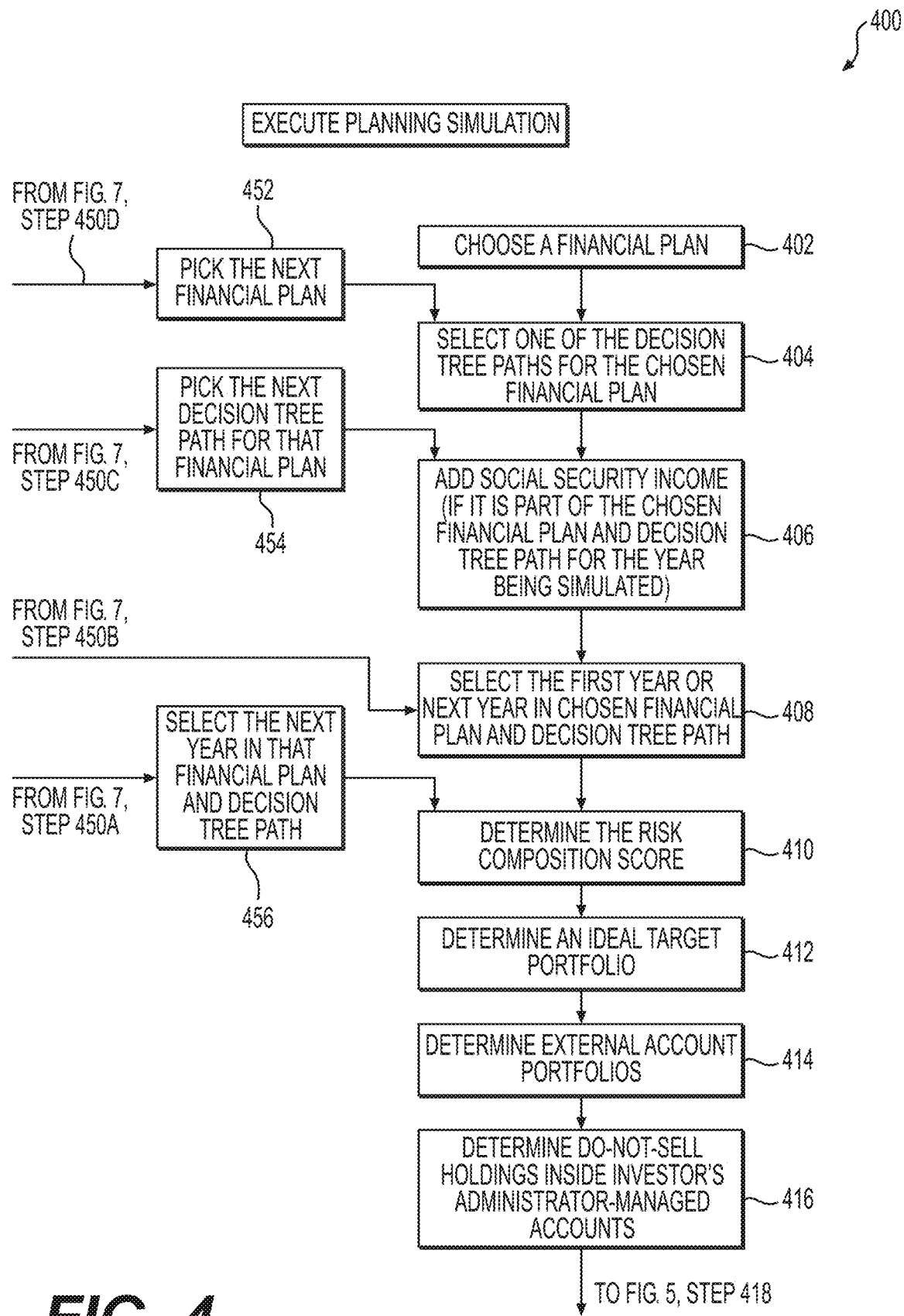
FIGS. 4-7 are flowcharts illustrating an embodiment of a method for a planning simulation.

To automate the execution of a financial plan in real-time to account for observed changes in an individual's financial situation and real-time account balances, a method for dynamic rebalancing may be operated by the system. As mentioned, FIGS. 4-5 show methods (steps 410-418) that the methodology engine 306 may employ to rebalance a portfolio in a simulation. To implement this methodology in real-time, the trading engine 304 may send the current plan (which is a "closed plan" as defined previously) and real-time account information (including latest market values) to the methodology engine 306, which runs a projection to update the target portfolio using the method's rebalancing strategy. Discussed below are embodiments of dynamic rebalancing strategies that allow for real-time financial plan execution.

A. Embodiments of Dynamic Rebalancing Strategies

To automate the execution of a financial plan in real time to account for observed changes in an individual's financial situation, embodiments of systems and methods may employ a dynamic rebalancing strategy that may further improve risk management by accounting for changes in the market, consumer financial behavior, projected income and spending cash flows, financial goal priorities and achievements, as well as externally managed investment strategies. One such strategy, namely Risk Composition Model is described next.

B. Embodiments of Risk Composition Model

Traditional investment methodologies have routinely determined the investment strategy of an investor's portfolio using a measure of risk tolerance of the end investor. Typically, this approach involves the investor's taking a risk questionnaire designed by the financial institution, which is then graded on a numerical scale to determine the allocation of equities and fixed income that an investor should hold in the investor's portfolio.

Due in part to the lack of agreement on measurable variables that determine an investor's risk tolerance, along with an effort to simplify and generalize investment strategies for the end investors, the financial planning industry practices a paternal "rule-of-thumb" to guide individual investors on investment allocation. Guided solely by the investor's age, the financial industry may suggest that an investor allocate "100 minus their age" percent of their portfolio in equities and the remaining percentage in fixed income. The assumption that an investor's risk tolerance decreases with age, as the rule-of-thumb would suggest, has been widely debated in the academic research for quite some time.

Among the many flaws in the aforementioned traditional investment approach, one of the biggest is the singular focus on the individual's across-the-board risk profile and not on what the end investor is longing to achieve. To counter this problem, and with the advancement in technical tools, some investment advisors adopted a more individualized methodology of investing, namely, goals-based investing.

Goals-based investing may be considered a liabilities-driven investment management strategy that separates the individual's liabilities into different spending buckets, such as essentials, lifestyle, and legacy aspirations. An individual investor may have multiple goals, each with its own corresponding timeline and investment strategy. Goals-based investing allows the investor the flexibility to compartmentalize and evaluate investment objectives for each goal separately. Thus, an investor can determine a different risk profile for each goal in accordance with the goal's time horizon and liability. According to behavioral scientists, the process of designating funds to specific goals aligns with cognitive strategies that individuals employ when allocating resources over a fixed set of possibilities. For example, an investor may be fixated on taking less risk with a hard-earned nest-egg, but willing to deem specific goals as risk-worthy when faced with partitioned funds. As a result, goals-based investing introduced a smarter investment strategy more closely aligned with the end investor's objectives.

However, the implementation of goals-based investing has yet to be perfected, with many institutions that advertise its implementation still relying on paternal target-date-like glide paths as the underlying foundation and methodology guiding investment allocation. Moreover, practitioners of both traditional and goals-based approaches have been focused on implementing these investment management techniques solely for wealth accumulation with a blind eye toward the de-accumulation process. In the case of goals-based investing, this amounts to saving fora goal (e.g., saving "x dollars" for retirement) and not particularly managing the investment strategy when achieving the goal (e.g., managing the drawdown of the retirement portfolio), which can span several years. Instead, both goals-based and traditional investment practitioners still employ strategies such as the "3-4% rule" or "dynamic (fixed or market variable percent) drawdown" when de-accumulating a portfolio, failing to recognize that each year of retirement is a goal in and of itself.

Figure 9:
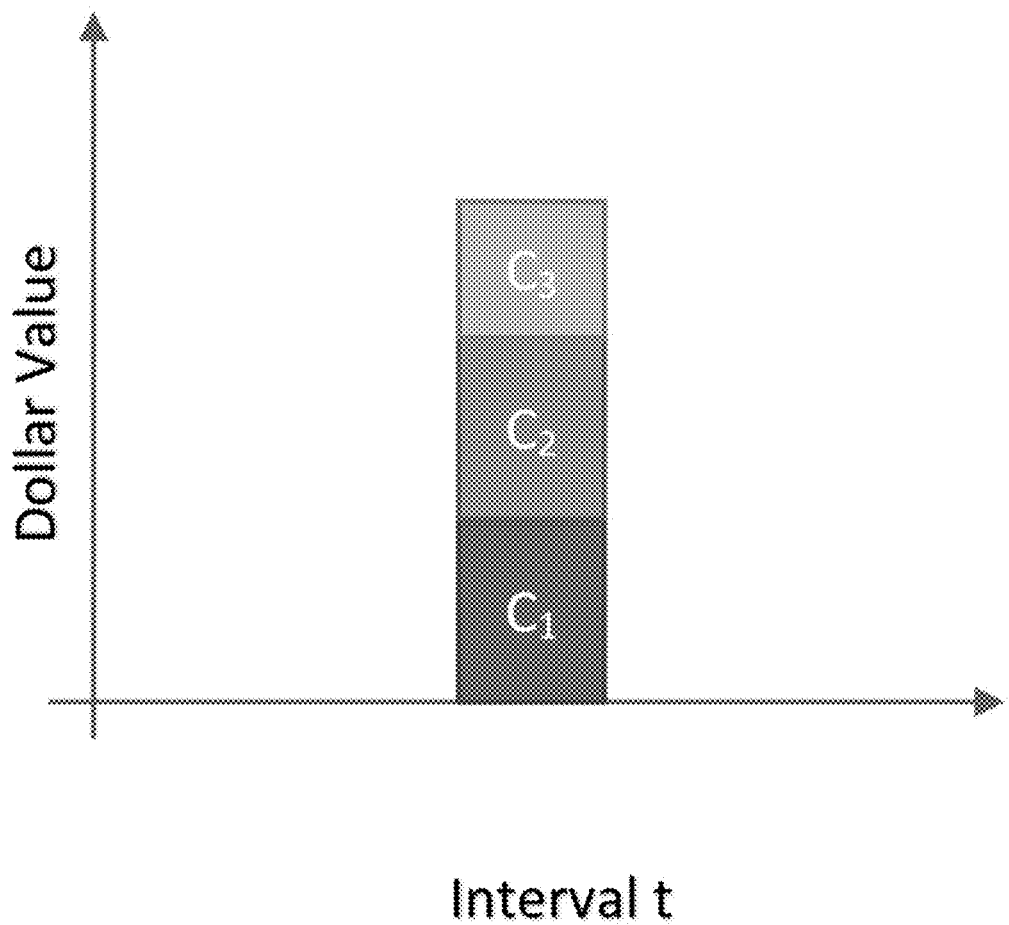
FIGS. 9 and 10 are graphs plotting dollar value of goal costs over a time interval, according to an embodiment.
Figure 10:
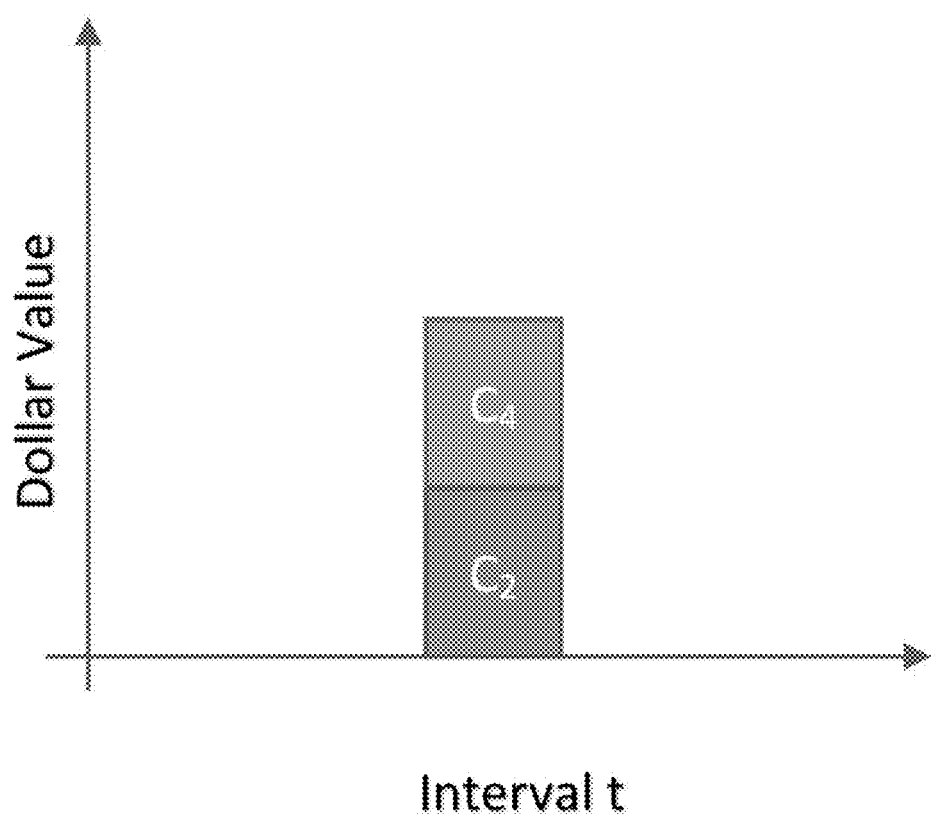
Figure 11:
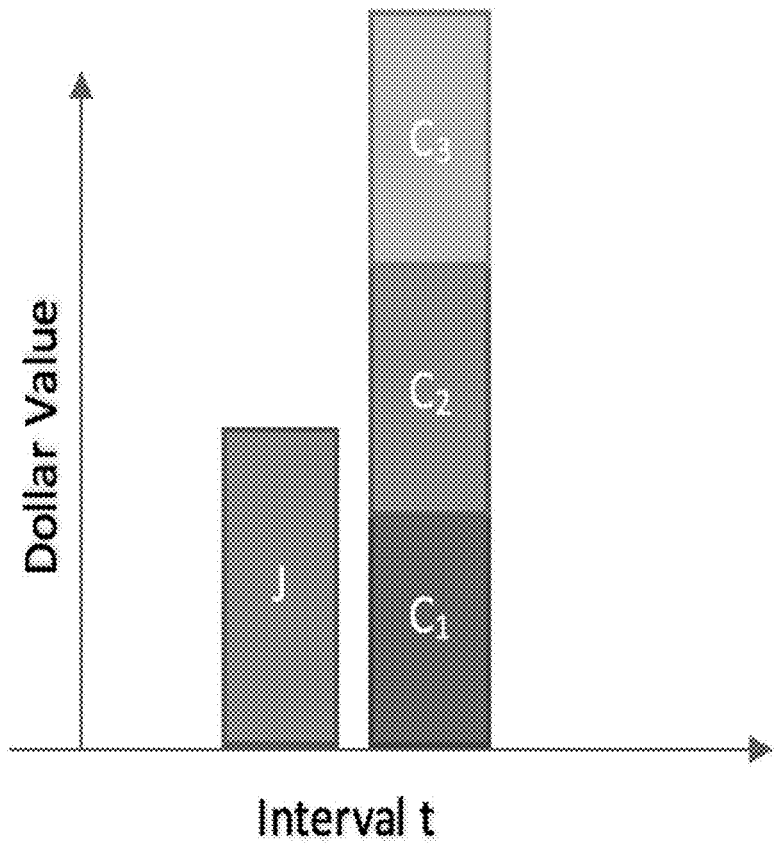
FIG. 11 is a graph plotting dollar value of goal costs and income streams over a time interval, according to an embodiment.

The present embodiments, as described further below and shown in FIGS. 9-11, provide innovative methods and systems for a dynamic goal-based liabilities-driven investment management strategy, which may be determined by the attributes of an investor's goals, income, and total investable assets. Embodiments of the systems and methods (such as FIGS. 1A-8, 12, 15, 16, 17, 18, and 25) may allow for rapid computations of risk composition based on an individual's goals and liabilities, as a marked improvement over traditional approaches.

As used herein, a risk composition score is a value calculated from an individual's information to determine the target portfolio to rebalance to. As used herein, a liability stream or spending goal is a sequence (or time series) of desired outflow transactions that a financial plan wants to accomplish. As used herein, an income stream is a sequence (or time series) of inflow transactions that a financial plan expects to have.

In embodiments, several factors may affect risk composition, including, for example:

Longevity estimate or time to end of simulation: This number is either calculated using a longevity model or imputed from household's input.

Liability streams and each liability stream's risk score: These can be one time liabilities at specific times, recurring within time intervals, curvilinear in shape or not, or occurring at customizable frequency. Each liability has a risk score defined by the user input.

Left-over funds risk score: Each user is asked at what risk the user would like to invest any additional funds that are not used to attain the user's liability streams.

Individual's rank order of each of the liability streams: Each user is asked to rank order the user's goals from the most important to achieve, to the least important to achieve.

Current and future income streams of the financial plan: These can be one-time income streams, recurring within time intervals, curvilinear in shape or not, or occurring at customizable frequency.

In embodiments, properties of a risk composition score may include, for example:

Dynamic to changes in account balances with market fluctuations, contributions, or withdrawals; and Dynamic with time (this may occur naturally as values of remaining liability streams change over time)—as a result this also occurs with partial or complete goal attainment.

FIGS. 9-11 and the description below illustrate embodiments for a method for computing a risk composition score.

According to these embodiments, the method may begin by letting $G_1, G_2, \ldots, G_n$ be liability streams of the individual, where $G_i$ is the liability (or goal) with rank order i. That is, $G_1$ is the goal of most importance to achieve as ranked by the user. For each goal $G_i$, let $r_i$ be the risk score associated with this goal by the individual. Furthermore, let I be the left-over funds risk score of the individual.

The method may continue by setting up a timeline such that at each interval t, if a goal has an expense associated with it at time t, it appears in the interval. Additionally, the method may stack the goals in each interval respecting the order of their importance as assigned by their ranking.

As one example, if an individual has three goals to achieve at time t ranked $G_1, G_2, G_3$, where $C_1, C_2, C_3$ are the costs associated with the goals respectively, then interval t may appear as shown in the graph of FIG. 9.

In embodiments, some goals may not appear in a particular interval (or equivalently have cost 0 at that time t). For example, an individual may only have goals $G_2$ and $G_4$ to achieve at time t, in which case the order of appearance would still be respected, as shown in the graph of FIG. 10.

The method may continue by calculating, for each interval, the total liquid income streams as defined by the user profile. In embodiments, these streams of income may not be associated with withdrawals or dividends from investable assets, but may be incomes such as social security, job income, inheritance, or other categories that are not dependent on market returns.

If the total of the income streams in a given interval cover a liability or part of it respective of the order of liabilities, then the method may continue by defining the "remaining liability" at time t, denoted by $RC_i(t)$ for Goal $G_i$ to be the remaining cost of the goal less the covered costs by income streams.

As an example, if J is the sum of all liquid income streams at interval t, then $RC_1(t)$ would be 0 for time t, while $RC_2(t)$ would be equal to $C_1+C_2-J$, as shown in the graph of FIG. 11. Based on that graph, the method may continue by summing, for time t on the timeline, the remaining liabilities for each goal from start=t and end=end of simulation (which may be, for example, a longevity estimate). For example, if the timeline consists of three intervals t=start, t+1, and t+2=end, then each goal $G_i$ may have a net value of liability, denoted by $L(G_i,t)$, at time t equal to $RC_i(t)+RC_i(t+1)+RC_i(t+2)$.

That is, the total remaining liability of goal $G_i$ at time t can be viewed as the equation:

$$L(G_i, t) \sum_{t}^{\infty} RC_i(t)$$

Then, the method may continue by assuming that, for time t, an individual has a net balance of investable assets $B_t$ (this balance may be, for example, a real time balance or a simulated balance in a Monte Carlo simulation).

The method may then calculate the risk composition score of the individual in the following manner:

If $B_t \leq \Sigma_{\forall G \text{ in } G_i} L(G_i, t)$ (that is, the balance is less than the total of liabilities needed to be achieved, by all goals within a financial plan):

Risk composition score =

$$\frac{\sum_{\forall G \text{ in } G_i} L(G_i, t) * r_i}{\sum_{\forall G \text{ in } G_i} L(G_i, t)} = \frac{\text{sum of (remaining liabilities} * \text{risk) per goal}}{\text{Total remaining liabilities of all goals}}$$

Thus, essentially, risk composition score is the weighted average of the risk scores of the goals, where the weight is determined by the remaining liabilities yet to be funded by the balance of the portfolio:

If, however, $B_t > \Sigma_{\forall G \text{ in } G_i} L(G_i, t)$, then all remaining liabilities are essentially funded by $B_t$ by time t. Thus, risk composition should be calculated as follows:

$$\frac{\sum_{\forall G \text{ in } G_i} L(G_i, t) * r_i}{B_t} + \frac{\left(B_t - \sum_{\forall G \text{ in } G_i} L(G_i, t)\right) * l}{B_t}$$

where l is the left—over funds risk score of the individual.

After the risk composition score is calculated, the score may be used to select an ideal target portfolio of the investor, for example, as described above in reference to step 412 of method 400 of FIG. 4.

In comparison to traditional approaches, the above-described method of computing risk composition score is differentiated by points 1-5 below:

1. Left over funds risk score: this allows an investor to determine a portfolio for funds not allocated to spending needs and thus contribute to the growth of their portfolio without additional risk of attaining their goals.
2. Different inflation rates for different spending needs is permitted: this allows an investor to more accurately measure the future value of liabilities such as healthcare that historically have higher inflation rates than other spending needs such as food and essentials.
3. Income-aware strategy: this solves for one of the leading causes of mismeasurement of risk in current financial planning methodologies that ignore income-covered liabilities and thus place an investor in portfolios that are misaligned with their liability gaps.
4. Goal priority aware to reduce portfolio remaining liabilities: this innovates on current financial planning methodologies allowing an investors liabilities and priorities to solely determine his or her portfolio allocation.
5. Dynamic to time, market, and balance changes: as opposed to a glide path that depends on an individual's age.

As shown, the method of risk composition may allow for the automation of the execution of a financial plan in real time to account for observed changes in an individual's financial situation. This is due to the changing inputs, such as liabilities, income streams, account balances, and markets, to the risk composition calculation as shown above. Moreover, risk composition may further personalize investment rebalancing strategies determined for an investor by incorporating the investor's financial goal priorities and real-time goal achievements.

C. Accessibility of Accounts and Risk Composition Score:

In financial planning applications, clients may have accounts for which the funds are accessible to them at different points in time and for different spending needs. One example of such account types is a trust that is bound by legal requirements such as irrevocability and/or accessibility of the funds to the grantor/beneficiary for specific qualified expenses. Other examples include H.S.A accounts and 529 (or similar) accounts that are usually earmarked for health and education expenses.

For software to process this restriction on accounts, which a regular financial planner may not be able to do by hand, an "accessibility matrix" of an account, as discussed herein, may advantageously be used. This allows a risk composition strategy, as discussed herein, to be applied to accounts that have the same accessibility matrix.

Accessibility Matrix

Each account within a financial plan may have its own accessibility matrix. An accessibility matrix of an account a at time interval t may be defined as follows:

Note that accessibility matrices are calculated for all combinations of a, t.

Let AM(a, t) be an accessibility matrix of size n×m,

Define the first dimension n to be the spending needs/goals within the plan

Define the second dimension m to be the time intervals from t until the end of the simulation.

For each element (i,j) in AM(a, t), identify if:

a) the funds in the account are accessible to the financial plan for column j's time interval b) if the spending need in row i is a qualified expense.

If (a) and (b) hold true, then set the value of element (i,j)=1, else element (i,j)=0.

As a further extension, it may be the case that funds are accessible for a portion of the time interval.

Let the value $d_a$ be the duration within the interval for which funds are accessible.

Let the value $d_t$ be the duration of the interval.

Set the value of element (i,j)=$d_a/d_t$

As a further extension, it may be the case that a known fraction of an account will be transferred, e.g., due to a bequest.

This may be simulated by setting the accessibility after the transfer time to the fraction remaining.

Set the value of element (i,j) to the fraction remaining.

Should these and other features need to be combined, each may be evaluated in turn and the value of the element may be set to the weighted sum of the contributing factors.

For example, for the case that funds are accessible for a portion of the time interval, consider the case where the customer is a beneficiary of an inherited irrevocable trust. Assume further that the trust document dictates that it will be accessible for all reasonable needs when the customer turns 35 years old on May 27, 2035. If Jan. 1, 2035 is day 0, the accessibility may be calculated as:

(365−146)/365=0.6

Assume further that the customer has two expenses, two accounts (the trust and a brokerage), and the time from 2030 through 2039 is being simulated. FIG. 27A illustrates an example accessibility matrix for this case.

As another example, for the case that a known fraction of an account will be transferred, e.g., due to a bequest. For this example, consider the point of view of the grantor of a trust. The grantor wants to bequeath 20% of the trust to a charity when she turns 75 years old on Jan. 1, 2075. She has the same two expenses and also a brokerage. FIG. 27B illustrates an example accessibility matrix for this case.

As yet another example, for the case that these and other features are combined, consider the case where the grantor decides to make the gift on May 27, 2075. Assuming January 1 is day 0 of a year, then:

from day 0 up to but not including day 146, the trust will be 100% accessible; and from day 146 up to but not including day 365, the trust will be 80% accessible.

The accessibility may be set to the weighted sum (which may be loosely referred to as "the product"):

(146−0)/365*100%+(365−146)/365*80%=0.4*1+ 0.6*0.8=0.88

FIG. 27C illustrates an example accessibility matrix for this case.

Example: Assume that a certain trust is only accessible to the client at the death of the grantor, which is projected to be at time interval t=3. Additionally, for simplicity assume that the client only has one spending goal in the financial plan projected to last until time t=5. Accordingly, the accessibility matrices would be:

AM(a=Trust, t=0)=[0 0 0 1 1 1]
AM(a=Trust, t=1)=[0 0 1 1 1]
AM(a=Trust, t=2)=[0 1 1 1]
AM(a=Trust, t=3)=[1 1 1]
AM(a=Trust, t=4)=[1 1]
AM(a=Trust, t=5)=[1]

This illustrates that as time progresses, the funds become available for expenses.

Risk Access Group

When processing a time interval t, accessibility matrices for all accounts may first be determined, followed by the determination of risk access groups. These are groups of accounts with similar accessibility characteristics and may be defined in different ways.

They may be grouped by the accessibility matrix itself.

To optimize such a grouping, it is possible to calculate a digest of the normalized binary representation of the accessibility matrix. In this context, for the present disclosure, a normalized binary representation is a binary representation that is bit-for-bit identical for logically equivalent values. For example, such a representation may have two requirements: (1) the layout of the matrix; and (2) the normalization of the individual values. As an example, the first requirement may be satisfied if the matrix is consistently laid out in row-major form. Further, the second requirement may be met if the individual values are represented as a consistent IEEE 754 floating-point value, which may prohibit non-zero values having the form $0 \cdot m \times b^e$.

They may be grouped by an auxiliary "pooled rebalanced" identifier.

They may be grouped by other characteristics of the account such as balance or P/E ratios.

The rationale for grouping by the matrix itself may be demonstrated by a two-account scenario. Consider the following accessibility matrices:

AM(a=Trust, t=0)=[0 0 0 1 1 1]
AM(a=Brokr, t=0)=[1 1 1 1 1 1]
AM(a=Trust, t=1)=[0 0 1 1 1]
AM(a=Brokr, t=1)=[1 1 1 1 1]
AM(a=Trust, t=2)=[0 1 1 1]
AM(a=Brokr, t=2)=[1 1 1 1]
AM(a=Trust, t=3)=[1 1 1]
AM(a=Brokr, t=3)=[1 1 1]
AM(a=Trust, t=4)=[1 1]
AM(a=Brokr, t=4)=[1 1]
AM(a=Trust, t=5)=[1]
AM(a=Brokr, t=5)=[1]

During time t≥3 the accessibility matrices for the Trust and Brokr accounts are identical and may naturally group together into the same risk access group.

Pooled Versus Independent Accounts

Because an investment management firm may be interested in a holistic approach to rebalancing across accounts, each account may be flagged as either "pooled" or "independent." For example, a "pooled" account may be one that the investment manager and/or client has identified as part of the risk access group, e.g., should be managed according to the financial goals that are accessible to that account and allows its allocation to be influenced by the allocation of similar accounts (as determined by the aforementioned methodology). On the other hand, an "independent" account is one that the investment manager and/or client has determined should be rebalanced independently, e.g., managed separately. Such "independent" accounts may be given a particular investment strategy to adhere to and should not affect other accounts that may have a similar accessibility. An example of an account that may be determined as independent is a "Charitable Annuity Trust" for which the trustee wishes to place income-producing assets within the trust to provide for the charity beneficiary as long as possible.

Pooled accounts on the other hand, are preferably rebalanced together as defined by the risk access groups, since they are all accessible to the same spending goals within the plan and can thus work towards achieving those financial goals.

Order of Rebalancing

Risk access groups of accounts may have intersecting spending needs to be funded. Thus, groups may be assigned an order of priority in funding different goals. It is this ordering that can allow specialized accounts to be rebalanced to achieve the goals for which they are best suited. For example, an HSA may be assigned healthcare expenses first and thus be rebalanced for that purpose, and the general-purpose accounts would only be assigned what healthcare the HSA was insufficient to cover.

Various functions may be combined to score the relative priority of risk access groups. These scores may then be used to sort the list of groups:

The minimum time at which an accessibility matrix shows full access for all expenses;
This can distinguish between specialized accounts versus general-purpose accounts;
The sum of liabilities at each time multiplied by the accessibility factor, in descending order;
This can distinguish between accounts addressing larger or smaller liabilities.

Once an order has been determined, the risk access groups can now each determine their own risk composition score based on the financial goals that are accessible to them per their shared accessibility matrix and be rebalanced amongst themselves for tax-efficiency, per techniques such as asset location, as described above.

Risk Per Account Feature

In addition to "independent" accounts, an investor may additionally place restrictions on the investment strategy that a specific account may have. Such restrictions may allow an account to be pooled but have a set strategy of investment such as 80% bonds and 20% stocks, which the other accounts within the same pool may work around to get to their target risk composition allocation.

The risk composition and accessibility matrix functionality discussed herein may advantageously provide both a technical improvement to the industry and a new process for rebalancing in general. At least one competitor technique may allow for tying assets to particular goals; however, that technique is not linked to rebalancing nor is it dependent on the account rules/accessibility of the account. Competitor techniques may not provide investment management, and may be limited to allowing advisors to input allocations for accounts for modeling purposes only.

Figure 28:
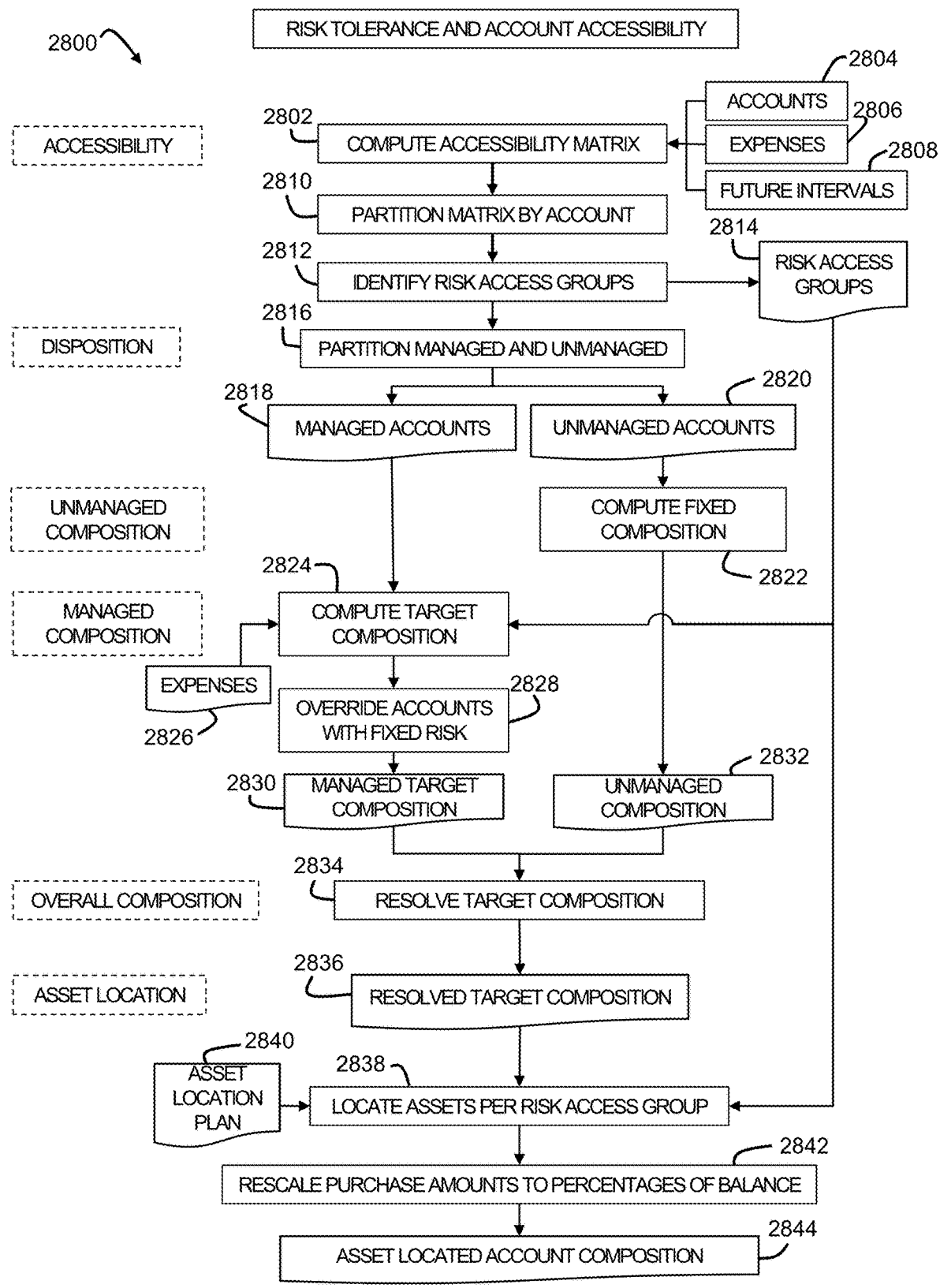
FIG. 28 is a flowchart illustrating an embodiment of a method for determining risk tolerance and account accessibility.

FIG. 28 illustrates a method 2800 for determining risk tolerance and account accessibility, according to an embodiment. The method 2800 may allow for dynamic rebalancing that incorporates features described above, such as accessibility matrices, risk access grouping, pooled versus independent accounts, order of rebalancing, and risk per account. As shown in FIG. 28, method 2800 begins with a step 2802 of computing an accessibility matrix, based on, for example, accounts 2804, expenses 2806, and future intervals 2808. For this example, the accessibility matrix is three dimensional: account 2804, expense 2806, and time interval. This matrix (and corresponding processing) may be calculated for the current interval of simulation, and thus the "future intervals" are relative to simulation present. The computation may depend on the type of account, type of expense, and known events in the timeline.

At step 2810, a matrix may be partitioned by account. At step 2812, risk access groups may be identified. Risk access groups 2814 are groups of accounts whose accessibility is equal or similar, within each group. Independently managed accounts may also be managed by assigning them a special risk access group that disregards the risk composition process.

In the case of independently managed accounts, the customer may request that the account be managed according to the customer's specific direction. These accounts may provide the ability to meet special requirements and also model the consequences of disregarding risk composition.

At step 2816, accounts may be partitioned into managed and unmanaged accounts. For example, accounts may be segregated into managed accounts 2818 and unmanaged accounts 2820. For example, managed accounts 2818 may include those whose composition is directly managed by the system, while unmanaged accounts 2820 may include those whose composition is either fixed by user request or is managed by a third party.

At step 2822, fixed composition is determined, with output being unmanaged composition 2832. Asset location may be performed on a worksheet (e.g., a matrix whose dimensions may include account and expense). Since unmanaged accounts may have a formulaic composition, they may be prefilled on the worksheet.

At step 2824, target composition may be determined, based on expenses 2826, following the partitioned managed accounts 2818. In some embodiments, a target risk score may be a sum of expense risk scores weighted by their total liability. In some embodiments, this may be expanded per account by multiplying the expense liability by the accessibility of the account to that expense. In some embodiments, that may be used to compute one or more target compositions that may be composed by specific tickers, by asset classes, or by broad asset class (e.g., stocks, bond, or cash).

At step 2828, accounts with fixed risk may be overridden, with output being managed target composition 2830. At step 2834, target composition may be resolved, to determine resolved target composition 2836. For example, if an account has an excess of a certain asset in an unmanaged account, it may not be possible to reach exactly the desired composition. For example, if a narrower desired composition cannot be reached, attempts to meet a broader target composition may be made, in some embodiments. The resolved target composition may identify, for managed accounts in risk access groups, the desired percentage of each asset class for that group.

At step 2838, assets may be located, per risk access group, based on an asset location plan 2840. In some embodiments, asset location may be accomplished by simulating reconstituting the portfolio from scratch by purchasing the desired assets. In some embodiments, the asset location plan may include a series of steps of the form purchase (e.g., asset class, account) that is ordered to purchase assets from the most tax favorable accounts first.

In some embodiments, step 2838 lays out the future liabilities. For example, it may perform purchases for unmanaged accounts. In some embodiments, it may then loop through the risk access groups from most specialized to most general. Within each loop, it may make purchases according to the asset location plan for the account.

At step 2842, purchase amounts may be rescaled to a percentage of balances, to determine asset located account composition 2844.

Referring again to FIGS. 4, 5, 12, 25, and 26, further aspects of the execution phase may include daily or frequently recurring calls to the methodology engine by way of the API and/or the trading engine for investors with current plans. Such calls may include checks for rebalancing, as outlined previously, which may be triggered by deposits or withdrawals made by the investor or market changes.

Moreover, the execution phase may involve scheduling deposits into an investor's externally linked account or internally administered cash account, or sending a check to the investor, as determined by the cash flow of the financial plan.

In other aspects, the execution process may include re-running the projection of a financial plan (using updated real-time information) as time progresses to update the chance of success, update projected cash flows, and update investment strategies, among other plan outputs.

Such a procedure may highlight the effect of the real-time financial situation changes for an investor, such as goals accomplished by the investor (thus no longer in the future of the plan) or deviations from the previously projected plan such as unexpected or unplanned spending or income shocks.

By increasing computer processing speeds and minimizing consumption of processing resources, the optimization methodologies described above facilitate the real-time automated financial plan execution and dynamic rebalancing.

Overall, the present embodiments may provide efficiencies in financial planning, creating financial plans that are more likely to lead to successful outcomes, using less time and computing resources. In particular, the brute-force optimization and the concurrent gradient descent optimization thoroughly and quickly analyze large amounts of user-customized data.

For illustration purposes, portions of this specification describe the present embodiments in the context of financial planning. However, as one of ordinary skill in the art would appreciate, the systems and methods described herein apply equally well to other similar asset value optimization and/or modeling. For that reason, and notwithstanding the particular benefits associated with using the present embodiments in connection with financial planning, the systems and methods described herein should be considered broadly applicable to any need for modeling future asset value or automating the iterative optimization of financial plans based on multiple combinations of timing, goals, and contingencies, and the automated execution of financial plans in real-time by way of asset management.

In embodiments, instructions adapted to be executed by a processor to perform a method may be stored on a non-transitory computer-readable medium. The non-transitory computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Furthermore, one or more computer-readable storage media may be utilized in implementing embodiments discussed herein. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps, such as the steps illustrated in FIGS. 1A-8. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

What is claimed is:

1. A computer-implemented method comprising:
   determining a plurality of financial plans based on planning simulation and optimization parameters for an individual, wherein each plan of the plurality of financial plans is associated with a respective goal of the individual and is based on a respective set of open parameters associated with the respective goal;
   executing, using a methodology computer engine, a planning simulation based on the plurality of plans, wherein executing the planning simulation determines results for each branch of a decision tree that associates the respective plan with combinations of values for set of open parameters;
   analyzing, using the methodology computer engine, results of the planning simulation to determine a set of candidate plans;
   determining, using the methodology computer engine, an optimal plan from among the set of candidate plans by:
      selecting an initial optimal plan candidate from the set of candidate plans;
      simulating the initial optimal plan candidate to determine a utility value based on a utility function;
      selecting neighboring optimal plan candidates of the initial optimal plan candidate;
      simulating the neighboring optimal plan candidates based on executing a concurrent gradient descent process until a resulting plan having optimum utility value is determined, wherein the neighboring optimal plan candidates are simulated using a plurality of active worker processes operating in parallel; and selecting the resulting plan, of the concurrent gradient descent process, as the optimal plan; and reporting the determined optimal plan.

2. The method of claim 1, wherein determining the optimal plan includes:

iteratively adjusting a cardinality of the plurality of active worker processes for simulating the neighboring optimal plan candidates based on a predetermined value indicating a cardinality of a pool of worker processes.

3. The method of claim 1, wherein determining the optimal plan includes:

determining that an active worker process, of the plurality of active worker processes, has completed a simulation of one of the neighboring optimal plan candidates; and reassigning the active worker process to simulate a different neighboring optimal plan candidate based on the determination that the active worker process has completed a simulation of one of the neighboring optimal plan candidates.

4. The method of claim 1, wherein determining the plurality of financial plans comprises:

determining a plurality of goals of the individual;

determining each financial plan of the plurality of financial plans based on defining, for each goal of the plurality of goals, an associated plan to achieve the respective goal of the individual;

defining, for each financial plan of the plurality of financial plans, open life decisions as the set of respective open parameters associated with the respective goal; and defining, for each financial plan of the plurality of financial plans, a respective decision tree that associates the financial plan with combinations of timing associated with the open life decisions.

5. The method of claim 4, wherein executing the planning simulation comprises:

selecting a financial plan from the plurality of financial plans;

selecting a path of the respective decision tree for the selected financial plan; and determining a risk composition score associated with the selected financial plan and the selected path of the decision tree.

6. The method of claim 5, wherein determining the risk composition score comprises:

determining a plurality of liability streams of the individual;

receiving from the individual a rank order for each liability stream of the plurality of liability streams;

receiving from the individual a risk score for each liability stream;

establishing a cost for each liability stream;

establishing a timeline having a plurality of time intervals;

assigning, for each time interval, liability streams associated with the respective time interval;

assigning, for each time interval, income streams associated with the respective time interval; and calculating the risk composition as a weighted average of the risk scores of the liability streams, wherein weight is determined by remaining liabilities yet to be funded by a balance of a portfolio of the individual.

7. The method of claim 4, wherein executing the planning simulation comprises:

simulating, for each financial plan of the plurality of financial plans, all combinations of timing associated with the open life decisions and a plurality of capital market outcomes for each combination; and terminating the planning simulation when there are no more years of a last plan left to simulate, no more capital market outcomes, and no more financial plans left to simulate.

8. The method of claim 1, wherein establishing the planning and optimization parameters comprises:

determining longevity of the individual;

determining income streams of the individual;

determining current and future cost of goals of the individual; and determining a rank order of the goals.

9. The method of claim 1, further comprising:

determining a timing of fund availability using an accessibility matrix.

10. A non-transitory computer-readable medium storing instructions that, when executed by one or more computer processors, cause a computing system to perform steps comprising:

determining a plurality of financial plans based on planning simulation and optimization parameters for an individual, wherein each plan of the plurality of financial plans is associated with a respective goal of the individual and is based on a respective set of open parameters associated with the respective goal;

executing, using a methodology computer engine, a planning simulation based on the plurality of plans, wherein executing the planning simulation determines results for each branch of a decision tree that associates the respective plan with combinations of values for set of open parameters;

analyzing, using the methodology computer engine, results of the planning simulation to determine a set of candidate plans;

determining, using the methodology computer engine, an optimal plan from among the set of candidate plans by:

selecting an initial optimal plan candidate from the set of candidate plans;

simulating the initial optimal plan candidate to determine a utility value based on a utility function;

selecting neighboring optimal plan candidates of the initial optimal plan candidate;

simulating the neighboring optimal plan candidates based on executing a concurrent gradient descent process until a resulting plan having optimum utility value is determined, wherein the neighboring optimal plan candidates are simulated using a plurality of active worker processes operating in parallel; and selecting the resulting plan, of the concurrent gradient descent process, as the optimal plan; and reporting the determined optimal plan.

11. A computing system comprising:

one or more computer processors; and memory storing instructions that, when executed by the one or more computer processors, cause the computing system to:

determine a plurality of financial plans based on planning simulation and optimization parameters for an individual, wherein each plan of the plurality of financial plans is associated with a respective goal of the individual and is based on a respective set of open parameters associated with the respective goal;

execute, using a methodology computer engine, a planning simulation based on the plurality of plans, wherein executing the planning simulation determines results for each branch of a decision tree that associates the respective plan with combinations of values for set of open parameters;

analyze, using the methodology computer engine, results of the planning simulation to determine a set of candidate plans;

determine, using the methodology computer engine, an optimal plan from among the set of candidate plans by causing the computing system to:
  select an initial optimal plan candidate from the set of candidate plans;
  simulate the initial optimal plan candidate to determine a utility value based on a utility function;
  select neighboring optimal plan candidates of the initial optimal plan candidate;
  simulate the neighboring optimal plan candidates based on executing a concurrent gradient descent process until a resulting plan having optimum utility value is determined, wherein the neighboring optimal plan candidates are simulated using a plurality of active worker processes operating in parallel; and
  select the resulting plan, of the concurrent gradient descent process, as the optimal plan; and report the determined optimal plan.

12. The computing system of claim 11, wherein the instructions cause the computing system to determine the optimal plan by causing the computing system to:
  iteratively adjust a cardinality of the plurality of active worker processes for simulating the neighboring optimal plan candidates based on a predetermined value indicating a cardinality of a pool of worker processes.

13. The computing system of claim 11, wherein the instructions cause the computing system to determine the optimal plan by causing the computing system to:
  determine that an active worker process, of the plurality of active worker processes, has completed a simulation of one of the neighboring optimal plan candidates; and
  reassign the active worker process to simulate a different neighboring optimal plan candidate based on the determination that the active worker process has completed a simulation of one of the neighboring optimal plan candidates.

14. The computing system of claim 11, wherein the instructions cause the computing system to determine the plurality of financial plans but causing the computing system to:
  determine a plurality of goals of the individual;
  determine each financial plan of the plurality of financial plans based on defining, for each goal of the plurality of goals, an associated plan to achieve the respective goal of the individual;
  define, for each financial plan of the plurality of financial plans, open life decisions as the set of respective open parameters associated with the respective goal; and
  define, for each financial plan of the plurality of financial plans, a respective decision tree that associates the financial plan with combinations of timing associated with the open life decisions.

15. The computing system of claim 14, wherein the instructions cause the computing system to execute the planning simulation by causing the computing system to:
  select a financial plan from the plurality of financial plans;
  select a path of the respective decision tree for the selected financial plan; and
  determine a risk composition score associated with the selected financial plan and the selected path of the decision tree.

16. The computing system of claim 15, wherein the instructions cause the computing system to determine the risk composition score by causing the computing system to:
  determine a plurality of liability streams of the individual;
  receive from the individual a rank order for each liability stream of the plurality of liability streams;
  receive from the individual a risk score for each liability stream;
  establish a cost for each liability stream;
  establish a timeline having a plurality of time intervals;
  assign, for each time interval, liability streams associated with the respective time interval;
  assign, for each time interval, income streams associated with the respective time interval; and
  calculate the risk composition as a weighted average of the risk scores of the liability streams, wherein weight is determined by remaining liabilities yet to be funded by a balance of a portfolio of the individual.

17. The computing system of claim 14, wherein the instructions cause the computing system to execute the planning simulation by causing the computing system to:
  simulate, for each financial plan of the plurality of financial plans, all combinations of timing associated with the open life decisions and a plurality of capital market outcomes for each combination; and
  terminate the planning simulation when there are no more years of a last plan left to simulate, no more capital market outcomes, and no more financial plans left to simulate.

18. The computing system of claim 11, wherein the instructions cause the computing system to establish the planning and optimization parameters by causing the computing system to:
  determine longevity of the individual;
  determine income streams of the individual;
  determine current and future cost of goals of the individual; and
  determine a rank order of the goals.

19. The computing system of claim 11, wherein the instructions further cause the computing system to:
  determine a timing of fund availability using an accessibility matrix.

* * * * *